(12) United States Patent
Chen et al.

(10) Patent No.: US 9,798,575 B2
(45) Date of Patent: *Oct. 24, 2017

(54) TECHNIQUES TO MANAGE VIRTUAL CLASSES FOR STATISTICAL TESTS

(71) Applicant: SAS Institute Inc., Cary, NC (US)

(72) Inventors: Xilong Chen, Chapel Hill, NC (US); Mark Roland Little, Cary, NC (US)

(73) Assignee: SAS Institute Inc., Cary, NC (US)

( * ) Notice: Subject to any disclaimer, the term of this patent is extended or adjusted under 35 U.S.C. 154(b) by 178 days.

This patent is subject to a terminal disclaimer.

(21) Appl. No.: 14/270,783

(22) Filed: May 6, 2014

(65) Prior Publication Data

US 2015/0324221 A1 Nov. 12, 2015
US 2017/0024242 A9 Jan. 26, 2017

Related U.S. Application Data

(63) Continuation of application No. 14/270,662, filed on May 6, 2014, now Pat. No. 9,208,131.
(Continued)

(51) Int. Cl.
G06F 9/46 (2006.01)
G06F 17/18 (2006.01)
(Continued)

(52) U.S. Cl.
CPC ............... *G06F 9/46* (2013.01); *G06F 9/455* (2013.01); *G06F 17/17* (2013.01); *G06F 17/175* (2013.01);
(Continued)

(58) Field of Classification Search
None
See application file for complete search history.

(56) References Cited

U.S. PATENT DOCUMENTS 3,082,374 A 3/1963 Buuck
3,348,031 A 10/1967 Russell, Jr. et al.
(Continued)

OTHER PUBLICATIONS

"Simulation of dependent random variables using copulas", The MathWorks, <http://www.mathworks.com/products/demos/statistics/copulademo.html>, 13 pages, Unknown date, Unknown author.
(Continued)

*Primary Examiner* — Kenneth Tang

(57) ABSTRACT

Techniques to manage virtual classes for statistical tests are described. An apparatus may comprise a simulated data component to generate simulated data for a statistical test, statistics of the statistical test based on parameter vectors to follow a probability distribution, a statistic simulator component to simulate statistics for the parameter vectors from the simulated data with a distributed computing system comprising multiple nodes each having one or more processors capable of executing multiple threads, the simulation to occur by distribution of portions of the simulated data across the multiple nodes of the distributed computing system, and a distributed control engine to control task execution on the distributed portions of the simulated data on each node of the distributed computing system with a virtual software class arranged to coordinate task and subtask operations across the nodes of the distributed computing system. Other embodiments are described and claimed.

52 Claims, 36 Drawing Sheets

Related U.S. Application Data

(60) Provisional application No. 61/819,791, filed on May 6, 2013.

(51) Int. Cl.
```
G06F 17/30      (2006.01)
G06F 9/455      (2006.01)
H04L 29/08      (2006.01)
G06F 17/17      (2006.01)
G06F 19/00      (2011.01)
G01D 21/00      (2006.01)
```

(52) U.S. Cl.
CPC ........ *G06F 17/18* (2013.01); *G06F 17/30286* (2013.01); *H04L 67/10* (2013.01); *G01D 21/00* (2013.01); *G06F 19/00* (2013.01)

(56) References Cited

U.S. PATENT DOCUMENTS

| | | | |
|---|---|---|---|
| 3,400,370 | A | 9/1968 | Fukamachi |
| 3,471,685 | A | 10/1969 | Bishop, III |
| 3,526,836 | A | 9/1970 | Deger et al. |
| 6,304,966 | B1 | 10/2001 | Shimizu |
| 7,401,333 | B2 * | 7/2008 | Vandeweerd ......... G06F 9/5066 712/16 |
| 7,516,055 | B2 | 4/2009 | Strebelle |
| 8,543,194 | B2 | 9/2013 | Ting et al. |
| 9,164,193 | B2 | 10/2015 | Strebelle et al. |
| 9,208,131 | B2 * | 12/2015 | Chen ..................... G06F 17/18 |
| 9,314,177 | B2 | 4/2016 | Ting et al. |
| 2006/0041410 | A1 | 2/2006 | Strebelle |
| 2009/0320035 | A1 * | 12/2009 | Ahlgren ................. G06F 9/468 718/104 |
| 2010/0043001 | A1 * | 2/2010 | Stolpe ................... G06F 9/4881 718/102 |
| 2012/0165691 | A1 | 6/2012 | Ting et al. |
| 2013/0329986 | A1 | 12/2013 | Strebelle et al. |
| 2013/0345579 | A1 | 12/2013 | Ting et al. |
| 2014/0330536 | A1 | 11/2014 | Chen et al. |
| 2015/0324326 | A1 | 11/2015 | Chen et al. |
| 2015/0324327 | A1 | 11/2015 | Chen et al. |
| 2015/0324328 | A1 | 11/2015 | Chen et al. |
| 2016/0183811 | A1 | 6/2016 | Ting et al. |

OTHER PUBLICATIONS

"Distributions, Simulation, and Excel Functions", <http://www.sba.oakland.edu/faculty/isken/hcm540/Session03_DMUncertainty/DistributionsSimulationExcelFunctions.pdf>, 4 pages, Jun. 11, 2013, unknown author.
Wikipedia, "Monte Carlo Method", <http://en.wikipedia.org/wiki/Monte_Carlo_method>, 10 pages, date unknown, author unknown.
"Data Analysis & Simulation", MathWave Technologies, <http://mathwave.com/blog/category/distributions/>, Dec. 2, 2013, 6 pages.
Man, Nguyen, V.M., "Mathematical Modeling and Simulation", Sep. 6, 2010, 70 pages (pp. 1-35).
Man, Nguyen, V.M., "Mathematical Modeling and Simulation", Sep. 6, 2010, 70 pages (pp. 36-70).
"Simulation Tutorial—Models", 2014 Frontline Systems, Inc., <http://www.solver.com/simulation-models>, 2 pages, (Author unknown).
"The mathematics of safe machine intelligence", Machine Intelligence Research Institute, <http://intelligence.org/research/?gclid=CMGlkJGzpb4CFUuXOgodKj4ABw>, 4 pages, (unknown date, unknown author).
Reber et al., "Statistics Applets", <http://www.bbn-school.org/us/math/ap_stats/applets/applets.html>, May 2000, 4 pages.
Ing et al., "Mathematical and Computational Modeling and Simulation", < http://www.informatik.uni-hamburg.de/TIS/downloads/Vorlesung_CMS_2005_3.pdf>, 2005, 285 pages (pp. 1-45).
Ing et al., "Mathematical and Computational Modeling and Simulation", < http://www.informatik.uni-hamburg.de/TIS/download/Vorlesung_CMS_2005_3.pdf>, 2005, 285 pages (pp. 46-86 ).
Ing et al., "Mathematical and Computational Modeling and Simulation", < http://www.informatik.uni-hamburg.de/TIS/downloads/Vorlesung_CMS_2005_3.pdf>, 2005, 285 pages (pp. 87-135).
Ing et al., "Mathematical and Computational Modeling and Simulation", < http://www.informatik.uni-hamburg.de/TIS/downloads/Vorlesung_CMS_2005_3.pdf>, 2005, 285 pages (pp. 136-192).
Ing et al., "Mathematical and Computational Modeling and Simulation", < http://www.informatik.uni-hamburg.de/TIS/downloads/Vorlesung_CMS_2005_3.pdf>, 2005, 285 pages (pp. 193-240).
Ing et al., "Mathematical and Computational Modeling and Simulation", < http://www.informatik.uni-hamburg.de/TIS/downloads/Vorlesung_CMS_2005_3.pdf>, 2005, 285 pages (pp. 241-285).
Venables, W. N., "An Introduction to R", <http://cran.r-project.org/doc/manuals/r-release/R-intro.html>, version 3.1.1 (Jul. 10, 2014), 1990 pp. 1-45.
Venables, W. N., "An Introduction to R", <http://cran.r-project.org/doc/manuals/r-release/R-intro.html>, version 3.1.1 (Jul. 10, 2014), 1990 pp. 46-90.
Venables, W. N., "An Introduction to R", <http://cran.r-project.org/doc/manuals/r-release/R-intro.html>, version 3.1.1 (Jul. 10, 2014), 1990 pp. 91-124.
Bohringer, Stefan, "Dynamic Parallelization of R Functions", The R Journal, <journals-project.org/archive/2013-2/boehringer.pdf>, vol. 5/2, Dec. 2013, 9 pages.
"An Introduction to R", crans-project.org/doc/manuals/R-intro.html>, 87 pages, (Author unknown), (date unknown).
Sirke, Thomas, "Programming in R", <manuals.bioinformatics.ucredu/home/programming-in-r>, (date unknown), 23 pages.
Zheng-Jun et al., "Monotone Piecewise Curve Fitting Algorithms", J. Of Computational Mathematics, vol. 12, No. 2, 1994, 10 pages.
"Grid Computing in Sas.Rtm. 9A", Second Edition SAS.RTM., SAS Institute Inc., Cary, NC., 2013, 74 pages, (author unknown), pp. 69-142.
"Grid Computing in SAS.RTM. 9A", Second Edition Sas.Rtm., SAS Institute Inc., Cary, NC., 2013, 68 pages, (author unknown), pp. 1-68.
"Distributions, Simulation, and Excel Functions", <sba.oakland.edu/faculty/isken/hcm540/Session03.sub.—DMUncertainty/DistributionsSimulationExcelFunctions.pdf>, 2003, 4 pages, (author unknown).
"Insight Maker | Free Simulation and Modeling in Your Browser", <insightmaker.com/>, 2010, 2 pages, (author unknown).
"Simulation", The MathWorks, Inc., <mathtools.netlExcel/Simulation/>, 1 page, (author unknown), 2001.
"ARM9, Freescale S12x and STR9-comStick Development Kits", The Mathworks Inc., mathworks.com/programs/ lechkits/arm9-freescale-s12x.html?s.sub.—ii- d=solmain.sub.—kit.sub.—ecg.sub.--cta1>, 1999.
"Special Distribution Simulator" math.uah.edu/stat/applets/SpecialSimulation.html>, 2 pages, (author unknown).
Bliss et al.,"Interactive Grid Computing at Lincoln Laboratory", Lincoln Laboratory Journal, vol. 16, No. 1, 2006, 52 pages, pp. 28-52.
Bliss et al.,"Interactive Grid Computing at Lincoln Laboratory", Lincoln Laboratory Journal, vol. 16, No. 1, 2006, 52 pages, pp. 1-27.
Patel et al., "Design and Implementation of Computation Grid, Measure & Improve Performance Parameter:—A Survey", International Journal of Engineering and Innovative Technology (IJEIT) vol. 2, Issue 7, Jan. 2013, 3 pages.
"Grid Computing", Wikipedia, en.wikipedia.org/wiki/Grid.sub.—computing[May 9, 2014 3:05:08 PM]>, 12 pages, (author unknown).
Shad et al., "Springer Series in Statistics", ISBN 0-387-94515-6, Springer-Verlag publishing (1995), Chapters 2, 4 & 5, 146 pages, pp. 111-146.

(56) References Cited

OTHER PUBLICATIONS

Shad et al., "Springer Series in Statistics", ISBN 0-387-94515-6, Springer-Verlag publishing (1995), Chapters 2, 4 & 5, 146 pages, pp. 76-110.

Shad et al., "Springer Series in Statistics", ISBN 0-387-94515-6, Springer-Verlag publishing (1995), Chapters 2, 4 & 5, 146 pages, pp. 36-75.

Shad et al., "Springer Series in Statistics", ISBN 0-387-94515-6, Springer-Verlag publishing (1995), Chapters 2, 4 & 5, 146 pages, pp. 1-35.

McDaniel et al., "Fast Pure R Implementation of GEE: Application of the Matrix Package", The R Journal, <journal.r-project.org/archive/2013-1/mcdaniel-henderson-rathouz.pdf >, vol. 5/1, Jun. 2013, 7 pages.

Johansen Soren,"Liklihood-Based Inference in Cointegrated Vector Autoregressive Models", Oxford University Press, Chapter 14, 1995, 12 pages.

Johansen, Soren,"Liklihood-Based Inference in Cointegrated Vector Autoregressive Models", Oxford University Press, Chapter 11, 1995, 18 pages.

Johansen, Soren,"Liklihood-Based Inference in Cointegrated Vector Autoregressive Models", Oxford University Press, Chapters 3 & 4, 1995, 42 pages.

Johansen, Soren, "Statistical Analysis of Cointegration Vectors", Journal of Economic Dynamics and Control 12 :1988), 24 pages.

Johansen et al., "Maximum Likelihood Estimation and Inference on Cointegration With Applications to the Demand for Money", Oxford Bulletin of Economics and Statistics, 52,2 (1990), 42 pages.

Johansen, Soren, "A Statistical Analysis of Cointegration for 1(2) Variables", Econometric Theory, 11, 1995, 35 pages.

Kwiatkowski et al., "Testing the null hypothesis of stationarity against the alternative of a unit root", Journal of Econometrics 54 (1992), 20 pages.

Bai et al., "Estimating and Testing Linear Models with Multiple Structural Changes", Econometrica, vol. 66, No. 1 (Jan. 1998), 33 pages.

Elliott et al., "Efficient Tests for an Autoregressive Unit Root", Econometrica, vol. 64, No. 4, Jul. 1996, 25 pages.

Shin, Yongcheol, "A Residual-Based Test of the Null of Cointegration Against the Alternative of No Cointegration", Econometric Theory, 10, 1994, 25 pages.

Im et al.,"Testing for unit roots in heterogeneous panels", Journal of Econometrics 115, (2003), 22 pages.

Bhargava et al., "Serial Correlation and the Fixed Effects Model", The Review of Economic Studies, vol. 49, No. 4 (Oct. 1982), 18 pages.

Gourierrox et al., "Likelihood Ratio Test, Wald Test, and Kuhn-Tucker Test in Linear Models with Inequality constraints on the Regression Parameters", Econometrica, vol. 50, No. 1 (Jan. 1982), 19 pages.

Bai et al., "Computation and Analysis of Multiple Structural Change Models", Journal of Applied Econometrics, Oct. 2002, 22 pages.

Office Action received for U.S. Appl. No. 14/270,784, dated Jan. 26, 2017, 22 pages.

\* cited by examiner

200

GENERATE SIMULATED DATA FOR A STATISTICAL TEST, WHERE STATISTICS FOR THE STATISTICAL TEST ARE BASED ON PARAMETER VECTORS TO FOLLOW A PROBABILITY DISTRIBUTION OF A KNOWN OR UNKNOWN FORM
202

SIMULATE STATISTICS FOR THE PARAMETER VECTORS FROM THE SIMULATED DATA, EACH PARAMETER VECTOR TO BE REPRESENTED WITH A SINGLE POINT IN A GRID OF POINTS
204

GENERATE QUANTILES FOR EACH POINT IN THE GRID OF POINTS
208

FIT AN ESTIMATED CDF CURVE FOR EACH POINT IN THE GRID OF POINTS INDEPENDENTLY FROM OTHER POINTS IN THE GRID OF POINTS USING A NUMBER OF CURVE PARAMETERS TO PROVIDE A GIVEN LEVEL OF PRECISION
210

GENERATE A COMPUTATIONAL REPRESENTATION AS SOURCE CODE TO INTERPOLATE AN ESTIMATED CDF CURVE FOR ANY POINT OF THE STATISTICAL TEST
212

REDUCE A DATA STORAGE SIZE FOR THE COMPUTATION REPRESENTATION
214

CONTROL TASK EXECUTION OF A DISTRIBUTED COMPUTING SYSTEM USING A VIRTUAL SOFTWARE CLASS
216

GENERATE SIMULATED DATA FOR A STATISTICAL TEST, THE STATISTICAL TEST BASED ON PARAMETER VECTORS TO FOLLOW A PROBABILITY DISTRIBUTION OF A KNOWN OR AN UNKNOWN FORM
802

SIMULATE STATISTICS FOR THE PARAMETER VECTORS FROM THE SIMULATED DATA WITH A DISTRIBUTED COMPUTING SYSTEM COMPRISING MULTIPLE NODES EACH HAVING ONE OR MORE PROCESSORS CAPABLE OF EXECUTING MULTIPLE THREADS, THE SIMULATION TO OCCUR BY DISTRIBUTION OF PORTIONS OF THE SIMULATED DATA ACROSS THE MULTIPLE NODES OF THE DISTRIBUTED COMPUTING SYSTEM
804

CONTROL TASK EXECUTION ON DISTRIBUTED PORTIONS OF THE SIMULATED DATA ON EACH NODE OF THE DISTRIBUTED COMPUTING SYSTEM WITH A VIRTUAL SOFTWARE CLASS ARRANGED TO COORDINATE TASK AND SUB-TASK OPERATIONS ACROSS THE NODES OF THE DISTRIBUTED COMPUTING SYSTEM
806

GENERATE SIMULATED DATA FOR A STATISTICAL TEST, THE STATISTICAL TEST BASED ON PARAMETER VECTORS TO FOLLOW A PROBABILITY DISTRIBUTION OF A KNOWN OR AN UNKNOWN FORM
*1202*

SIMULATE STATISTICS FOR THE PARAMETER VECTORS FROM THE SIMULATED DATA, EACH PARAMETER VECTOR TO COMPRISE A SINGLE POINT IN A GRID OF POINTS, WITH A GRID COMPUTING SYSTEM COMPRISING MULTIPLE NODES EACH HAVING ONE OR MORE PROCESSORS CAPABLE OF EXECUTING MULTIPLE THREADS, THE SIMULATION TO OCCUR BY DISTRIBUTION OF PORTIONS OF THE SIMULATED DATA ACROSS THE MULTIPLE NODES OF THE GRID COMPUTING SYSTEM IN ACCORDANCE WITH A COLUMN-WISE OR COLUMN-WISE-BY-GROUP DISTRIBUTION ALGORITHM
*1204*

CREATE A COMPUTATIONAL REPRESENTATION ARRANGED TO GENERATE AN APPROXIMATE PROBABILITY FUNCTION FOR EACH POINT IN THE GRID OF POINTS FROM THE SIMULATED STATISTICS
*1206*

*FIG. 12*

Simulated Data Structure 1300

| Simu ID | p | m1 | m2 | m3 | m4 | p | m1 | m2 | m3 | ... |
|---|---|---|---|---|---|---|---|---|---|---|
| ... | | | | | | | | | | |
| 1003 | 4 | 0.56978 | 0.71148 | 0.83731 | 0.46257 | 5 | 0.98292 | 0.96405 | 0.06801 | |
| 1004 | 4 | 0.38887 | 0.31690 | 0.96108 | 0.66402 | 5 | 0.97956 | 0.78485 | 0.85835 | |
| 1005 | 4 | 0.96355 | 0.48102 | 0.19284 | 0.40935 | 5 | 0.05094 | 0.23776 | 0.93339 | |
| 1006 | 4 | 0.33847 | 0.79626 | 0.25415 | 0.23356 | 5 | 0.72523 | 0.25972 | 0.64032 | |
| 1007 | 4 | 0.29916 | 0.50072 | 0.30471 | 0.71059 | 5 | 0.13851 | 074346 | 0.87603 | |
| ... | | | | | | | | | | |

Columns 1304-h

Rows 1302-g

Cells 1306-i

*FIG. 13*

Simulated Data Structure 1500

| Simu ID | p | m1 | m2 | m3 | m4 | WDmaxF | p | m1 | m2 | m3 | WDmaxF | ... |
|---|---|---|---|---|---|---|---|---|---|---|---|---|
| ... | | | | | | | | | | | | |
| 1003 | 4 | 0.56978 | 0.71148 | 0.83731 | 0.46257 | 0.82125 | 5 | 0.98292 | 0.96405 | 0.06801 | 0.98292 | ... |
| 1004 | 4 | 0.38887 | 0.31690 | 0.96108 | 0.66402 | 0.95008 | 5 | 0.97956 | 0.78485 | 0.85835 | 0.97956 | |
| 1005 | 4 | 0.96355 | 0.48102 | 0.19284 | 0.40935 | 0.96355 | 5 | 0.05094 | 0.23776 | 0.93339 | 0.92808 | |
| 1006 | 4 | 0.33847 | 0.79626 | 0.25415 | 0.23356 | 0.78712 | 5 | 0.72523 | 0.25972 | 0.64032 | 0.72523 | |
| 1007 | 4 | 0.29916 | 0.50072 | 0.30471 | 0.71059 | 0.70001 | 5 | 0.13851 | 074346 | 0.87603 | 0.86177 | |
| ... | | | | | | | | | | | | |

Group 1     Group 2

Rows 1502-j, Columns 1504-k, Cells 1506-m, Groups 1508-n

```
GENERATE SIMULATED DATA FOR A STATISTICAL TEST,
STATISTICS OF THE STATISTICAL TEST BASED ON
PARAMETER VECTORS TO FOLLOW A PROBABILITY
DISTRIBUTION OF A KNOWN OR AN UNKNOWN FORM
1802
```

```
SIMULATE STATISTICS FOR THE PARAMETER VECTORS
FROM THE SIMULATED DATA, EACH PARAMETER VECTOR
TO COMPRISE A SINGLE POINT IN A GRID OF POINTS
1804
```

```
CALCULATE QUANTILES FOR THE PARAMETER VECTORS
FROM THE SIMULATED DATA
1806
```

```
FIT AN ESTIMATED CDF CURVE TO QUANTILES FOR EACH
POINT IN THE GRID OF POINTS USING A MONOTONIC CUBIC
SPLINE INTERPOLATION TECHNIQUE IN COMBINATION
WITH A TRANSFORM TO SATISFY A DEFINED LEVEL OF
PRECISION
1808
```

GENERATE SIMULATED DATA FOR A STATISTICAL TEST, STATISTICS OF THE STATISTICAL TEST BASED ON PARAMETER VECTORS TO FOLLOW A PROBABILITY DISTRIBUTION OF A KNOWN OR AN UNKNOWN FORM
2002

SIMULATE STATISTICS FOR THE PARAMETER VECTORS FROM THE SIMULATED DATA, EACH PARAMETER VECTOR TO COMPRISE A SINGLE POINT IN A GRID OF POINTS
2004

REMOVE SELECTIVE POINTS FROM THE GRID OF POINTS TO FORM A SUBSET OF POINTS
2006

GENERATE INTERPOLATION SOURCE CODE TO INTERPOLATE A STATISTIC OF THE STATISTICAL TEST ON ANY POINT
2008

RECEIVE A COMPUTATIONAL REPRESENTATION ARRANGED TO GENERATE AN APPROXIMATE PROBABILITY DISTRIBUTION FOR STATISTICS OF A STATISTICAL TEST, THE COMPUTATIONAL REPRESENTATION TO INCLUDE A SIMULATED DATA STRUCTURE WITH INFORMATION FOR ESTIMATED CUMULATIVE DISTRIBUTION FUNCTION (CDF) CURVES FOR ONE OR MORE PARAMETER VECTORS OF THE STATISTICAL TEST, EACH PARAMETER VECTOR TO COMPRISE A SINGLE POINT IN A GRID OF POINTS
2302

EVALUATE THE SIMULATED DATA STRUCTURE TO DETERMINE WHETHER ANY POINTS IN THE GRID OF POINTS ARE REMOVABLE FROM THE SIMULATED DATA STRUCTURE GIVEN A TARGET LEVEL OF PRECISION
2304

REDUCE THE SIMULATED DATA STRUCTURE IN ACCORDANCE WITH THE EVALUATION TO PRODUCE A REDUCED SIMULATED DATA STRUCTURE HAVING A SMALLER DATA STORAGE SIZE RELATIVE TO THE SIMULATED DATA STRUCTURE, THE REDUCED SIMULATED DATA STRUCTURE TO REDUCE A DATA STORAGE SIZE FOR THE COMPUTATIONAL REPRESENTATION
2306

*FIG. 23*

User Interface View 2850

2900

RECEIVE A COMPUTATIONAL REPRESENTATION ARRANGED TO GENERATE AN APPROXIMATE PROBABILITY DISTRIBUTION FOR A STATISTICAL TEST, STATISTICS OF THE STATISTICAL TEST TO FOLLOW A PROBABILITY DISTRIBUTION OF A KNOWN OR AN UNKNOWN FORM
2902

RECEIVE A REAL DATA SET FROM A CLIENT DEVICE, THE REAL DATA SET TO COMPRISE DATA REPRESENTING AT LEAST ONE MEASURABLE PHENOMENON OR PHYSICAL PHENOMENON
2904

GENERATE STATISTICS FOR THE STATISTICAL TEST USING THE REAL DATA SET ON THE PARAMETER VECTOR
2906

GENERATE THE APPROXIMATE PROBABILITY DISTRIBUTION OF THE COMPUTATIONAL REPRESENTATION ON THE PARAMETER VECTOR
2908

GENERATE A SET OF STATISTICAL SIGNIFICANCE VALUES FOR THE STATISTICS THROUGH INTERPOLATION USING THE APPROXIMATE PROBABILITY DISTRIBUTION, THE SET OF STATISTICAL SIGNIFICANCE VALUES COMPRISING ONE OR MORE P-VALUES, EACH P-VALUE TO REPRESENT A PROBABILITY OF OBTAINING A GIVEN TEST STATISTIC FROM THE REAL DATA SET
2910

*FIG. 29*

TECHNIQUES TO MANAGE VIRTUAL CLASSES FOR STATISTICAL TESTS

RELATED CASES

This application is a continuation of U.S. patent application Ser. No. 14/270,662 titled "TECHNIQUES TO SIMULATE STATISTICAL TESTS" filed on May 6, 2014, which claims the benefit of priority under 35 U.S.C. §119(e) to U.S. Provisional Pat. App. Ser. No. 61/819,791 titled "METHODS AND SYSTEMS FOR HPSIMULATE" filed on May 6, 2013. The disclosure of U.S. patent application Ser. No. 14/270,662 is hereby incorporated by reference in its entirety. This application is also related to the following co-pending applications: Techniques to Provide Significance for Statistical Tests, U.S. application Ser. No. 14/270,837; Techniques to Perform Interpolation for Statistical Tests, U.S. application Ser. No. 14/270,825; Techniques to Perform Data Reduction for Statistical Tests, U.S. application Ser. No. 14/270,748; and Techniques to Perform Curve Fitting for Statistical Tests, application Ser. No. 14/270,806.

BACKGROUND

In some cases, a computer system may be used to perform statistical tests. This decision is normally a function of, in part, a size of a data set needed to perform a given statistical test. Even a moderately complex statistical test may require a massive data set, sometimes on the order of terabytes for example, to produce sufficiently accurate results.

SUMMARY

The following presents a simplified summary in order to provide a basic understanding of some novel embodiments described herein. This summary is not an extensive overview, and it is not intended to identify key/critical elements or to delineate the scope thereof. One purpose is to present some concepts in a simplified form as a prelude to the more detailed description that is presented later.

Various embodiments are generally directed to techniques to perform automated statistical testing. Some embodiments are particularly directed to techniques to determine statistical significance of test results from a statistical test using a distributed processing system. In one embodiment, for example, an apparatus may comprise processor circuitry, and a simulated data component operative on the processor circuitry to generate simulated data for a statistical test, statistics of the statistical test based on parameter vectors to follow a probability distribution. The apparatus may further comprise a statistic simulator component operative on the processor circuitry to simulate statistics for the parameter vectors from the simulated data with a distributed computing system comprising multiple nodes each having one or more processors capable of executing multiple threads, the simulation to occur by distribution of portions of the simulated data across the multiple nodes of the distributed computing system. The apparatus may further comprise a distributed control engine operative on the processor circuitry to control task execution on the distributed portions of the simulated data on each node of the distributed computing system with a virtual software class arranged to coordinate task and sub-task operations across the nodes of the distributed computing system. Other embodiments are described and claimed.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other features will become apparent from the following detailed description when considered in conjunction with the drawings.

BRIEF DESCRIPTION OF THE DRAWINGS

FIG. 2 illustrates an example of a first logic flow for a simulation subsystem.

FIG. 8 illustrates an example of a second logic flow for a simulation subsystem.

FIG. 12 illustrates an example of a sixth logic flow for a simulation subsystem.

FIG. 13 illustrates an example of a first simulated data structure.

FIG. 15 illustrates an example of a second simulated data structure.

FIG. 18 illustrates an example of a seventh logic flow for a simulation subsystem.

FIG. 20 illustrates an example of an eighth logic flow for a simulation subsystem.

FIG. 23 illustrates an example of a tenth logic flow for a simulation subsystem.

FIG. 29 illustrates an example of a logic flow for a statistical test subsystem.

DETAILED DESCRIPTION

Figure 1:
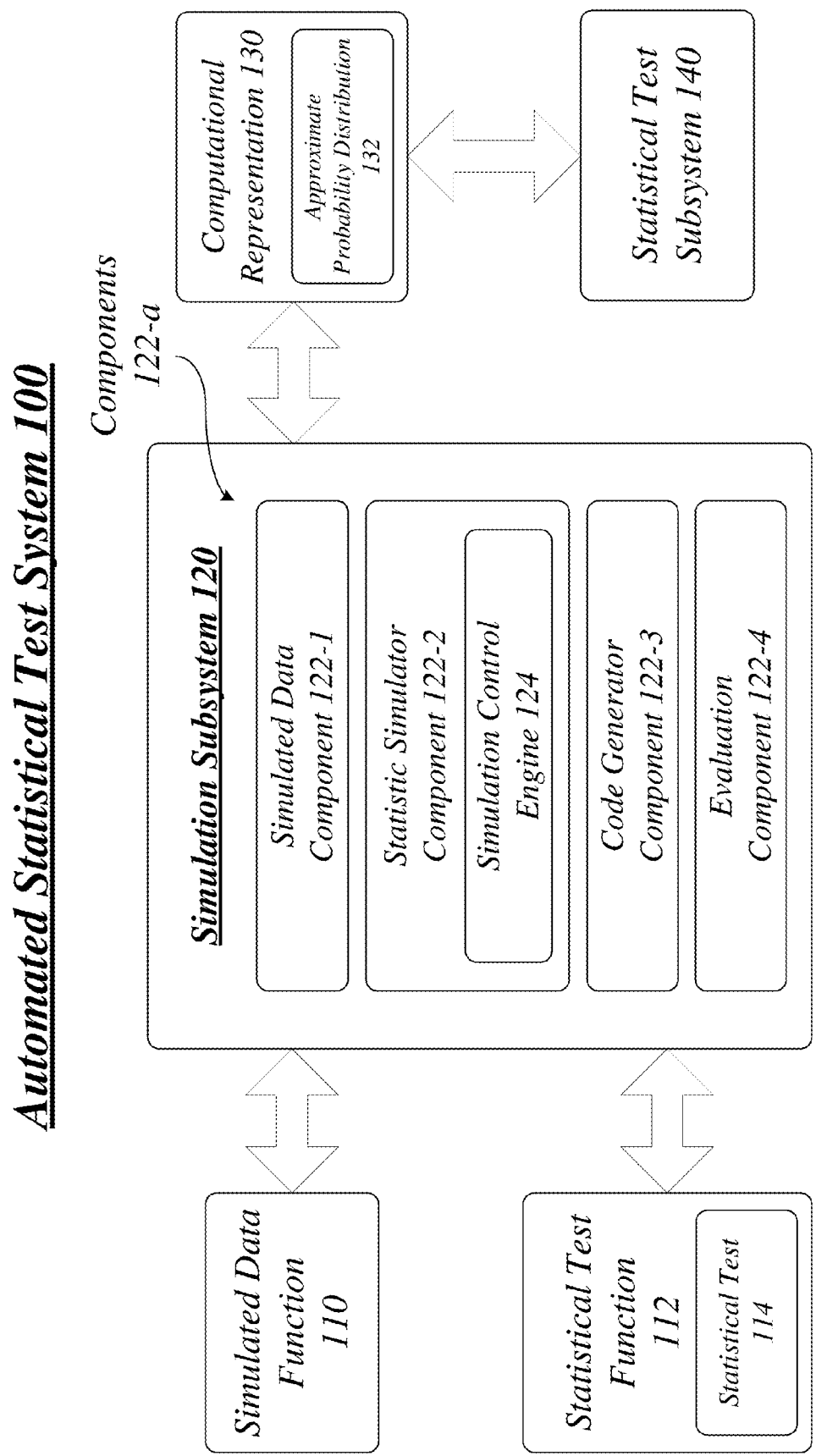
FIG. 1 illustrates an example of an automated statistical test system.

In statistics, a result is considered statistically significant if, for example, it has been predicted as unlikely to have occurred by chance alone, according to a pre-determined threshold probability, referred to as a significance level. A statistical test is used in determining what outcomes of a study would lead to a rejection of a null hypothesis for a pre-specified level of significance. A null hypothesis refers to a default position, such as there is no relationship between two measured phenomena, for example, that a potential medical treatment has no effect. Statistical significance is instructive in determining whether results contain enough information to cast doubt on the null hypothesis.

Various embodiments described and shown herein are generally directed to techniques to perform enhanced automated statistical testing. Some embodiments are particularly directed to an automated statistical test system arranged to determine statistical significance of test results from a statistical test. In one embodiment, for example, the automated statistical test system may include a simulation subsystem and a statistical test subsystem. The simulation subsystem may, among other features, generate an approximate probability distribution for the statistics of a statistical test. The statistical test subsystem may, among other features, generate statistical significance values for results of a statistical test using an approximate probability distribution. Embodiments are not limited to these subsystems.

With general reference to notations and nomenclature used herein, the detailed descriptions which follow may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical information capable of being stored, transferred, combined, compared, and otherwise manipulated. It proves convenient at times, principally for reasons of common usage, to refer to this "information" as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein which form part of one or more embodiments. Rather, the operations are machine operations. Useful machines for performing operations of various embodiments include general purpose digital computers or similar devices.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives consistent with the claimed subject matter.

FIG. 1 illustrates a block diagram for an automated statistical test system 100. In one embodiment, the automated statistical test system 100 may be implemented as a computer system having a simulation subsystem 120 and a statistical test subsystem 140. The subsystems 120, 140 may each be implemented as a separate or integrated software application comprising one or more components, such as components 122-$a$ as shown for the simulation subsystem 120 in FIG. 1. Although the automated statistical test system 100 shown in FIG. 1 has a limited number of elements in a certain topology, it may be appreciated that the automated statistical test system 100 may include more or less elements in alternate topologies as desired for a given implementation.

It is worthy to note that "a" and "b" and "c" and similar designators as used herein are intended to be variables representing any positive integer. Thus, for example, if an implementation sets a value for a=4, then a complete set of components 122-$a$ may include components 122-1, 122-2, 122-3 and 122-4. The embodiments are not limited in this context.

In various embodiments, portions of the automated statistical test system 100 may be implemented as software components comprising computer executable instructions implemented in a given programming language. In one embodiment, for example, the computer executable instructions may be implemented in a specific programming language as developed by SAS® Institute, Inc., Cary, N.C. For instance, the computer executable instructions may be implemented in a procedure referred to herein as HPSIMULATE, which is a procedure suitable for execution within a SAS programming language and computing environment. In such embodiments, the computer executable instructions may follow syntax and semantics associated with HPSIMULATE, as described in more detail with reference to FIG. 34, infra. However, embodiments are not limited to HPSIMULATE, and further, do not need to necessarily follow the syntax and semantics associated with HPSIMULATE. Embodiments are not limited to a particular type of programming language.

As shown in FIG. 1, the automated statistical test system 100 may include two subsystems, a simulation subsystem 120 and a statistical test subsystem 140. The simulation subsystem 120 may generate a computational representation 130 arranged to generate approximate probability distribution 132 for a statistical test 114. The statistical test subsystem 140 may generate statistical significance values for results of the statistical test 114 using an approximate probability distribution 132 generated by the computational representation 130.

The simulation subsystem 120 may be generally arranged to perform a statistical simulation for a variety of statistical tests 114. The statistical test 114 may include any known statistical test as represented by the statistical test function 112. Some examples for the statistical test 114 may include without limitation median test, mode test, R test, means test, t-test for single means, independent t-test, dependent t-test, Wald-Wolfowitz runs test, Kolmogorov Smirnov test, Mann-Whitney U test, sign test, Wilcoxon matched pairs test, alternative to one-way between-groups analysis of variance (ANOVA) test, one-way ANOVA test, Kruskal-Wallis ANOVA test, repeated measures ANOVA test, Friedman ANOVA test, Kendall Concordance test, Pearson product moment correlation test, Spearman correlation test, linear regression test, data mining decision tree tests, neural network tests, nonlinear estimation test, discriminant analysis test, predictor importance test, KPSS unit root test, Shin cointegration test, ERS unit root test, Bai and Perron's multiple structural change tests (e.g., maxF, UDmaxF, WDmaxF, $\sup F_{l+1|l}$, etc.), Im, Pesaran and Shin (2003) panel unit root test, Bhargava, Franzini and Narendranathan (1982) test, generalized Durbin-Watson statistics, generalized Berenblut-Webb statistics for first-order correlation in a fixed effects model, Gourieroux, Holly and Monfort (1982) test for random effects (two way), Johansen's cointegration rank test, and many others. Embodiments are not limited in this context.

The simulation subsystem 120 may be arranged to generate an approximate probability distribution, probability distribution function, or distribution function (collectively referred to herein as an "approximate probability distribution") for the statistics of a statistical test 114. A probability distribution assigns a probability to each measurable subset of possible outcomes of a random experiment, survey, or procedure of statistical inference. A probability distribution can either be univariate or multivariate. A univariate distribution gives the probabilities of a single random variable taking on various alternative values. A multivariate distribution gives probabilities of a random vector (e.g., a set of two or more random variables) taking on various combinations of values.

More particularly, a statistical test 114 is normally based on a "test statistic." In statistical hypothesis testing, a hypothesis test is typically specified in terms of a test statistic, which is a function of the sample. A test statistic is considered as a numerical summary of a data-set that reduces the data to one value that can be used to perform a hypothesis test. In general, a test statistic is selected or defined in such a way as to quantify, within observed data, behaviors that would distinguish the null from the alternative hypothesis where such an alternative is prescribed, or that would characterize the null hypothesis if there is no explicitly stated alternative hypothesis.

An important property of a test statistic is that its sampling distribution under the null hypothesis must be calculable, either exactly or approximately, which allows p-values to be calculated. A test statistic is a function of associated data and a model. Under the assumptions of a null hypothesis and the model the test statistic has an associated "sampling distribution." A sampling distribution refers to a probability distribution for values of the test statistic over hypothetical repeated random samples of the data, for random data samples having the probability distribution assumed for the data by the model and null hypothesis.

In one embodiment, for example, the simulation subsystem 120 attempts to determine and approximate a sampling distribution of a test statistic under an assumed null hypothesis to generate an approximate probability distribution. The simulation subsystem 120 determines an approximate probability distribution for a given set of statistics of a statistical test 114. It is worthy to note that in some embodiments when an approximate probability distribution is said to be associated with a given statistical test 114, it implies that the approximate probability distribution is associated with a set of statistics for the statistical test 114 rather than the statistical test 114 alone.

In various embodiments, a probability distribution may have a "known form" and/or an "unknown form." A probability distribution of a "known form" means that the analytical formula of the cumulative distribution function (CDF) of the distribution can be efficiently computed, for example, the CDF is a closed-form expression, or the CDF can be well approximated in a numerical method. A probability distribution of an "unknown form" means that the analytical formula of the CDF of the distribution is unavailable, or cannot be efficiently computed or approximated by any known numerical method. Accordingly, the probability distribution of an "unknown form" is to be evaluated through simulation.

In various embodiments, the simulation subsystem 120 may be arranged to generate a probability distribution for the statistics of a given statistical test having a known form and/or an unknown form. In one embodiment, for example, a probability distribution for the statistics of a given statistical test 114 is a known form, such as a Gaussian distribution, a log-normal distribution, a discrete uniform distribution, a continuous uniform distribution, and many others. However, the statistics of some statistical tests 114 may follow a probability distribution of unknown form. In such cases, a probability distribution of unknown form may be approximated through empirical measure. An empirical measure is a random measure arising from a particular realization of a (usually finite) sequence of random variables. As such, in another embodiment, the simulation subsystem 120 may generate an approximate probability distribution 132 for the statistics of a given statistical test 114 where a probability distribution for the statistics of the statistical test is an unknown form. This may be particularly useful in those cases where the statistics of a statistical test 114 follow a probability distribution for which no known mathematical formula is available to compute its values and which therefore can only be evaluated through simulation.

The simulation subsystem 120 may receive as input a simulated data function 110 arranged to generate simulated data for a given statistical test 114. The simulation subsystem 120 may further receive as input a statistical test function 112 arranged to perform the statistical test 114. The simulation subsystem 120 may execute the simulated data function 110 to generate simulated data for the statistical test 114, and the statistical test function 112 to simulate statistics from the simulated data, and create a computational representation 130 to generate an approximate probability distribution 132 from the simulated statistics. The computational representation 130 may, for example, be used by another software program at some future time to perform an actual statistical test 114, such as a statistical test subsystem 140. The statistical test subsystem 140 may, for example, perform the statistical test 114 on actual data sets (e.g., organization data, business data, enterprise data, etc.), and generate statistical significance values utilizing one or more approximate probability distributions 132 generated by the computational representation 130.

Examples for an approximate probability distribution 132 may include without limitation an empirical distribution function or empirical CDF. An empirical CDF is a cumulative distribution function associated with an empirical measure of a sample. The simulation subsystem 120 may generate other approximate probability distributions 132 as well using the techniques described herein. The embodiments are not limited in this context.

The simulation subsystem 120 may generate an approximate probability distribution 132 for the statistics of a statistical test 114 where an actual probability distribution for the statistics of the statistical test 114 is of a known or unknown form. For example, when a statistical test 114 has a probability distribution of a known form, the approximate probability distribution 132 may be useful to evaluate or refine the known probability function. In another example, when the statistics of a statistical test 114 follow a probability distribution of an unknown form, the approximate probability distribution 132 may be useful to generate statistical significance values for a statistical test 114. The latter example may be particularly useful in those cases where a statistical test 114 has a level of complexity that makes manual estimation of an approximate probability distribution 132 untenable.

The simulated subsystem 120 may comprise a simulated data component 122-1. The simulated data component 122-1 may be generally arranged to generate simulated data for a statistical test 114 utilizing the simulated data function 110. The simulated data function 110 may be stored as part of a software library. In this way, the simulated data component 122-1 may generate many different types of simulated data for a given statistical test 114, without having to alter or modify instructions for the simulated data component 122-1. Alternatively, the simulated data function 110 may be integrated with the simulated data component 122-1. The simulated data component 122-1 may be described in more detail with reference to FIG. 3, infra.

The simulated subsystem 120 may comprise a statistic simulator component 122-2. The statistic simulator component 122-2 may be generally arranged to simulate statistics for the statistical test 114 from the simulated data utilizing the statistical test function 112. As with the simulated data function 110, the statistical test function 112 may be stored as part of a software library. In this way, the statistic simulator component 122-2 may simulate many different types of statistical tests 114 with a given set of simulated data, without having to alter or modify instructions for the statistic simulator component 122-2. Alternatively, the statistical test function 112 may be integrated with the statistical simulator component 122-2. The statistic simulator component 122-2 may be described in more detail with reference to FIG. 4, infra.

The simulated data function 110 and the statistical test function 112 may be dependent or independent with respect to each other. In one embodiment, the simulated data function 110 and the statistical test function 112 may be complementary, where a simulated data set is specifically tuned for a given statistical test 114. In one embodiment, the simulated data function 110 and the statistical test function 112 may be independently designed.

The statistic simulator component 122-2 may include a simulation control engine 124. In one embodiment, the simulation control engine 124 may be generally arranged to control simulation operations across a distributed computing system. A distributed computing system may comprise, for example, multiple nodes each having one or more processors capable of executing multiple threads, as described in more detail with reference to FIG. 6, infra.

The use of a distributed computing system to generate simulated statistics may be useful for statistical tests 114 that need a larger data set. While simulating a statistic for one specific parameter vector may be relatively easy, simulating statistics for all possible parameter vectors could be computational intensive. As such, a distributed computing system may reduce simulation time.

The simulation control engine 124 may distribute portions of simulated data or simulated statistics across multiple nodes of the distributed computing system in accordance with a column-wise or a column-wise-by-group distribution algorithm, for example. The use of a distributed computing system in general, and the column-wise or column-wise-by-group distribution algorithm in particular, substantially reduces an amount of time needed to perform the simulation. In some cases, an amount of time needed to perform a simulation may be reduced by several orders of magnitude (e.g., years to days or hours), particularly with larger data sets (e.g., terabytes) needed for even moderately complex statistical tests. The simulation control engine 124 may be described in more detail with reference to FIG. 5, infra.

The simulation subsystem 120 may comprise a code generator component 122-3. The code generator component 122-3 may be generally arranged to create a computational representation 130. The computational representation 130 may be arranged to generate an approximate probability distribution 132 for the statistics of a statistical test 114 on a parameter vector from the simulated statistics. The code generator component 122-3 may be described in more detail with reference to FIG. 19, infra.

The computational representation 130 may be created as any software component suitable for execution by a processor circuit. Examples for the computational representation 130 may include without limitation a function, procedure, method, object, source code, object code, assembly code, binary executable file format, simple executable (COM) file, executable file (EXE), portable executable (PE) file, new executable (NE) file, a dynamic-link library (DLL), linear executable (LX) file, mixed linear executable (LE) file, a collection of LE files (W3) file, a compressed collection of LE files (W4) file, or other suitable software structures. The computational representation 130 may be generated in any computer programming language. Embodiments are not limited in this context.

The simulated subsystem 120 may comprise an evaluation component 122-4. The evaluation component 122-4 may be generally arranged to evaluate a computational representation 130 for performance. For instance, the evaluation component 122-4 may receive a computational representation 130 arranged to generate an approximate probability distribution 132 for the statistics of the statistical test 114 on a parameter vector from the simulated statistics. The computational representation 130 may include a simulated data structure with information for one or more estimated CDF curves. The evaluation component 122-4 may perform at least two kinds of evaluations on the computational representation 130.

A first type of evaluation is a performance evaluation. The direct evaluation attempts to determine whether the computational representation 130 performs according to a defined set of criteria. If the computational representation 130 does not meet one or more of the defined set of criteria, the evaluation component 122-4 may determine whether points should be added to the simulated data structure to improve performance of the computational representation 130.

A second type of evaluation is a reduction evaluation. As with the performance evaluation, the reduction evaluation may attempt to determine whether the computational representation 130 performs according to a defined set of criteria. If the computational representation 130 does meet one or more of the defined set of criteria, the evaluation component 122-4 may further determine whether points can be removed from the simulated data structure to give a same or similar level of performance. Removing points from the simulated data structure may reduce a data storage size for the simulated data structure, and a data storage size for a corresponding computational representation 130 having the reduced simulated data structure.

When reduction is possible, the evaluation component 122-4 may attempt to reduce a data storage size for a computational representation 130. The evaluation component 122-4 may evaluate the simulated data structure to determine whether any points in the grid of points is removable from the simulated data structure given a target level of precision. The evaluation component 122-4 may reduce the simulated data structure in accordance with the evaluation to produce a reduced simulated data structure, the reduced simulated data structure to reduce a data storage size for the computational representation 130. In some cases, the reduced simulated data structure may be obtained by lowering a level of precision for the reduced simulated data structure relative to the original simulated data structure. The evaluation component 122-4 may be described in more detail with reference to FIG. 22, infra.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

FIG. 2 illustrates one example of a logic flow 200. The logic flow 200 may be representative of some or all of the operations executed by one or more embodiments described herein, such as the simulation subsystem 120 of the automated statistical test system 100.

In the illustrated embodiment shown in FIG. 2, the logic flow 200 may generate simulated data for a statistical test, the statistics of the statistical test based on parameter vectors to follow a probability distribution of a known or unknown form at block 202. For example, the simulated data component 122-1 may generate simulated data for a statistical test 114, while the statistics of the statistical test 114 based on parameter vectors follow a probability distribution of a known or unknown form. The simulated data component 122-1 may generate the simulated data with a simulated data function 110. In one embodiment, for example, the simulated data function 110 may be designed to generate simulated data for a multiple structural change (maxF) test.

The logic flow 200 may simulate statistics for the parameter vectors from the simulated data, each parameter vector to be represented with a single point in a grid of points at block 204. For example, the statistic simulator component 122-2 may receive simulated data from the simulated data component 122-1, and simulate statistics for a statistical test 114 with a statistical test function 112. In one embodiment, for example, the statistical test function 112 may be designed to implement a multiple structural change (maxF) test.

The statistic simulator component 122-2 may simulate statistics for one or more parameter vectors of the statistical test, each parameter vector to comprise a single point in a grid of points. The statistic simulator component 122-2 may simulate statistics for all given parameter vectors (p) for a statistical test (T) from the simulated data. The statistics of the statistical test T based on a given parameter vector p follow some probability distribution (D). The simulation subsystem 120 may approximate D with simulation. For any given parameter vector p, the statistic simulator component 122-2 can randomly draw a sample $X=\{X_i\}_{i=1}^N$ from D and construct an approximate probability distribution 132 in the form of an empirical CDF $\tilde{T}(p,x)$. The empirical CDF $\tilde{T}(p,x)$ may have a level of precision as measured by a Kolmogorov-Smirnov statistic shown in Equation (1) as follows:

$$\sqrt{N}\sup_{x}\left|\tilde{T}(p,x)-T(p,x)\right|\sim K \qquad \text{Equation (1)}$$

where T(p,x) represents a true unknown CDF, and distribution K is a Kolmogorov distribution and a table of the distribution shows K(3) of almost 1. In accordance with Equation (1), the empirical CDF $\tilde{T}(p,x)$ may have a precision of approximately $1/\sqrt{N}$ and in almost all cases below $3/\sqrt{N}$, where N is the sample size, or the number of simulated statistics, for the given parameter vector p. For example, when N=1,000,000, the precision is about 0.001.

As the statistic simulator component 122-2 may utilize various interpolation techniques to generate approximate probability distributions 132 for one or more parameter vectors for a statistical test 114, each parameter vector may be referred to as a "point" in a grid of points (M) used for interpolation. In this context, for example, the term "point" is a mathematical point within a defined problem space. In one embodiment, for instance, the problem space may comprise a "parameter space" for a statistical test 114, with the parameter space made up of a given set of parameter vectors for the statistical test 114. In other words, a specific value of a parameter vector is a point in the "parameter space" of a mathematical problem. If elements of one or more parameter vectors (e.g., the parameters of the problem) are plotted on Cartesian coordinates, then the parameter vector may be mapped to a point on a graph in a conventional manner.

The logic flow 200 generates quantiles for each point in the grid of points at block 208. For example, the statistic simulator component 122-2 may generate quantiles for each point in the grid of points. Quantiles may refer to data values taken at regular intervals from the cumulative distribution function (CDF) of a random variable. The data values may mark boundaries between consecutive data subsets of an ordered set of data.

The logic flow 200 involves fitting an estimated CDF curve for each point in the grid of points independently from other points in the grid of points using a number of curve parameters to provide a given level of precision at block 210. For example, the statistic simulator component 122-2 may fit an estimated CDF curve for each point in the grid of points independently from other points in the grid of points using a number of curve parameters to provide a given level of precision. Fitting an estimated CDF curve for each point independently can significantly reduce computational resources needed for curve-fitting operations. For instance, in a simple case, the dimension of the point, p, is only 1; that is to say, p is a real number. Rather than fitting estimated CDF curves for all points in the grid of points simultaneously to build an actual three-dimensional surface, $(p,x,\tilde{T}(p,x))$, the statistic simulator component 122-2 fits an estimated curve, $(x,\tilde{T}(p,x))$, for each point p in sequence or parallel, and then combines the estimated curves to form an approximate three-dimensional surface. Although the approximate three-dimensional surface may have a reduced level of precision relative to the actual three-dimensional surface, curve-fitting operations are greatly accelerated and may consume fewer computational resources. Reducing latency may be of particular importance with larger data sets or multi-dimensional parameter vectors needed for some statistical tests.

The statistic simulator component 122-2 may fit an estimated CDF curve for each point in the grid of points using various types of curve-fitting techniques. For instance, the statistic simulator component 122-2 may utilize, for example, a Gaussian mixture model (EM algorithm), a Bernstein-Polynomials mixture model (EM algorithm), or a monotone cubic spline technique. In one embodiment, the statistic simulator component 122-2 may perform curve-fitting utilizing a monotonic cubic spline interpolation technique with beta transformation, as described in more detail with reference to FIG. 18, infra. Embodiments are not limited to this example.

The logic flow 200 may generate a computational representation as source code to interpolate an estimated CDF curve for any point of the statistical test at block 212. For example, the code generator component 122-3 may generate a computational representation 130 as source code to interpolate an estimated CDF curve for any given point of the statistical test 114. In one embodiment, the point may be within the grid of points. In one embodiment, the point may be outside the grid of points. In one embodiment, the point may be entirely disassociated from the grid of points.

In one embodiment, the computational representation 130 may be generated in computer programming language, such as C or C++ for example. However, embodiments are not limited to these particular computer programming languages.

The logic flow 200 may reduce a data storage size for the computation representation at block 214. For example, the evaluation component 122-4 may reduce a data storage size for the computational representation 130 through reduction of various components of the computational representation 130, with a corresponding loss in precision. In one embodiment, the data reduction operations may be described in more detail with reference to FIG. 22, infra. Embodiments are not limited to this example.

The logic flow 200 involves controlling task execution of a distributed computing system using a virtual software class at block 216. For example, the simulation control engine 124 of the statistic simulator component 122-2 may control task execution of a distributed computing system using a virtual software class. In addition, a virtual software class may also be used for other operations of the logic flow 200, including without limitation blocks 202, 208, 210, 212 and 214, for example. A virtual software class may be described in more detail with reference to FIG. 5, infra.

Figure 3:
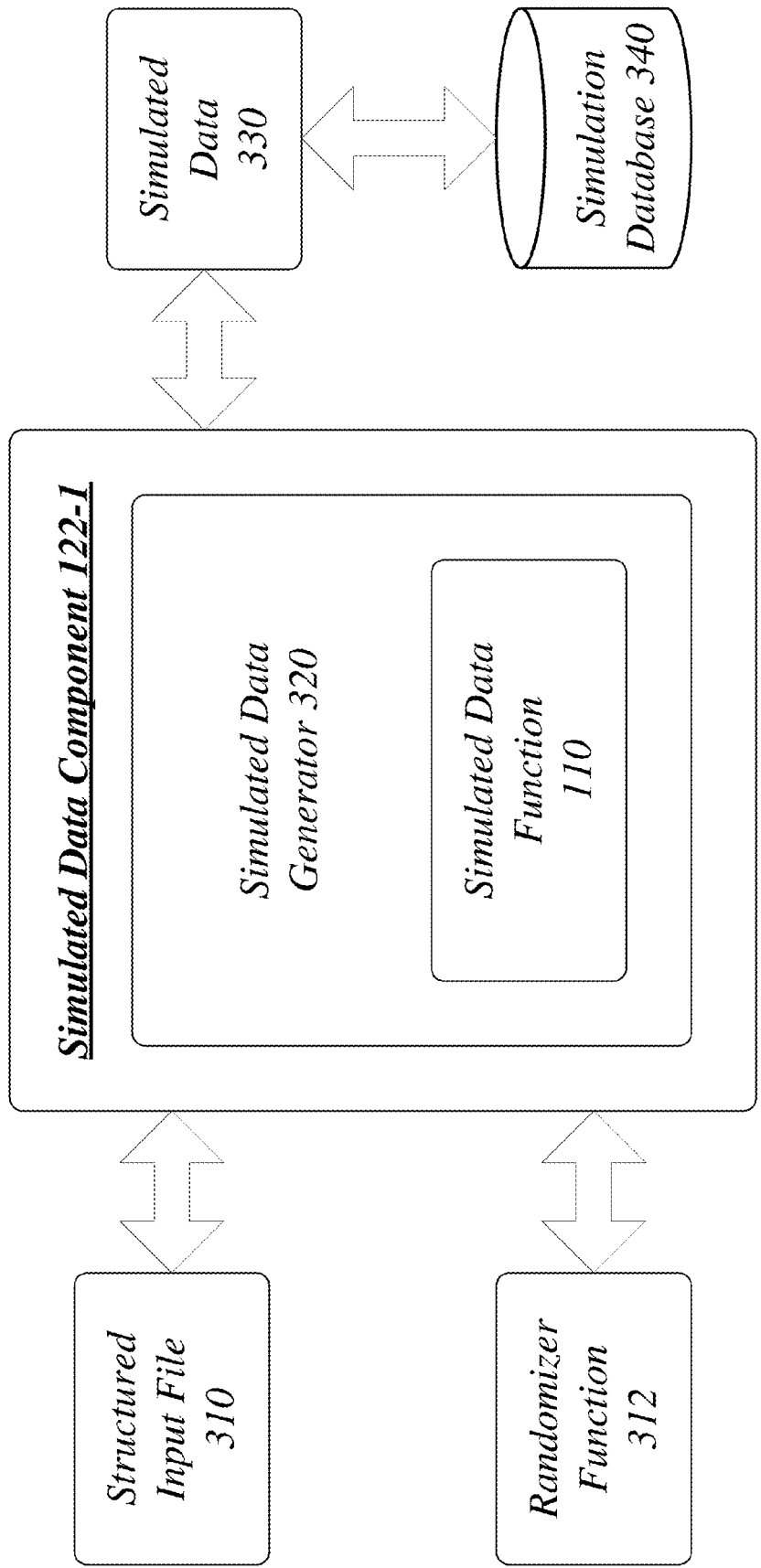
FIG. 3 illustrates an example of a first operational environment.

FIG. 3 illustrates an example of an operational environment 300. The operational environment 300 may illustrate operation of portions of the automated statistical test system 100, such as the simulated data component 122-1, for example.

As shown in FIG. 3, the simulated data component 122-1 may have a simulated data generator 320. In addition to, or as an alternative of, receiving a simulated data function 110, the simulated data generator 320 may receive a structured input file 310 and a randomizer function 312. The structured input file 310 may have definitions to generate simulated data 330. The randomizer function 312 may generate seeds or random numbers (e.g., a random number generator) for the simulated data 330. The simulated data generator 320 may utilize the simulated data function 110, the structured input file 310, and/or the randomizer function 312 to generate the simulated data 330. The simulated data generator 320 may store the simulated data 330 in a simulation database 340. In one embodiment, for example, the simulated data 330 may be stored in the simulation database 340 in accordance with definitions provided by the structured input file 310.

The structured input file 310 may generally comprise one or more input files with data generation specifications and definitions useful for the simulated data component 122-1 to automatically producing simulated data 330. The specifications and definitions may be in addition to, or replacement of, specifications and definitions used by the simulated data function 110. The structured input file 310 may utilize any format as long as the input files are structured in a known and well-defined manner. The structured input file 310 provides information about the simulated data 330 and the simulation database 340, among other types of information. For instance, the structured input file 310 may provide information about a computing environment in which the simulation subsystem 120 will run, a database to store the simulated data 330, data structures for the simulated data 330, table space (e.g., table, columns, rows, indices, etc.), the type of simulated data 330 required by each column of output tables in the simulation database 340, how to generate each type of simulated data 330, relationships between columns in a same table and columns in different tables, and other information pertinent to generating simulated data 330.

A particular number of data sets for the simulated data 330 may be dependent, in part, on a particular type of statistical test 114. In one embodiment, for example, assume the statistical test function 112 is designed to implement a multiple structural change (maxF) test. For example, in order to have a 3-digit precision, the simulated data generator 320 may need to generate a sufficient number of data sets to calculate approximately 1,000,000 statistics for each point in a defined grid of points.

Figure 4:
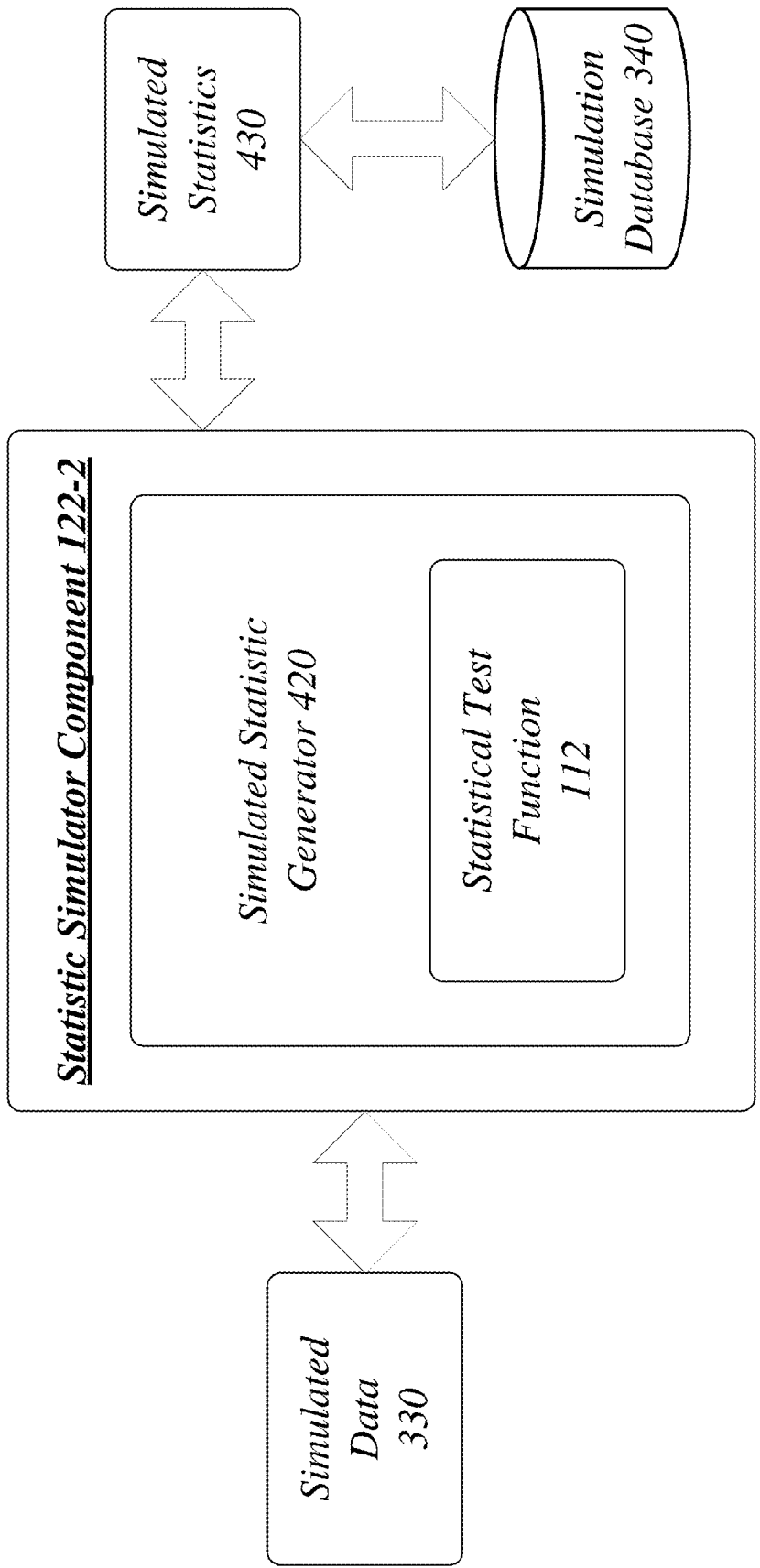
FIG. 4 illustrates an example of a second operational environment.

FIG. 4 illustrates an example of an operational environment 400. The operational environment 400 may illustrate the operation of portions of the automated statistical test system 100, such as the statistic simulator component 122-2, for example.

As shown in FIG. 4, the statistic simulator component 122-2 may include a simulated statistic generator 420. The simulated statistic generator 420 may receive simulated data 330 generated by the simulated data component 122-1, and use (e.g., call) the statistical test function 112 to generate a set of simulated statistics 430 for a statistical test 114 with the simulated data 330. As with the simulated data 330, the simulated statistics 430 may be stored in the simulation database 340, or a separate database entirely.

The statistic simulator component 122-2 may generate the simulated statistics 430 in different ways using various types of computer systems, including a centralized computing system and a distributed computing system. The statistic simulator component 122-2 may specify and control a particular computer system used for simulation through the simulation control engine 124.

The statistic simulator component 122-2 may generate the simulated statistics using an exemplary procedure, as follows:

```
PROC HPSIMULATE
        data=scbpParms /* table containing simulation parameters */
        datadist=(COPYTONODES);
    MODULE name=SCBP
        ext=tkscbp /* TK Extension to plug-in */
        var=(T mmax NQ Q1 Q20 NEPS EPS1 - EPS50) /* variables */
        task=0 /* Task : Simulation */
        taskParmN=(1000000 /*number of replications*/
        6000000 /*random seed */ );
    OUTPUT out=scbpSimulation;
    PERFORMANCE nnodes=200 nthreads=6;
RUN.
```

The statistic simulator component 122-2 is not limited to this example.

Figure 5:
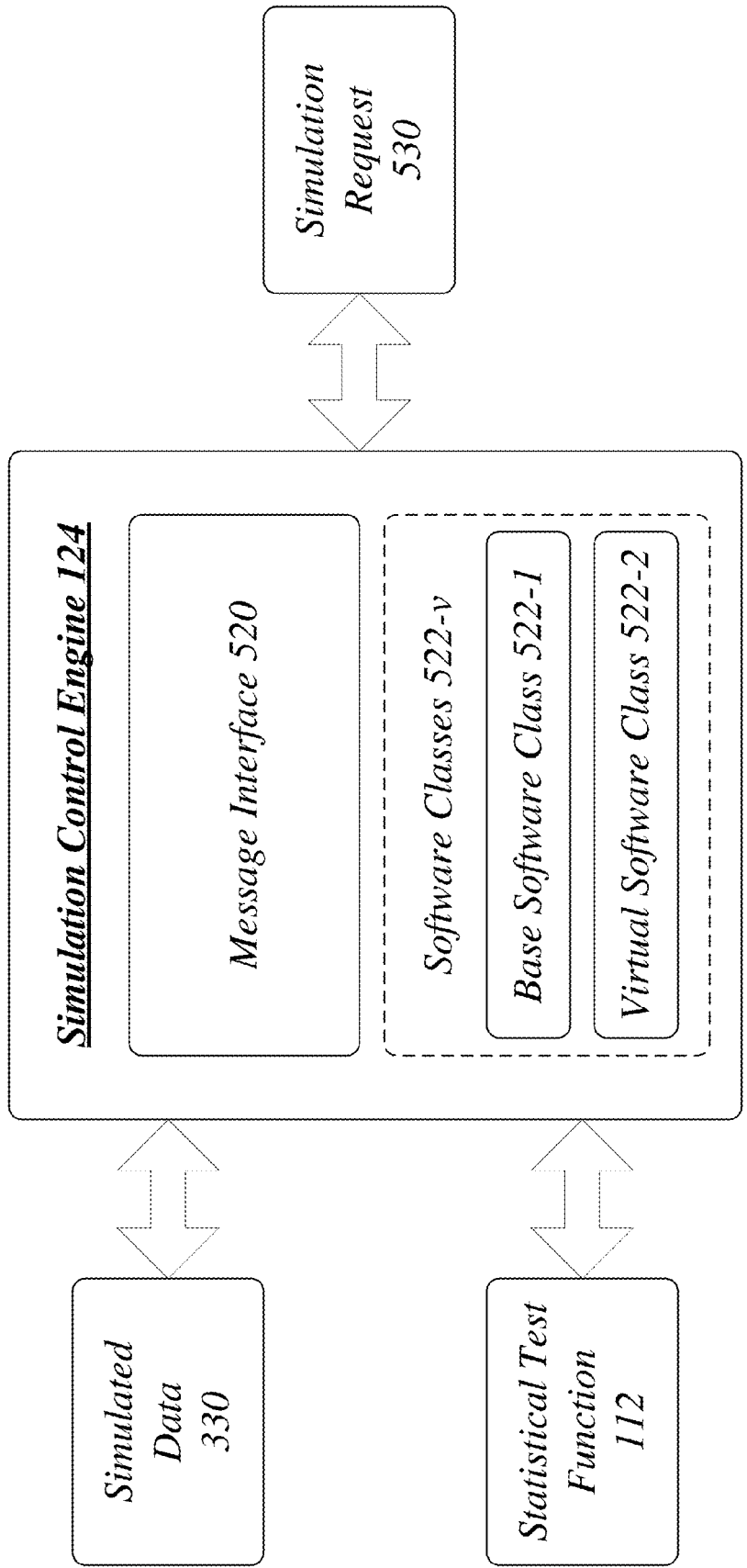
FIG. 5 illustrates an example of a third operational environment.

FIG. 5 illustrates an example of an operational environment 500. The operational environment 500 may illustrate operation of portions of the automated statistical test system 100, such as the simulation control engine 124 of the statistical simulator component 122-2, for example.

As shown in FIG. 5, the simulation control engine 124 may include a message interface 520. The message interface 520 may receive the simulated data 330 from the simulated data component 122-1, or retrieve the simulated data 330 from the simulation database 340, and generate a simulation request 530. The simulation request 530 may be a request to generate simulated statistics 430 from the simulated data 330 using the statistical test function 112.

The simulation request 530 may include various types of information about the statistical test 114, as well as information about a computing environment suitable for generating the simulated statistics 430. Examples of computing environment information may include without limitation a name, description, speed requirements, power requirements, operating system requirements, database requirements, computing parameters, communications parameters, security parameters, and so forth. Depending on a particular statistical test 114, the computing environment information may specify a configuration for a computer system having different combinations of computation resources, such as a number of servers, server types, processor circuits, processor cores, processing threads, memory units, memory types, and so forth. For example, the computer environment information may request a single computer with a single processor and a single thread, a single computer with a single processor and multiple threads, a single computer with multiple processors (or processing cores) each with a single thread, a single computer with multiple processors (or processing cores) each with multiple threads, multiple computers each with a single processor and a single thread, multiple computers each with a single processor and multiple threads, multiple computers with multiple processors each with a single thread, and multiple computers with multiple processors each with multiple threads, or any combination thereof.

A computing environment for a statistical test simulation may be particularly important when a simulation for a particular statistical test needs a larger set of data, such as in the gigabyte or terabyte range. Enumeration of all possible points could lead to a relatively large grid of points M. Continuing with our previous example of a multiple structural change (maxF) test, in order to have 3-digit precision, the simulated data generator 320 may need to generate a sufficient number of data sets to simulate approximately 1,000,000 statistics for each point in a defined grid of points. Assuming a number of variables is limited to less than 20, a possible number of structural changes is limited to less than 19, and a number of observations is 2,000 to approximate an asymptotic case, a defined grid of points for the maxF test would contain approximately 103,780 points (parameter vectors). To simulate 1,000,000 statistics for each of 103,780 points on a single processor, at roughly 0.001 seconds per statistic, would take approximately 1,200 days. Alternatively, executing 1,000,000 statistics for each of 103,780 points on 1200 processors, at roughly 0.001 seconds per statistic, would take approximately 1 day. For a computational task of this size, the message interface 520 may generate a simulation request 530 with computer environment information specifying a need for distributed computations in a distributed computing environment having multiple computers with multiple processors each with multiple threads operating in a parallel processing manner.

In one embodiment, the simulation control engine 124 may distribute portions of the simulated data 330 across various parts of a distributed computing environment, and control generation of simulated statistics 430 within the distributed computing environment, through use of one or more software classes 522-$v$. In object-oriented programming, a software class may be referred to as an extensible template for creating objects, providing initial values for state (e.g., member variables) and implementations of behavior (e.g., member functions, methods). In many computer programming languages, a class name may be used as a name for a class (e.g., the template itself), the name for the default constructor of the class (e.g., a subroutine that creates objects), and as the type of objects generated by the type. Typically, when an object is created by a constructor of the class, the resulting object may be called an instance of the class, and the member variables specific to the object may be called instance variables, to contrast with the class variables shared across the entire class.

As shown in FIG. 5, the software classes 522-$v$ are specifically designed to perform simulations of a statistical test 114 in a distributed computing environment. The software classes 522-$v$ may include at least a base software class 522-1 for a statistical test 114 and a virtual software class 522-2 for managing the simulation of a statistical test. In one embodiment, for example, a base software class 522-1 may be implemented as a TK-extension class. In one embodiment, for example, a virtual software class 522-2 may be implemented as a virtual TK-extension class (TKVRT). Embodiments, however, are not limited to these examples.

The base software class 522-1 may include an extensible template to create objects, provide initial values for states, and implementations of behavior for use by a software module to perform a statistical test. The virtual software class 522-2 may include an extensible template to create objects, provide initial values for states, and implementations of behavior for use by the separate software module having a base software class 522-1 for the statistical test, the base software class 522-1 to comprise a child of the virtual software class 522-2. The virtual software class 522-2 may be used to extend the base software class 522-1 when used with a particular computing system, such as a distributed computing system. This allows standard statistical test code using the base software class 522-1 to take advantage of parallel processing algorithms implemented by the distributed computing environment, without having to make modifications to the base software class 522-1. The software classes 522-*v* may be described in more detail with reference to FIGS. 8-11, infra.

Figure 6:
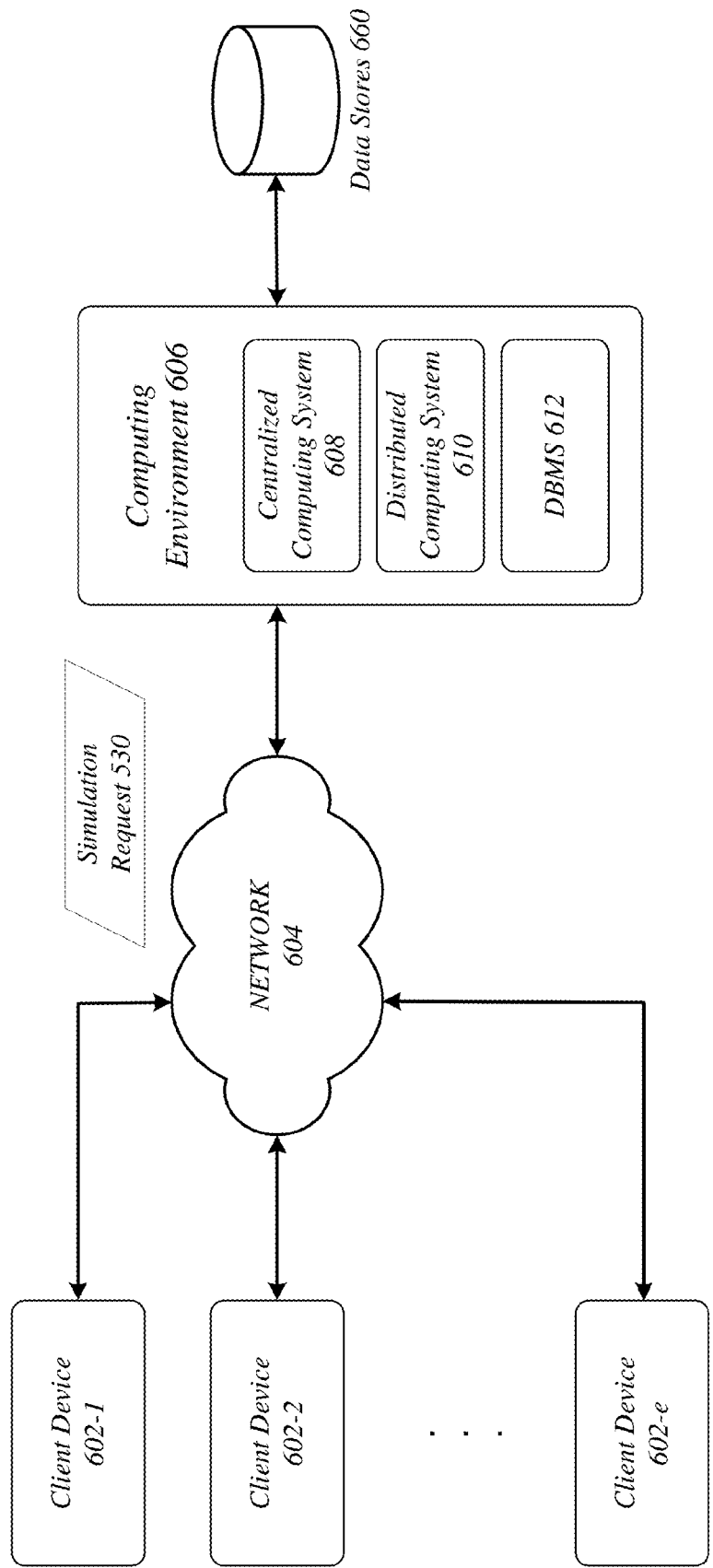
FIG. 6 illustrates an example of a computing system.

FIG. 6 illustrates a diagram for a computing system 600. The computing system 600 may be representative of a computing system suitable for implementing the automated statistical test system 100.

As shown in FIG. 6, the computing system 600 includes a computing environment 606 designed for processing large amounts of data for many different types of applications, such as for scientific, technical or business applications that require a greater number of computer processing cycles. The computing environment 606 may include different types of computing systems, such as a centralized computing system 608 and a distributed computing system 610. Client devices 602-1, 602-2, through 602-*e* can interact with the computing environment 606 through a number of ways, such as over a network 604, where e may be any positive integer. The network 604 may comprise a public network (e.g., the Internet), a private network (e.g., an intranet), or some combination thereof.

One or more data stores 660 are used to store the data to be processed by the computing environment 606 as well as any intermediate or final data generated by the computing system in non-volatile memory. However in certain embodiments, the configuration of the computing environment 606 allows its operations to be performed such that intermediate and final data results can be stored solely in volatile memory (e.g., RAM), without a requirement that intermediate or final data results be stored to non-volatile types of memory (e.g., disk).

This can be useful in certain situations, such as when the computing environment 606 receives ad hoc queries from a user and when responses, which are generated by processing large amounts of data, need to be generated on-the-fly (e.g., in real time). In this non-limiting situation, the computing environment 606 is configured to retain the processed information within memory so that responses can be generated for the user at different levels of detail as well as allow a user to interactively query against this information.

A client device 602-*e* may implement portions of the automated statistical test system 100, such as the simulation subsystem 120, for example. When the simulation subsystem 120 executes, and the statistic simulator component 122-2 initiates simulation operations, the simulation control engine 124 of the statistic simulator component 122-2 may generate a simulation request 530 and send the simulation request 530 to the computing environment 606 via the network 604. The computing environment 606 may receive the simulation request 530, and when the simulation request 530 indicates a need for centralized computations, the computing environment 606 may forward the simulation request 530 to the centralized computing system 608 for simulation operations. When the simulation request 530 indicates a need for distributed computations (e.g., parallel processing operations), the computing environment 606 may forward the simulation request 530 to the distributed computing system 610 for simulation operations. The computing systems 608, 610 may be integrated with, or capable of interaction with, a database management system (DBMS) 612 used to control and manage interaction with the data stores 660. The data stores 660 may include, for example, the simulation database 340, as well as other data needed for a given simulation.

Figure 7:
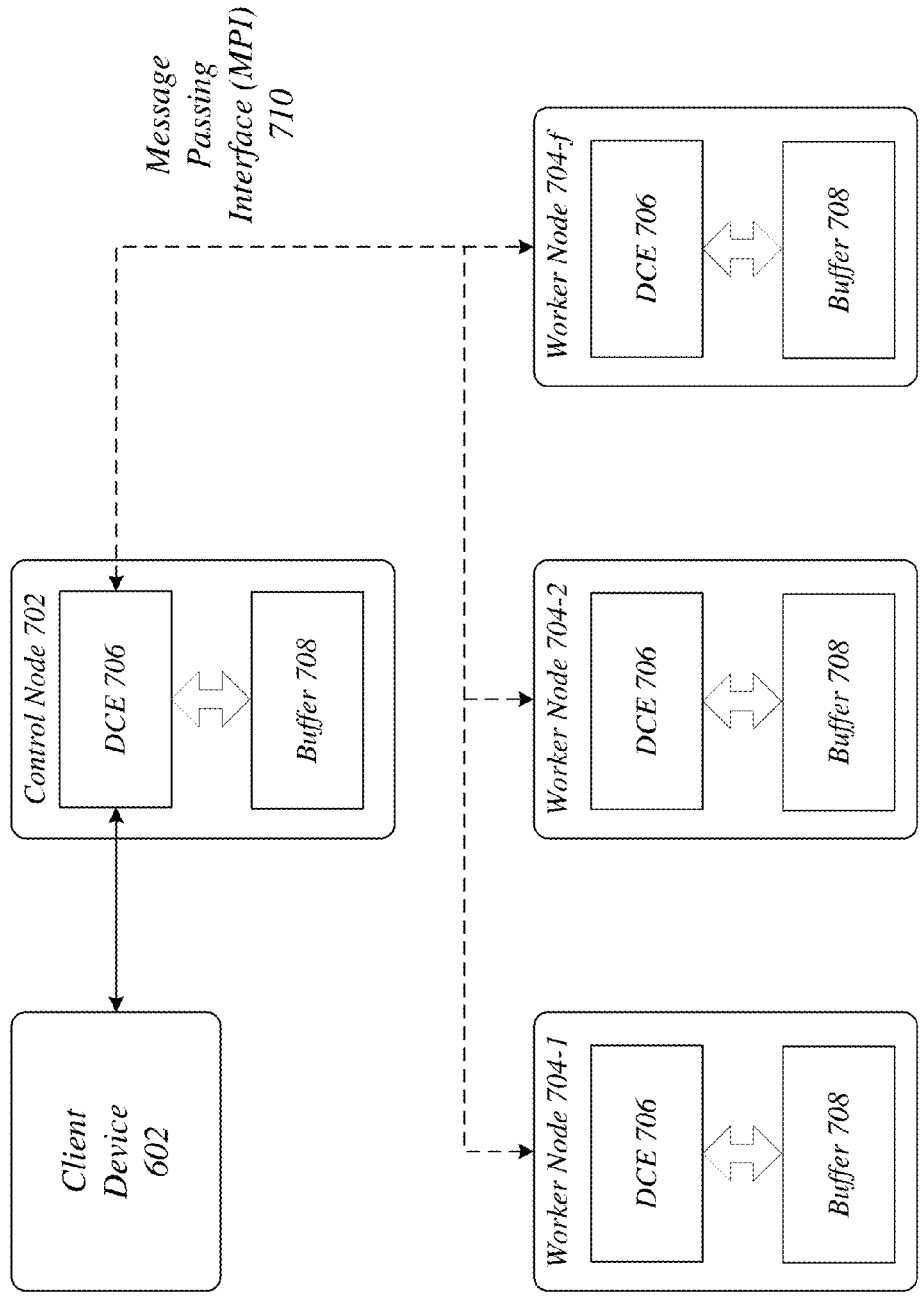
FIG. 7 illustrates an example of a distributed computing system.

FIG. 7 illustrates a diagram of a distributed computing system 610. The distributed computing system 610 may include one or more client devices, such as client device 602, control node 702 and one or more work nodes 704-1 through 704-*f*, where f may be any positive integer. The control node 702 and worker nodes 704-1 through 704-*f* may have any of the computer system configurations as described with reference to FIG. 5.

The statistic simulator component 122-2 may simulate statistics with the distributed computing system 610 via the simulation control engine 124. In one embodiment, the distributed computing system 610 may comprise multiple data processing nodes each having multi-core data processors, with at least one of the data processing nodes designated as a control data processing node ("control node") and multiple data processing nodes designated as worker data processing nodes ("worker node").

The client device 602 may couple to a central process, or control node 702, which, in turn, is coupled to one or more worker nodes 704-1 through 704-*f*. In general, each of the nodes of the distributed computing system 610, including the control node 702, and worker nodes 704-1 through 704-*f*, may include a distributed computing engine (DCE) 706 that executes on a data processor associated with that node and interfaces with buffer memory 708 also associated with that node. The DCE 706 may comprise an instance of the distributed computing engine 124 of the statistical simulator component 122-2 of the simulation subsystem 120. Each of the nodes may also optionally include an interface to the DBMS 612 and the data stores 660, or local implementations of both (not shown).

In various embodiments, the control node 702 may manage operations in one or more of the worker nodes 704-1 through 704-*f*. More particularly, the control node 702 may be arranged to receive and process a simulation request 530 from the client device 602 when distributed computations are to be performed with data stored in one or more of the worker nodes 704-1 through 704-*f*.

In various embodiments, one or more of the components of distributed computing system 610 may be collocated, including the client device 602, control node 702, and one or more worker nodes 704-1 through 704-*f*. However, more generally, none of the components of distributed computing system 610 need be collocated. Furthermore, in some embodiments, more than one node of the distributed computing system 610 may be arranged to assume the role of the control node. Thus, in some scenarios, the component designated as the control node 702 may assume the role of a worker node, while one of the worker nodes 704-1 to 704-*f* may assume the role of the control node 702.

In various embodiments, in operation a simulation request 530 may be received by the control node 702 to simulate data and/or statistics for a statistical test, as described previously with respect to FIG. 1. For example, the client device 602 may generate a simulation request 530 to perform a statistical test simulation, which is processed by the control node 702 to construct work requests to be performed by one or more worker nodes 704-1 through 704-f.

In particular embodiments, a simulation request 530 generated by client device 602 may be received with a name for the distributed computing system 610 to process the simulation request 530. Accordingly, when the distributed computing system 610 is designated, the simulation request 530 is transmitted to control node 702.

Consistent with the present embodiments, when the control node 702 receives a simulation request 530 sent from the client device 602, the control node 702 may unpack the simulation request 530, parse the simulation request 530, and establish a flow of execution steps to perform an operation such as an simulating statistics using one or more worker nodes 704-1 through 704-f of the distributed computing system 610.

As illustrated in FIG. 7, the distributed computing system 610 may further include a communication protocol such as the message passing interface (MPI) 710. When the control node 702 establishes a flow of execution for a simulation request 530, the control node 702 may distribute the execution steps to worker nodes 704-1 to 704-f via the message passing interface 710. Subsequently, results may be returned from one or more worker nodes 704-1 to 704-f to the control node 702 via the message passing interface 710.

In various embodiments, each of multiple worker nodes 704-1 to 704-f may contain a respective partition of data to be processed according to the compute request. The control node 702 may establish an execution flow in which messages are sent to multiple different worker nodes 704-1 to 704-f. Each worker node 704-1 to 704-f may subsequently load and execute a specified simulation function for the partition of data contained by that worker node.

When each of the worker nodes 704-1 to 704-f, that receives a message to execute a simulation function from control node 702, completes execution of its specified simulation function on its partition of data, the one or more worker nodes 704-1 through 704-f may return results to the control node 702 through the message passing interface 710. The results may subsequently be returned from the control node 702 to the client device 602 that generated the simulation request 530.

Although FIG. 7 illustrates a distributed database network that comprises a control node 702 and multiple worker nodes 704-f, more general embodiments include any network in which an interface is provided so that a client device may initiate the execution of a compute request within a group of foreign machines, utilize resources of the foreign machines, including memory, input/output functionality, loading of images, launching of threads, and/or utilize a distributed database structure to send and receive message instructions and results.

FIG. 8 illustrates one example of a logic flow 800. The logic flow 800 may be representative of some or all of the operations executed by one or more embodiments described herein, such as the statistical simulator component 122-2 of the simulation subsystem 120 of the automated statistical test system 100.

In the illustrated embodiment shown in FIG. 8, the logic flow 800 may generate simulated data for a statistical test, the statistics of the statistical test based on parameter vectors to follow a probability distribution of a known or unknown form at block 802. For example, the simulated data component 122-1 may generate simulated data 330 for a statistical test 114, the statistical test 114 based on parameter vectors (points) to follow a probability distribution.

The logic flow 800 may simulate statistics for the parameter vectors from the simulated data with a distributed computing system comprising multiple nodes each having one or more processors capable of executing multiple threads, the simulation to occur by distribution of portions of the simulated data across the multiple nodes of the distributed computing system at block 804. For example, the simulated data generator 320 of the statistic simulator component 122-2 may simulate statistics for parameter vectors from the simulated data 330, where each parameter vector to comprise a single point in a grid of points. The simulation may be performed using a distributed computing system 610 comprising a control node 702 and one or more worker nodes 704-1 through 704-f, each having one or more processors capable of executing multiple threads. The simulation may occur by distribution of portions of the simulated data 330 across the control node 702 and the one or more worker nodes 704-1 through 704-f of the distributed computing system 610.

The logic flow 800 may control task execution on the distributed portions of the simulated data on each node of the distributed computing system with a virtual software class arranged to coordinate task and sub-task operations across the nodes of the distributed computing system at block 806. For example, the simulation control engine 124 of the statistical simulator component 122-2 may control task execution to simulate statistics 430 from the distributed portions of the simulated data 330 on each control node 702 and one or more worker nodes 704-1 through 704-f of the distributed computing system 610 with a virtual software class 522-2 arranged to assist in coordinating task and sub-task operations across the control node 702 and the one or more worker nodes 704-1 through 704-f of the distributed computing system 610.

Figure 9:
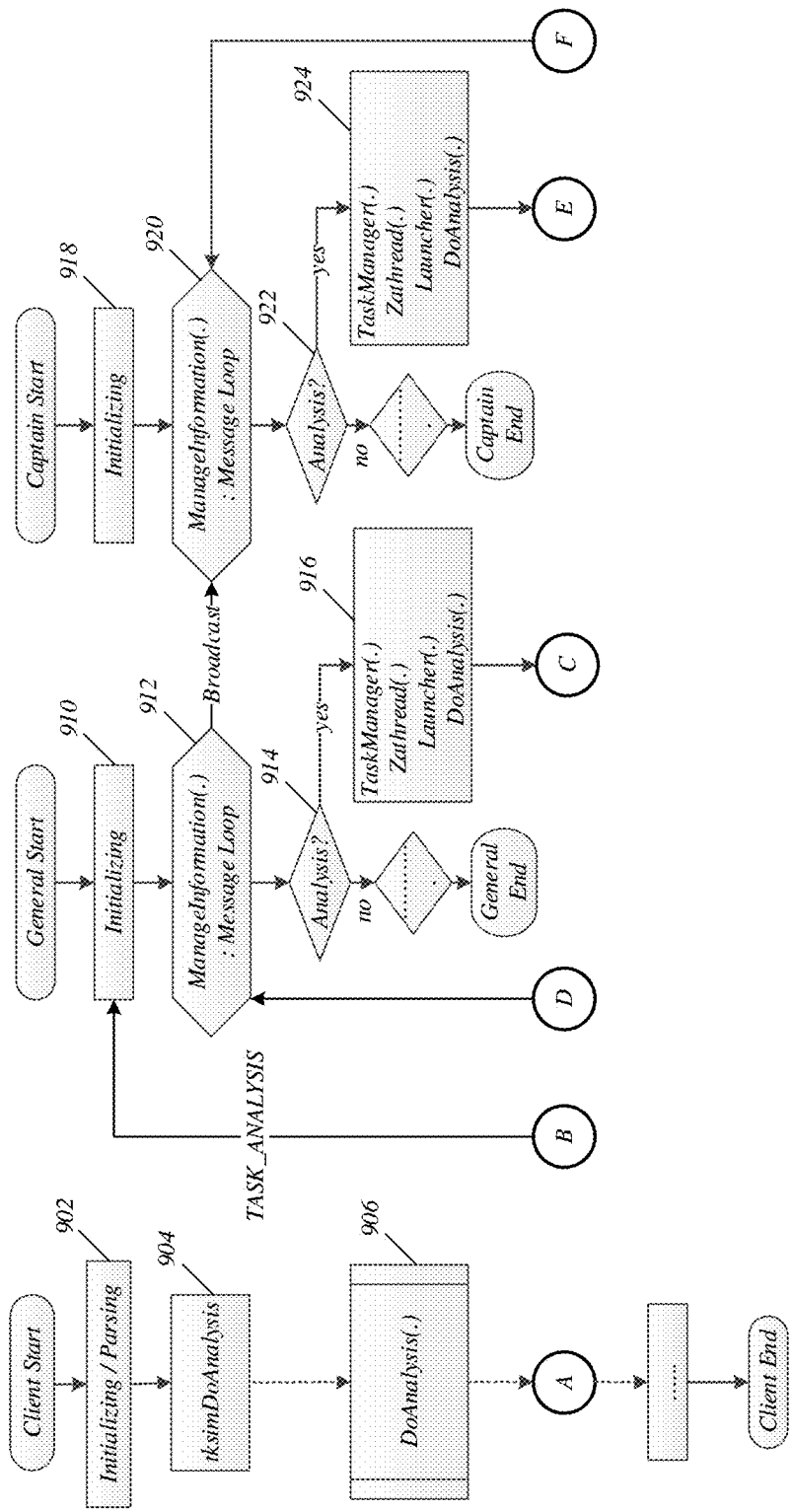
FIG. 9 illustrates an example of a third logic flow for a simulation subsystem.

FIG. 9 illustrates one example of a logic flow 900. The logic flow 900 may be representative of some or all of the operations executed by one or more embodiments described herein, such as the simulation control engine 124 of the statistical simulator component 122-2 of the simulation subsystem 120 of the automated statistical test system 100, on the distributed computing system 610. More particularly, logic flow 900 illustrates the simulation control engine 124 creating an instance of a virtual software class 522-2 on one or more nodes of the distributed computing system 610.

In some cases, simulation tasks may be implemented by control node 702 and one or more worker nodes 704-1 through 704-f arranged in soloist architecture or a general/captain architecture. In a soloist architecture, simulations may be performed by a centralized computing system 608. In a general/captain architecture, simulations may be performed by a distributed computing system 610, where a control node 702 is designated as a general node, and one or more worker nodes 704-1 through 704-f may be designated as captain nodes.

As shown in FIG. 9, the logic flow 900 may perform initializing and parsing operations at block 902. A call to an instance of software class tksimDoAnalysis may be made to initiate task analysis at block 904. A subroutine named DoAnalysis(.) to perform the task analysis may be executed at block 906. Control is passed at point A.

When in a general/captain mode, control is passed at point B to the general node, a subroutine for task initialization may be executed at block 910. At general start, a subroutine named ManageInformation(.): Message Loop may be executed at block 912. A test whether the task is analysis is performed at diamond 914. If the test is not passed, various clean up procedures are called and general processing terminates. If the test is passed, subroutines TaskManager(.), Zathread(.), Launcher(.) and DoAnalysis(.) are executed in a recursive manner at block 916. Control is passed at point C. Control is returned to the general node at point D.

The ManageInformation(.): Message Loop executed at block 912 may broadcast instructions to one or more captain nodes. The captain nodes perform operations similar to the general node for portions of the simulation. For instance, at captain start, an initialization may be executed at block 918 and a subroutine named ManageInformation(.): Message Loop may be executed at block 920. A test whether the task is analysis is performed at diamond 922. If the test is not passed, various clean up procedures are called and captain processing terminates. If the test is passed, subroutines TaskManager(.), Zathread(.), Launcher(.) and DoAnalysis(.) are executed in a recursive manner at block 924. Control is passed at point E. Control is returned to the captain node at point F.

Figure 10:
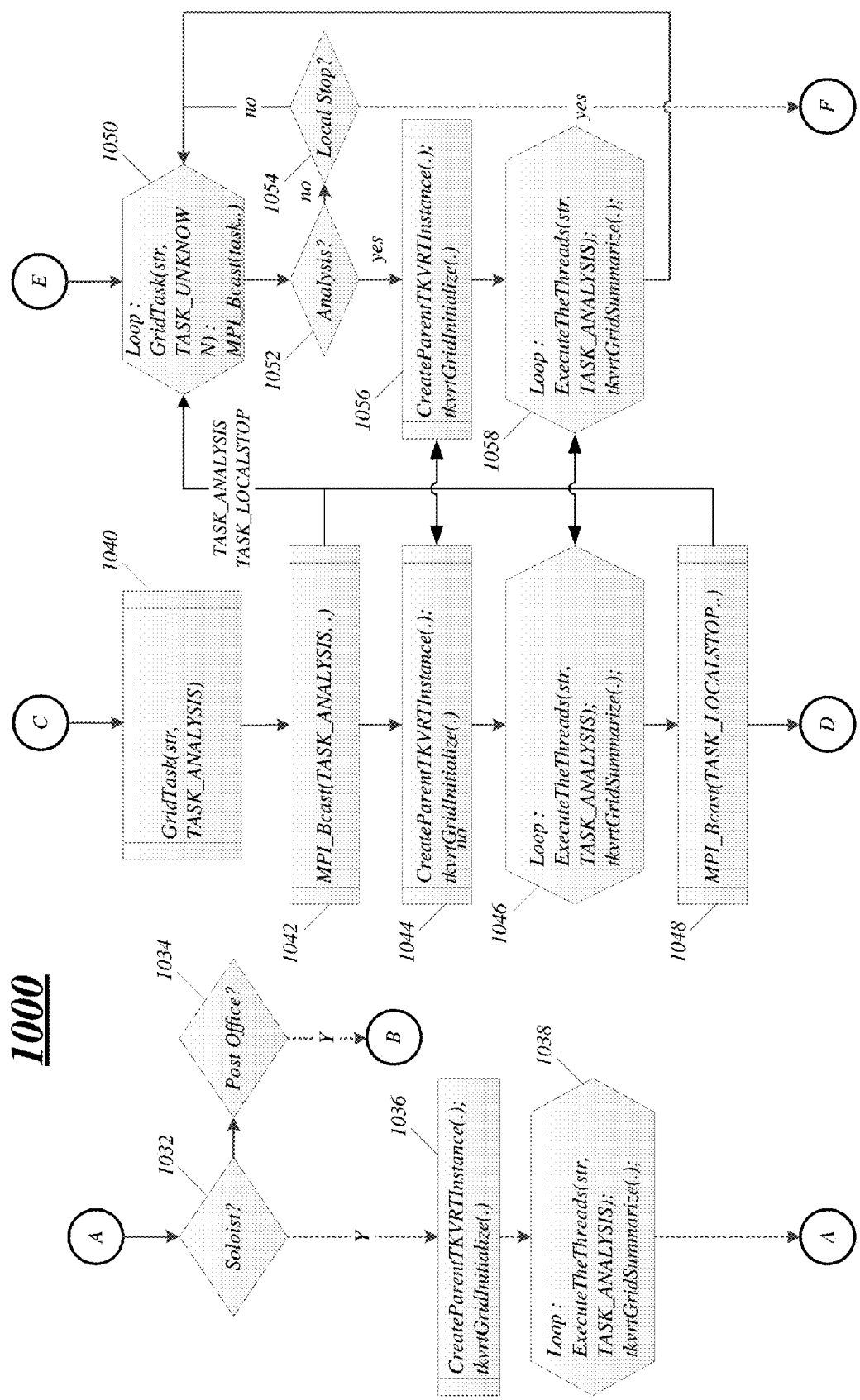
FIG. 10 illustrates an example of a fourth logic flow for a simulation subsystem.

FIG. 10 illustrates one example of a logic flow 1000. The logic flow 1000 may be representative of some or all of the operations executed by one or more embodiments described herein, such as the simulation control engine 124 of the statistical simulator component 122-2 of the simulation subsystem 120 of the automated statistical test system 100. More particularly, the logic flow 1000 interoperates with the logic flow 900 at the various control locations A-F.

As shown in the logic flow 1000, when control is passed at control location A from the logic flow 900, a determination is made as to whether task analysis is to be performed in a soloist architecture or a general/captain architecture at diamond 1032. If a soloist architecture, then subroutines CreateParentTKVRTInstance(.) and tkvrtGridInitialize(.) are executed at block 1036. A loop starts to execute subroutines ExecuteTheThreads(str, TASK_ANALYSIS) and tkvrtGridSummarize(.) at block 1038. Control is passed at point A. If not a soloist architecture, then a determination is made as to whether task analysis is to be performed in a general/captain architecture at diamond 1034. If a general/captain architecture, then control is passed at control location B to the logic flow 900.

When control is passed at control location C from the logic flow 900, the general node may execute a subroutine GridTask(str, TASK_ANALYSIS) at block 1040, a subroutine MPI_Bcast(TASK_ANALYSIS) at block 1042, and a CreateParentTKVRTInstance(.) and tkvrtGridInitialize(.) at block 1044. A loop starts to execute subroutines ExecuteTheThreads(str, TASK_ANALYSIS) and tkvrtGridSummarize (.) at block 1046. Once the loop completes, the general node executes a subroutine MPI_Bcast(TASK_LOCALSTOP,.) at block 1048. Parameters TASK_ANALYSIS and/or TASK_LOCALSTOP are passed to the block 1050, and control is passed at control location D to the logic flow 900.

Certain subroutines executed by the general node are designed to interoperate with subroutines executed by the captain node to coordinate completion of tasks and sub-tasks. For instance, when the general node executes subroutines CreateParentTKVRTInstance(.) and tkvrtGridInitialize(.) at block 1044, and the loop at block 1046, messages and parameters may be exchanged in similar subroutines executed by the captain node at corresponding blocks 1056, 1058, respectively, to coordinate task and sub-task completion. Such communication between general node and captain nodes may be necessary for some complex algorithms; however, for algorithms in which the tasks and sub-tasks are independent, no such communication is needed and execution cost is saved.

When control is passed at control location E from the logic flow 900, the captain node may start a loop to execute subroutines GridTask(str, TASK_UNKNOWN) and MPI_Bcast(task,.) at block 1050. A determination is made as to whether analysis is complete at diamond 1052 using the TASK_ANALYSIS parameter. If the TASK_ANALYSIS parameter is evaluated as TRUE, the subroutines at blocks 1056, 1058 are executed, and control is passed back to block 1050. If the TASK_ANALYSIS parameter is evaluated as FALSE, a determination is made as to whether a local stop has occurred at diamond 1054 using the TASK_LOCALSTOP parameter. If the TASK_LOCALSTOP parameter is evaluated as TRUE, control is passed at control location F. If the TASK_LOCALSTOP parameter is evaluated as FALSE, control is passed back to block 1050.

Figure 11:
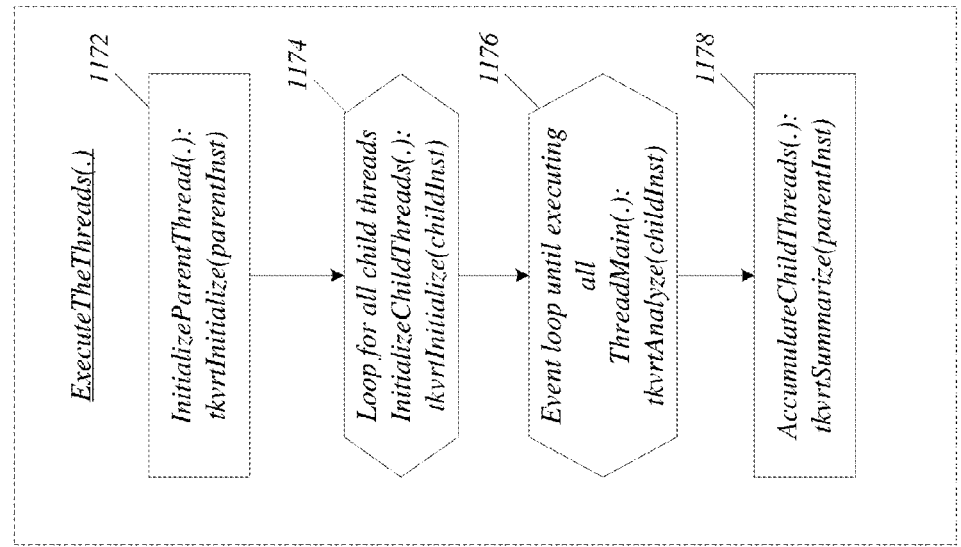
FIG. 11 illustrates an example of a fifth logic flow for a simulation subsystem.

FIG. 11 illustrates one example of a logic flow 1100, which shows how to finish the tasks and sub-tasks in parallel in the multithread environment. The logic flow 1100 may be representative of some or all of the operations executed by one or more embodiments described herein, such as the simulation control engine 124 of the statistical simulator component 122-2 of the simulation subsystem 120 of the automated statistical test system 100. More particularly, the logic flow 1100 illustrates certain operations for subroutines executed at blocks 1038, 1046 and 1058 of the logic flow 1000.

As shown in the logic flow 1100, when the subroutine ExecuteTheThreads(.) is executed at blocks 1038, 1046 and 1058 of the logic flow 1000, thread execution 1170 executes subroutines InitializeParentThread(.) and tkvrtInitialize(parentInst) at block 1172. The thread execution 1170 then starts a Loop for all child to execute subroutines threadsInitializeChildThreads(.) and tkvrtInitialize(childInst) at block 1174. The thread execution 1170 then starts an event loop to execute subroutines InitializeChildThreads(.) and tkvrtInitialize(childInst) at block 1176. The thread execution 1170 then executes subroutines AccumulateChildThreads(.) and tkvrtSummarize(parentInst) at block 1178.

In one embodiment, the simulation control engine 124 may control thread execution 1170 for each control node 702 and worker nodes 704-1 through 704-f of the distributed computing system 610 with a various instances of a virtual software class 522-2. The virtual software class 522-2 may be arranged to control task operations across the control node 702 and worker nodes 704-1 through 704-f of the distributed computing system 610 while reducing dependency between tasks and sub-tasks. The logic flow 1100 illustrates an example for a virtual software class 522-2 called TKVRT extension 1180.

In various embodiments, the simulation control engine 124 may pass or receive one or more virtual software class parameters for each instance of a virtual software class, the one or more parameters comprising at least one of input/output parameters, input/output tables, or a pointer to list all instances of virtual software class parameters. For instance, with respect to TKVRT extension 1180, the simulation control engine 124 may pass or receive one or more virtual software class parameters for each instance of TKVRT, including tkvrtParmsPtr, input/output parameters, input/output tables, and a pointer to list all instances of tkvrtParmPtrs at block 1182. The TKVRT extension 1180 may also include several subroutines as used in logic flow 900, 1000.

In one embodiment, the simulation control engine 124 may initialize a parent thread with parent parameters with a first instance of the virtual software class TKVRT extension 1180, which includes tkvrtinitialize(parentinst) as shown in block 1184.

In one embodiment, the simulation control engine 124 may initialize a child thread with child parameters with a first instance of the virtual software class TKVRT extension 1180, which includes tkvrtinitialize(childinst) as also shown in block 1184.

In one embodiment, the simulation control engine 124 may analyze work results of a child thread with a second instance of the virtual software class TKVRT extension 1180, which includes tkvrtAnalyze(childInst) as shown in block 1186.

In one embodiment, the simulation control engine 124 may summarize work results of a child thread to a parent thread with a third instance of the virtual software class TKVRT extension 1180, which includes tkvrtSummarize (parentInst) as shown in block 1188.

In one embodiment, the simulation control engine 124 may initialize a grid with parent parameters with a fourth instance of the virtual software class TKVRT extension 1180, which includes tkvrtGridInitialize(parentInst) as shown in block 1190.

In one embodiment, the simulation control engine 124 may summarize a grid with parent parameters with a fifth instance of the virtual software class TKVRT extension 1180, which includes tkvrtGridSummarize(parentInst) as shown in block 1192.

It may be appreciated that these are merely a few example subroutines for the TKVRT extension 1180, and others exist as well. Embodiments are not limited in this context.

FIG. 12 illustrates one example of a logic flow 1200. The logic flow 1200 may be representative of some or all of the operations executed by one or more embodiments described herein, such as the simulation control engine 124 of the statistical simulator component 122-2 of the simulation subsystem 120 of the automated statistical test system 100. More particularly, the logic flow 1200 illustrates distribution algorithms for use with the distributed computing system 610.

As shown in FIG. 12, the logic flow 1200 may generate simulated data for a statistical test, the statistics of the statistical test based on parameter vectors to follow a probability distribution at block 1202. For example, the simulated data component 122-1 may generate simulated data 330 for a statistical test 114, the statistics of the statistical test 114 based on parameter vectors to follow a probability distribution of a known or unknown form.

The logic flow 1200 may simulate statistics for the parameter vectors from the simulated data, each parameter vector to comprise a single point in a grid of points, with a distributed computing system comprising multiple nodes each having one or more processors capable of executing multiple threads, the simulation to occur through distribution of portions of the simulated data or simulated statistics across the multiple nodes of the distributed computing system in accordance with a column-wise or column-wise-by-group distribution algorithm at block 1204. For example, the simulated statistic generator 420 of the statistic simulator component 122-2 may simulate statistics for the parameter vectors from the simulated data 330. Each parameter vector for the statistical test 114 may comprise a single point in a grid of points, with the grid of points to be used for interpolation. The simulation may be performed with a distributed computing system 610 comprising control node 702 and worker nodes 704-1 through 704-*f*. Each of control node 702 and worker nodes 704-1 through 704-*f* may have one or more processors capable of executing multiple threads. The simulation control engine 124 of the statistic simulator component 122-2 may control simulation of the statistical test 114 by distributing portions of the simulated data 330 and/or simulated statistics 430 across the control node 702 and worker nodes 704-1 through 704-*f* of the distributed computing system 610 in accordance with a column-wise or column-wise-by-group distribution algorithm. A column-wise or column-wise-by-group distribution algorithm may be described in more detail with reference to FIGS. 13-17, infra.

The logic flow 1200 may create a computational representation arranged to generate an approximate probability distribution for each point in the grid of points from the simulated statistics, the approximate probability distribution to comprise an empirical cumulative distribution function (CDF) at block 1206. For example, the code generator component 122-3 may create a computational representation 130, such as a DLL file. The computational representation 130 may be arranged to generate an approximate probability distribution 132 for each point in the grid of points from the simulated statistics 430. The approximate probability distribution 132 may comprise an empirical CDF, for example.

FIG. 13 illustrates an example of a simulated data structure 1300. The simulated data structure 1300 may be a software data structure arranged to store simulated data 330 and/or simulated statistics 430 in the simulation database 340.

The statistic simulator component 122-2 may generate the simulated data structure 1300. In one embodiment, the statistic simulator component 122-2 may generate the simulated data structure 1300 as a table. The simulated data structure 1300 may include an ordered arrangement of rows 1302-*g* and columns 1304-*h* to form multiple cells 1306-*i*, where g, h and i may be any positive integer. A cell 1306-*i* may contain a simulation of a simulated statistic 430 (or simulated data 330) for a point in the grid of points, where each row 1302-*g* represents a simulation of the simulated statistic 430 (or simulated data 330), and each column 1304-*h* represents a point in the grid of points.

When populated, the simulated data structure 1300 may have a defined data storage size for a given statistical test 114. For instance, with the maxF test, the simulated data structure 1300 may comprise 1,000,000 rows and 103,780 columns, which gives the simulated data structure 1300 a data storage size of approximately 800 Gigabytes (GB).

Figure 14:
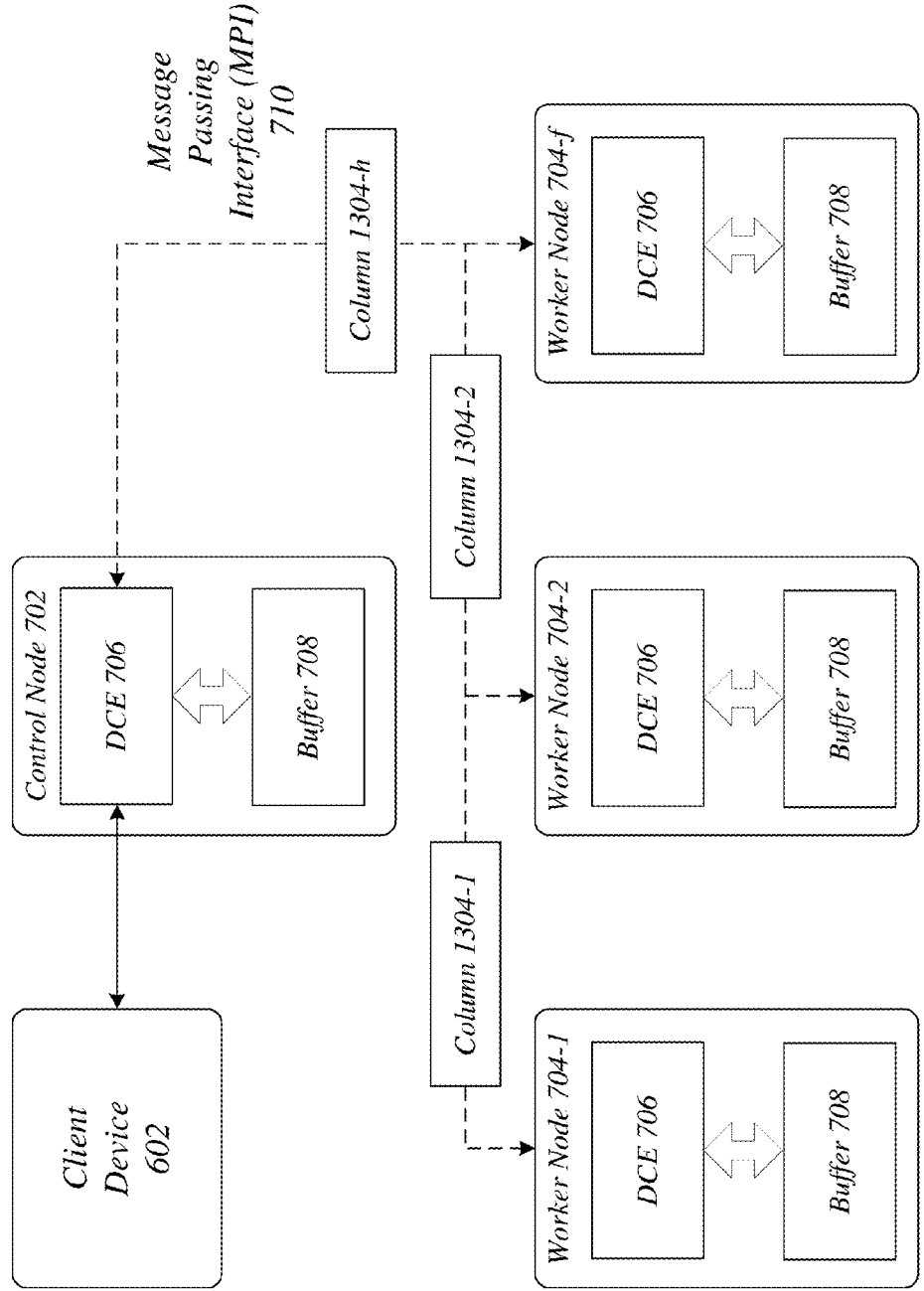
FIG. 14 illustrates an example of a fourth operational environment.

FIG. 14 illustrates an example of an operational environment 1400. The operational environment 1400 shows distributing portions of the simulated data structure 1300 as column-based work units for the distributed computing system 610.

The simulation control engine 124 of the statistic simulator component 122-2 may control simulation of the statistical test 114 by distributing portions of the simulated data structure 1300 across the control node 702 and worker nodes 704-1 through 704-*f* of the distributed computing system 610 in accordance with a column-wise distribution algorithm. For instance, the simulation control engine 124 may distribute the simulated data structure 1300 by column across multiple worker nodes 704-1 through 704-*f* of the distributed computing system 610.

The DCE 706 of the control node 702 may distribute one or more columns 1304-*h* of the simulated data structure 1300 to one or more worker nodes 704-1 through 704-*f* via the message passing interface 710. As shown in FIG. 14, the DCE 706 may distribute columns 1304-1, 1304-2 . . . 1304-*h* of the simulated data structure 1300 as work units to the worker nodes 704-1, 704-2 . . . 704-*f*, respectively. A worker node may process its assigned work unit, such as sorting each column 1304-*h* and/or calculating quantiles for the statistical test 114. The worker nodes 704-1 through 704-$f$ may pass their processed work units, or pointers to the processed work units, to the DCE 706 via the message passing interface 710. The DCE 706 may reassemble the processed work units into an output file to form a new version of the simulated data structure 1300.

In one embodiment, the new version of the simulated data structure 1300 may include an ordered arrangement of rows and columns, each row to represent a point in the grid of points and each column to represent a quantile for each point in the grid of points. In the case where the worker nodes 704-1 through 704-$f$ are tasked to calculate quantiles for the statistical test 114, the worker nodes 704 may pass back a defined number of quantiles as established for the statistical test 114. For instance, with the maxF test, the original simulated data structure 1300 may comprise 1,000,000 rows and 103,780 columns, which gives the original simulated data structure 1300 a data storage size of approximately 800 Gigabytes (GB). Assume the worker nodes 704-1 through 704-$f$ are to calculate 10,001 quantiles for the maxF test. In this case, the new simulated data structure 1300 may comprise 10,001 columns and 103,780 rows, which gives the new simulated data structure 1300 a reduced data storage size of approximately 8 GB.

In one embodiment, the statistic simulator component 122-2 may generate quantiles using the distributed computing system 610 in accordance with an exemplary procedure, as follows:

```
PROC HPSIMULATE
    data=scbpSimulation /* output of simulation with group head */
    datadist=(COLUMNWISEBY);
    MODULE name=SCBP
        ext=tkscbp /* TK Extension to plug-in */
        var=(c:) /* all columns */
        task=1 /* Task : Post-processing */;
    OUTPUT out=scbpQuantiles;
    PERFORMANCE nnodes=200 nthreads=6;
RUN.
```

Embodiments are not limited this example.

FIG. 15 illustrates an example of a simulated data structure 1500. The simulated data structure 1500 may be a software data structure arranged to store simulated data 330 and/or simulated statistics 430 in the simulation database 340.

The statistic simulator component 122-2 may generate the simulated data structure 1500. In one embodiment, the statistic simulator component 122-2 may generate the simulated data structure 1500 as a table. The simulated data structure 1500 may include an ordered arrangement of rows 1502-$j$ and columns 1504-$k$ to form multiple cells 1506-$m$, where j, k and m may be any positive integer. A cell 1506-$m$ may contain a simulation of a simulated statistic 430 (or simulated data 330) for a point in the grid of points, where each row 1502-$j$ represents a simulation of the simulated statistic 430 (or simulated data 330), and each column 1504-$k$ represents a point in the grid of points. Additionally, the simulated data structure 1500 may be organized into column groups 1508-$n$, where n may be any positive integer. For instance, a first column group 1508-1 may include six columns for parameter vector 4, and a second column group 1508-2 may include five columns for parameter vector 5, and so forth.

As with simulated data structure 1300, the simulated data structure 1500 may have a defined data storage size for a given statistical test 114. For instance, with the maxF test, the simulated data structure 1500 may comprise 1,000,000 rows and 103,780 columns, which gives the simulated data structure 1500 a data storage size of approximately 800 Gigabytes (GB).

Figure 16:
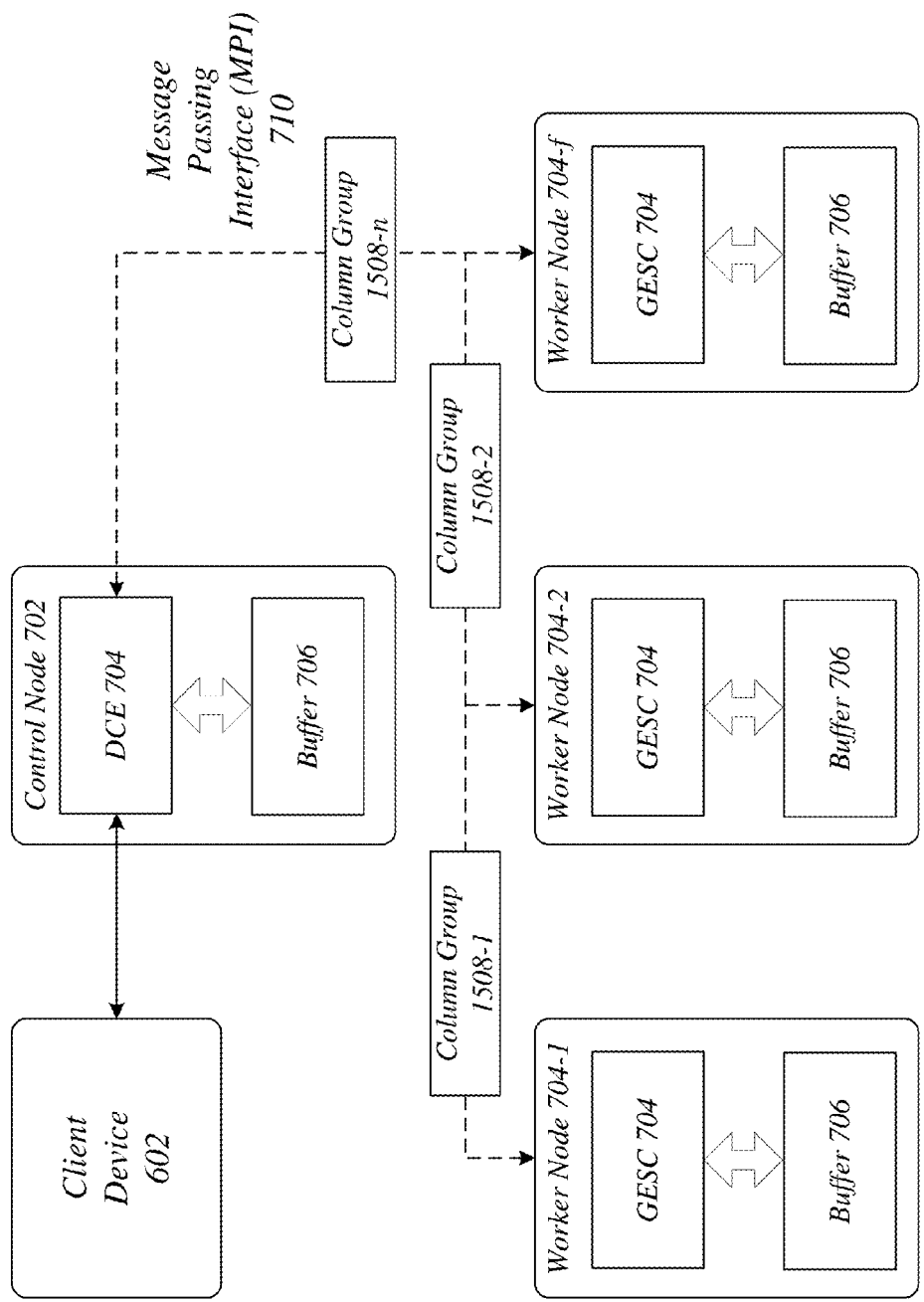
FIG. 16 illustrates an example of a fifth operational environment.

FIG. 16 illustrates an example of an operational environment 1600. The operational environment 1600 shows distributing portions of the simulated data structure 1500 as column-group-based work units for the distributed computing system 610.

The simulation control engine 124 of the statistic simulator component 122-2 may control simulation of the statistical test 114 by distributing portions of the simulated data structure 1500 across the control node 702 and worker nodes 704-1 through 704-$f$ of the distributed computing system 610 in accordance with a column-wise-by-group distribution algorithm. For instance, the simulation control engine 124 may distribute the simulated data structure 1500 by groups of columns (or column groups) across multiple worker nodes 704-1 through 704-$f$ of the distributed computing system 610. Distributing the simulated data structure 1500 may make it easier to calculate the simulated statistic 430 for each point in the grid of points relative to the column-wise distribution algorithm.

The simulation control engine 124 may perform column group distribution according to column groups 1508-$n$ defined in a control row of the simulated data structure 1500. The control row may include various identifiers or parameters to control distribution. In one embodiment, for example, the control row may include a group identifier to identify corresponding columns in a group, a restriction identifier to identify corresponding columns that do not need to be distributed, and a universal identifier to identify corresponding columns that need to be distributed across all worker nodes. It may be appreciated that other identifiers and parameters may be used as desired for a given implementation. Embodiments are not limited in this context.

The DCE 706 of the control node 702 may distribute one or more column groups 1508-$n$ of the simulated data structure 1500 to one or more worker nodes 704-1 through 704-$f$ via the message passing interface 710. As shown in FIG. 16, the DCE 706 may distribute columns 1508-1, 1508-2 . . . 1508-$n$ of the simulated data structure 1500 as work units to the worker nodes 704-1, 704-2 . . . 704-$f$, respectively. A worker node may process its assigned work unit, such as calculating the statistics for the statistical test 114, based on the column groups, and then calculating quantiles for the statistical test 114. The worker nodes 704-1 through 704-$f$ may pass their processed work units, or pointers to the processed work units, to the DCE 706 via the message passing interface 710. The DCE 706 may reassemble the processed work units into an output file to form a new version of the simulated data structure 1500.

In one embodiment, the new version of the simulated data structure 1500 may include an ordered arrangement of rows and columns, each row to represent a point in the grid of points and each column to represent a quantile for each point in the grid of points. In the case where the worker nodes 704-1 through 704-$f$ calculate quantiles for the statistical test 114, as with the simulated data structure 1300, the worker nodes 704-1 through 704-$f$ may pass back a defined number of quantiles as established for the statistical test 114. For instance, with the WDmaxF test, the original simulated data structure 1500 may comprise 1,000,000 rows and 103,780 columns of maxF test statistics, which gives the original simulated data structure 1500 a data storage size of approximately 800 Gigabytes (GB). Assume the worker nodes 704-1 through 704-$f$ are to calculate 10,001 quantiles for the WDmaxF test. In this case, the new simulated data structure 1500 may comprise 10,001 columns and 103,780 rows, which gives the new simulated data structure 1500 a reduced data storage size of approximately 8 GB.

Figure 17:
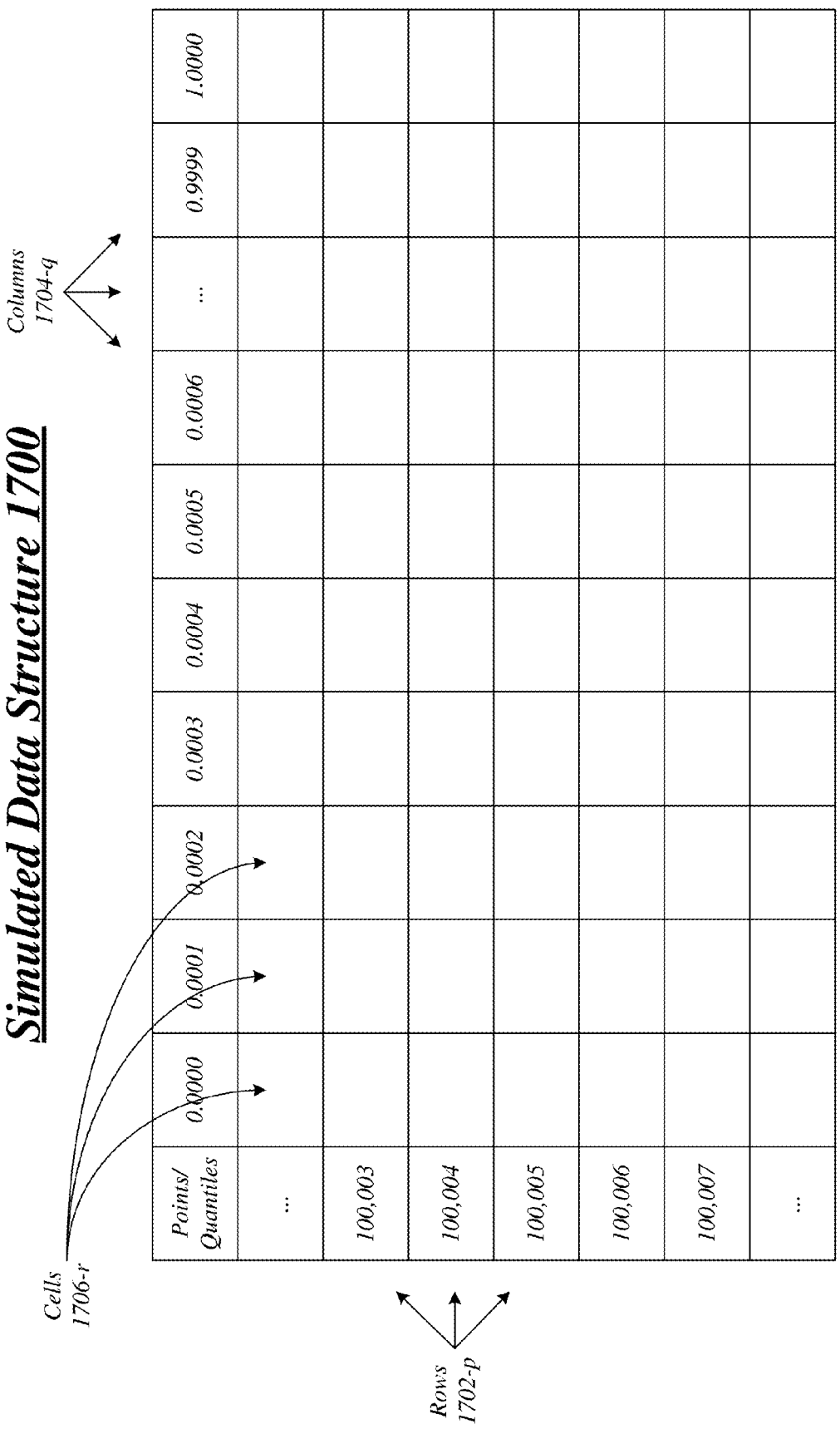
FIG. 17 illustrates an example of a third simulated data structure.

FIG. 17 illustrates an example of a simulated data structure 1700. The simulated data structure 1700 may illustrate an example of the new versions of the simulated data structures 1300, 1500. As described with reference to FIGS. 13-16, new versions of the simulated data structures 1300, 1500 may each include an ordered arrangement of rows 1702-*p* and columns 1704-*q*, where p and q may be any positive integer. Each row 1702-*p* to represent a point in the grid of points and each column 1704-*q* to represent a quantile of the grid of points. In various embodiments, cell 1706-*r* may contain a simulation of a simulated statistic for a point in the grid of structure 1700. Simulated data structure 1700 is transposed relative to the simulated data structures 1300, 1500, in that the simulated data structures 1300, 1500 have columns representing points in a grid of points, while the simulated data structure 1700 has columns representing quantiles.

FIG. 18 illustrates one example of a logic flow 1800. The logic flow 1800 may be representative of some or all of the operations executed by one or more embodiments described herein, such as the statistic simulator component 122-2 of the simulation subsystem 120 of the automated statistical test system 100. More particularly, the logic flow 1800 illustrates curve fitting algorithms for use with a grid of points.

As shown in FIG. 18, the logic flow 1800 may generate simulated data for a statistical test, statistics of the statistical test based on parameter vectors to follow a probability distribution at block 1802. For example, the simulated data component 122-1 may generate simulated data 330 for a statistical test 114, the statistical test 114 based on parameter vectors to follow a probability distribution of known or unknown form. Alternatively, the simulated data component 122-1 may receive simulated data 330 for a statistical test 114 from an external source.

The logic flow 1800 may simulate statistics for the parameter vectors from the simulated data, each parameter vector to comprise a single point in a grid of points at block 1804. For instance, the statistic simulator component 122-2 may generate simulated statistics 430 for the parameter vectors from the simulated data 330, each parameter vector to comprise a single point in a grid of points.

The logic flow 1800 may calculate quantiles for the parameter vectors from the simulated data at block 1806. For instance, the statistic simulator component 122-2 may calculate quantiles saved in the simulated data structure 1700 for the parameter vectors from the simulated data 330.

The logic flow 1800 may fit an estimated CDF curve to quantiles for each point in the grid of points using a monotonic cubic spline interpolation technique in combination with a transform to satisfy a defined level of precision at block 1808. For instance, the statistic simulator component 122-2 may construct an estimated CDF curve for each point in the grid of points using a monotonic cubic spline interpolation technique in combination with a transform to interpolate quantiles in the simulated data structure 1700 in order to satisfy a precision level of interest.

Once the simulation control engine 124 generates the simulated data structure 1700 with quantiles for the statistical test 114, the statistic simulator component 122-2 may use the quantiles to fit an estimated CDF curve for each point in the grid of points. The statistic simulator component 122-2 may fit an estimated CDF for each point according to a given level of precision. In general, reducing a level of precision results in a corresponding reduction in a number of curve parameters needed to fit the estimated CDF curve.

As previously described with reference to FIG. 2, the statistic simulator component 122-2 may simulate statistics for all given parameter vectors (p) for a statistical test (T) from the simulated data 330. In accordance with Equation (1), the empirical CDF $\tilde{T}(p,x)$ may have a precision of approximately $1/\sqrt{N}$, where N is the sample size, or the number of simulated statistics, for the given parameter vector p. For example, when N=1,000,000, the precision is about 0.001. However, the statistic simulator component 122-2 may generate an estimated CDF curve with much fewer curve parameters than N.

The statistic simulator component 122-2 may select a number of curve parameters to fit an estimated CDF curve for each point in the grid of points to provide a given level of precision. For instance, assume that a precision level is set as 0.0005, and that a monotonic cubic spline interpolation technique is used to fit the curve. On average, approximately 20 curve parameters can achieve a curve $C(c(p),.)$ as set forth in Equation (2), as follows:

$$\max_x |C(c(p), x) - \tilde{T}(p, x)| \le 0.0005 \qquad \text{Equation (2)}$$

where c(p) denotes the point-dependent curve parameters.

In some cases, however, a number of curve parameters may be reduced through combination of a monotonic cubic spline interpolation technique and a transform. In one embodiment, for example, the statistic simulator component 122-2 may combine a monotonic cubic spline interpolation technique with a beta transformation. A beta transformation is a transform performed in accordance with a normalized incomplete beta function, the normalized incomplete beta function comprising a nonnegative function whose derivative is completely positive. In one embodiment, a beta function may comprise a CDF of a beta distribution. A beta distribution is a family of continuous probability distributions defined on the interval [0, 1] parameterized by two positive shape parameters, denoted by $\alpha$ and $\beta$, that appear as exponents of the random variable and control the shape of the distribution.

Assume the monotonic cubic spline interpolation technique fits a first estimated CDF curve with a first number of knots to give a first level of precision (0.0005), each knot comprising an x value and a y value for a two-dimensional coordinate system. The monotonic cubic spline interpolation technique spaces the x values at regular intervals along the x-axis as it is monotonic. As such, more knots are needed to accurately fit the curve. The monotonic cubic spline interpolation technique may be combined with a beta transformation to transform the x values to reduce the first number of knots to a second number of knots that gives approximately the first level of precision (0.0005), where the second number of knots is lower than the first number of knots. Applying the beta transformation causes the x values to be placed at irregular intervals, which reduces the number of knots.

Combining a monotonic cubic spline interpolation technique with a transform, such as the beta transformation, results in fewer curve parameters needed for a same or similar level of precision. For instance, in the previous example, the use of the monotonic cubic spline interpolation technique reduced a number of curve parameters from 1,000,000 simulated statistics to approximately 20 curve parameters. By combining the monotonic cubic spline interpolation technique with a beta transformation, the number of curve parameters may be further reduced from 20 curve parameters to 12 curve parameters, for a same or similar level of precision (e.g., 0.0005).

Once a number of curve parameters are selected, the statistic simulator component 122-2 may fit an estimated CDF curve for each point in the grid of points independently from other points in the grid of points using the selected number of curve parameters to provide a given level of precision. Fitting an estimated CDF curve for each point independently significantly reduces computational resources needed for curve-fitting operations. For instance, in a simple case that the point is one dimensional, rather than fitting estimated CDF curves for all points in the grid of points simultaneously to build an actual three-dimensional surface, the statistic simulator component 122-2 fits an estimated curve for each point in sequence or parallel, and then combines the estimated curves to form an approximate three-dimensional surface.

Once curve-fitting operations are finished, the statistic simulator component 122-2 may generate a simulated data structure with information for a set of fitted CDF curves for the grid of points. Continuing with the maxF test example, the simulated data structure may have a data storage size calculated as 8 GB/10,001*12=10 megabytes (MB). As indicated with the maxF test example, a data storage size for each version of a simulated data structure reduces from 800 GB to 8 GB to 10 MB. This results in a significantly smaller data storage size needed for the computational representation 130.

In one embodiment, the statistic simulator component 122-2 may perform curve-fitting operations in accordance with the following exemplary procedure:

```
PROC HPSIMULATE
    data=scbpQuantiles /* output of quantiles */
    datadist=(ROUNDROBIN);
    MODULE name=fitcdf
    ext=tkdens /* TK Extension to plug-in */
    var=(key1 – key3 q0 – q10000) /* keys and quantiles */
    task=0 /* Task : Fit CDF curves */
    taskParmN=( /*nKeys=*/3 /*maxParm=*/32 /*maxIter=*/10000
    /*precision=*/0.0005 /*maxModels=*/1 /*weightTails=*/0
    /*weightA=*/–4.605 /*weightB=*/5.685 /*transType=*/1
    /*transGridL=*/–2.0 /*transGridU=*/2.0 /*transGridS=*/0.1 );
    OUTPUT out=scbpFitCDFCurves;
    PERFORMANCE nnodes=200 nthreads=6;
RUN.
```

Embodiments are not limited to this example.

Figure 19:
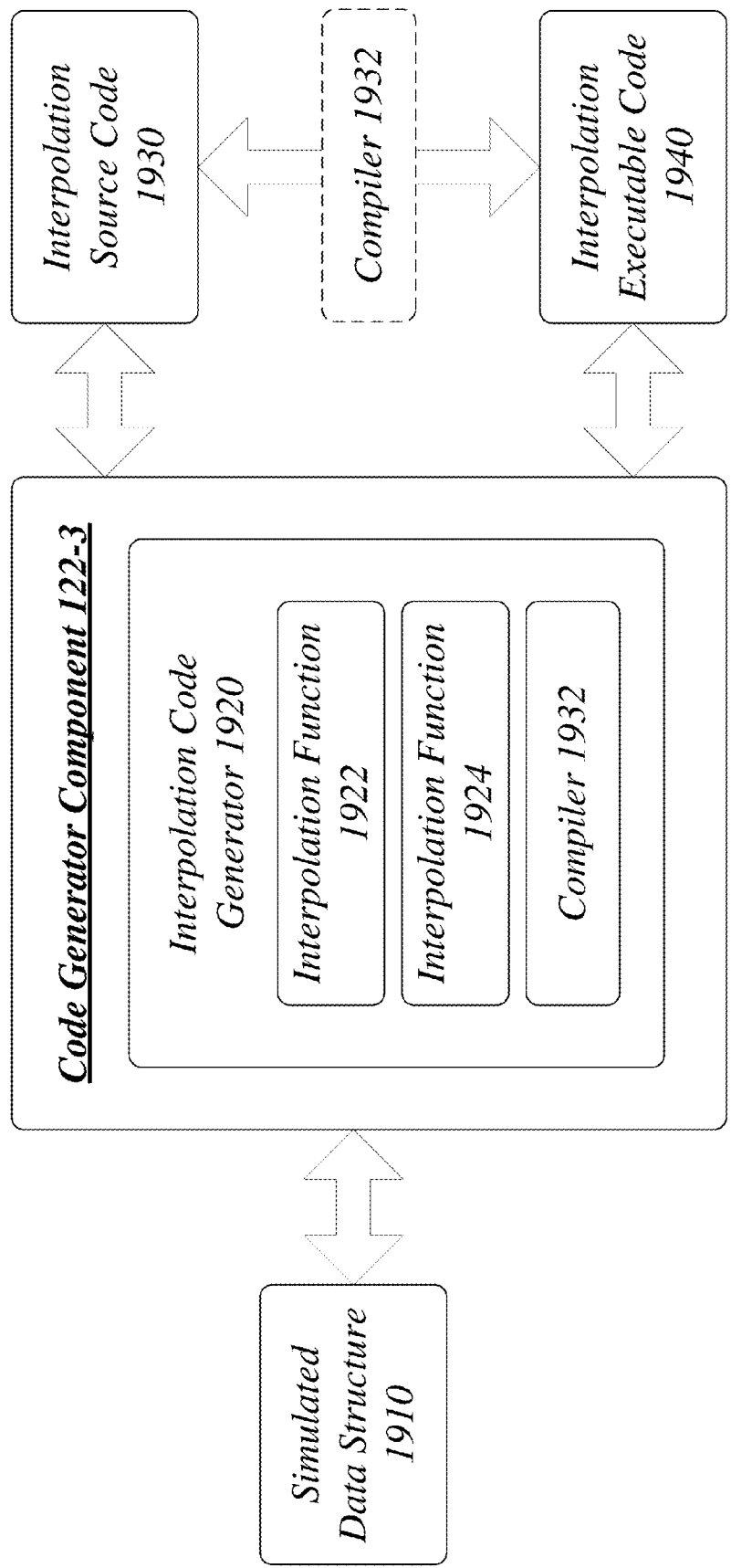
FIG. 19 illustrates an example of a sixth operational environment.

FIG. 19 illustrates an operational environment 1900. The operational environment 1900 shows operations for the code generator component 122-3 to generate interpolation code to interpolate statistics for a statistical test 114.

The simulated data component 122-1 may generate simulated data 330 for a statistical test 114, the statistics of the statistical test 114 based on parameter vectors to follow a probability distribution of a known or unknown form. The statistic simulator component 122-2 may generate simulated statistics 430 for the parameter vectors from the simulated data 330, each parameter vector to comprise a single point in a grid of points. The code generator component 122-3 may remove selective points from the grid of points to form a subset of points, and generate interpolation code to interpolate a statistic of the statistical test 114 on any point.

As shown in FIG. 19, the code generator component 122-3 may receive a simulated data structure 1910. The simulated data structure 1910 may include information for a set of fitted CDF curves for the grid of points, as described with reference to FIG. 18. The code generator component 122-3 may include an interpolation code generator 1920 to execute an interpolation function 1922.

In various embodiments, the interpolation code generator 1920 may generate interpolation source code 1930 from the simulated data structure 1910 and a pair of interpolation functions 1922, 1924.

The first interpolation function 1922 may be arranged to call a second interpolation function comprising an instance of the virtual software class. The interpolation function 1922 may be an instance of a base software class 522-1 designed to call an instance of a virtual software class 522-2, where the base software class 522-1 is a child of the virtual software class 522-2. In one embodiment, for example, a base software class 522-1 may be implemented as a TK-extension class for interpolating statistics of the statistical test 114, and a virtual software class 522-2 may be implemented as a virtual TK-extension class (TKICDF). Embodiments, however, are not limited to this example.

The second interpolation 1924 may be an instance of the virtual software class 522-2. In one embodiment, the interpolation function 1924 may implement a monotonic cubic spline interpolation technique. In one embodiment, the interpolation function 1924 may implement a monotonic cubic spline interpolation technique in combination with a transform, such as the beta transformation, for example. The beta transformation may comprise a transform with a normalized incomplete beta function (the cumulative distribution function of beta distribution), the normalized incomplete beta function to comprise a nonnegative function whose derivative is completely positive.

Alternatively, the interpolation code generator 1920 may utilize a single interpolation function with some or all of the characteristics of both interpolation functions 1922, 1924. Embodiments are not limited in this context.

In some cases, the interpolation code generator 1920 may have an integrated compiler 1932. The interpolation code generator 1920 may generate the interpolation source code 1930, and use the compiler 1932 to compile the interpolation source code 1930 in order to generate an interpolation executable code 1940. Alternatively, the compiler 1932 may be separate from the code generator component 122-3 (e.g., part of an operating system).

In one embodiment, the interpolation code generator 1920 may generate the interpolation source code 1930 in accordance with the following exemplary procedure:

```
PROC HPSIMULATE
    data=scbpFitCDFCurves /* output of fitted CDF curves */
    datadist=(ROUNDROBIN);
    MODULE name=getCcode
    ext=tkdens /* TK Extension to plug-in */
    var=(key1 – key3 fit:) /* keys and fitting parameters */
    task=1 /* Task : Generate source code */
    taskParmN=( /*nKeys=*/3 /*bitflags=*/0 0 0 )
    taskParmS=( /*OutputPath=*/ "u:\temp",
        /*TK-ExtensionFileName=*/ "imaxf");
    OUTPUT out=scbpIndexTableMaxF;
    PERFORMANCE nnodes=0 nthreads=1;
RUN.
```

Embodiments are not limited to this example.

FIG. 20 illustrates one example of a logic flow 2000. The logic flow 2000 may be representative of some or all of the operations executed by one or more embodiments described herein, such as the code generator component 122-3 of the simulation subsystem 120 of the automated statistical test system 100. More particularly, the logic flow 2000 illustrates code generation operations for use with a grid of points.

As shown in FIG. 20, the logic flow 2000 may generate simulated data for a statistical test, statistics of the statistical test based on parameter vectors to follow a probability distribution, at block 2002. For instance, the simulated data component 122-1 may generate simulated data 330 for a statistical test 114, the statistical test 114 based on parameter vectors to follow a probability distribution of a known or unknown form.

The logic flow 2000 may simulate statistics for the parameter vectors from the simulated data, each parameter vector to comprise a single point in a grid of points, at block 2004. For instance, the statistic simulator component 122-2 may generate simulated statistics 430 for the parameter vectors from the simulated data 330, each parameter vector to comprise a single point in a grid of points.

The logic flow 2000 may remove selective points from the grid of points to form a subset of points at block 2006. For instance, the code generator component 122-3 may remove selective points from the grid of points to form a subset of points. The code generator component 122-3 may receive a simulated data structure 1910 with information for estimated CDF curves of the subset of points.

The logic flow 2000 may generate interpolation code to interpolate a statistic of the statistical test on any point at block 2008. For instance, the code generator component 122-3 may generate interpolation source code 1930 or interpolation executable code 1940 to interpolate a statistic of the statistical test 114 on any point in the grid of points to form an estimated CDF curve. The interpolation code may include, among other types of information, the simulated data structure 1910, index tables for the simulated data structure 1910, and a first interpolation function 1922 designed to call a second interpolation function 1924.

The interpolation source code 1930 may be used to interpolate a CDF for any given point p for a statistical test 114. Assume the simulation subsystem 120 is executed to simulate and fit CDFs on M points. Those M points construct a grid (or mesh), which is contained in the interpolation source code 1930 as generated by the code generator component 122-3 of the simulation subsystem 120. The compiler 1932 may compile the interpolation source code 1930 into interpolation executable code 1940, such as a DLL, for example. The DLL may be used to interpolate a CDF for any given point p of the statistical test, regardless of whether p is a point within the grid of points M or outside of the grid of points M.

Figure 21A:
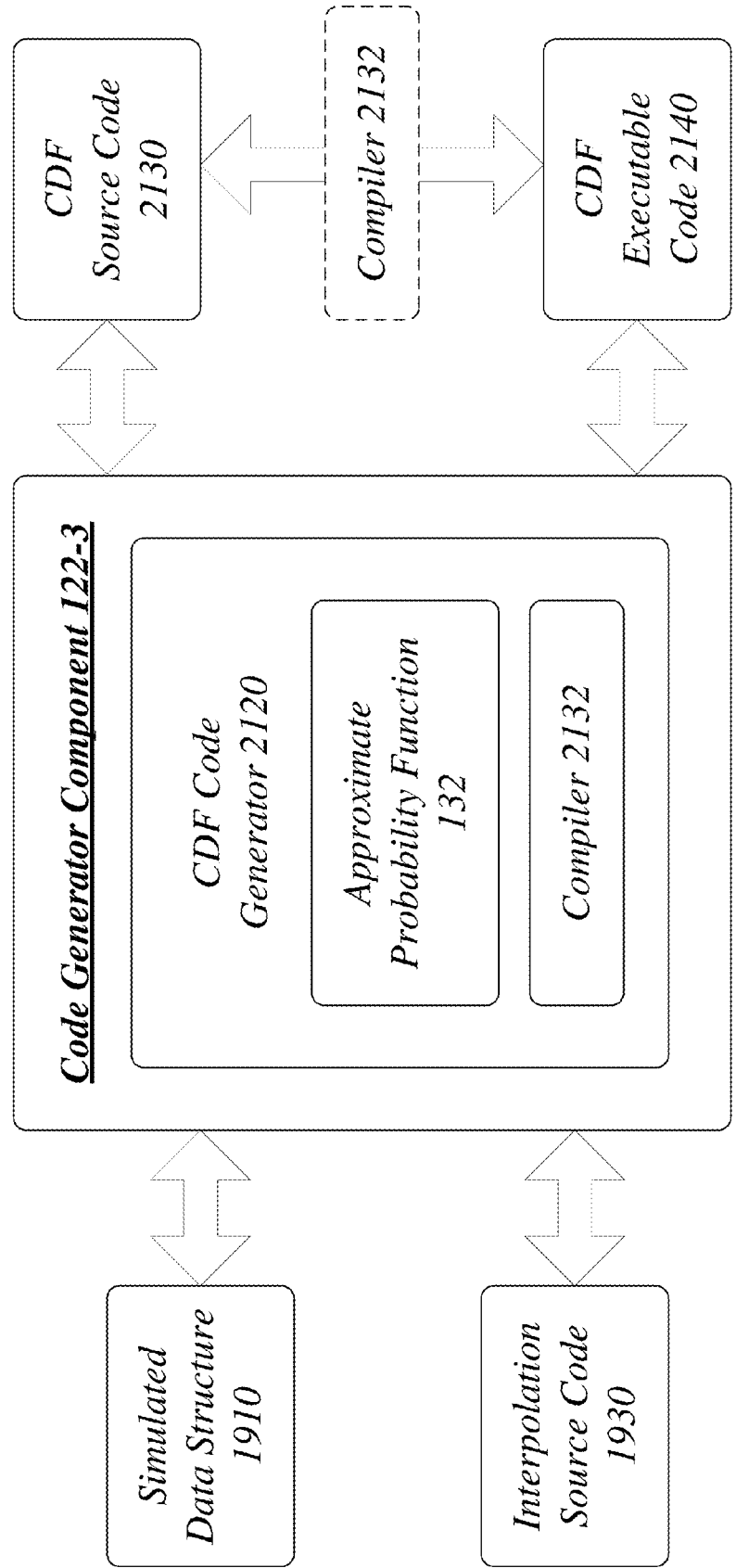
FIG. 21A illustrates an example of a seventh operational environment.

FIG. 21A illustrates an operational environment 2100. The operational environment 2100 shows operations for the code generator component 122-3 to generate a computational representation 130 for a statistical test 114.

As shown in FIG. 21A, the code generator component 122-3 may include a CDF code generator 2120. The CDF code generator 2120 may receive a simulated data structure 1910 and interpolation source code 1930 from the interpolation code generator 1920. The simulated data structure 1910 and the interpolation source code 1930 may be integrated or separate from each other. The simulated data structure 1910 may include information for a set of fitted CDF curves for the grid of points, as described with reference to FIG. 18. The interpolation source code 1930 may interpolate a statistic of the statistical test 114 on any point.

The CDF code generator 2120 may create a computational representation 130 arranged to generate an approximate probability distribution 132 for each point in the grid of points from the simulated data structure 1910. For instance, the CDF code generator 2120 may generate CDF source code 2130 and/or CDF executable code 2140 via the compiler 2132. The compiler 2132 may be integrated with, or separate from, the CDF code generator 2120. The computational representation 130 may include the interpolation source code 1930. The computational representation 130 may also include a set of H files, data C files, function C files, and a build script.

Figure 21B:
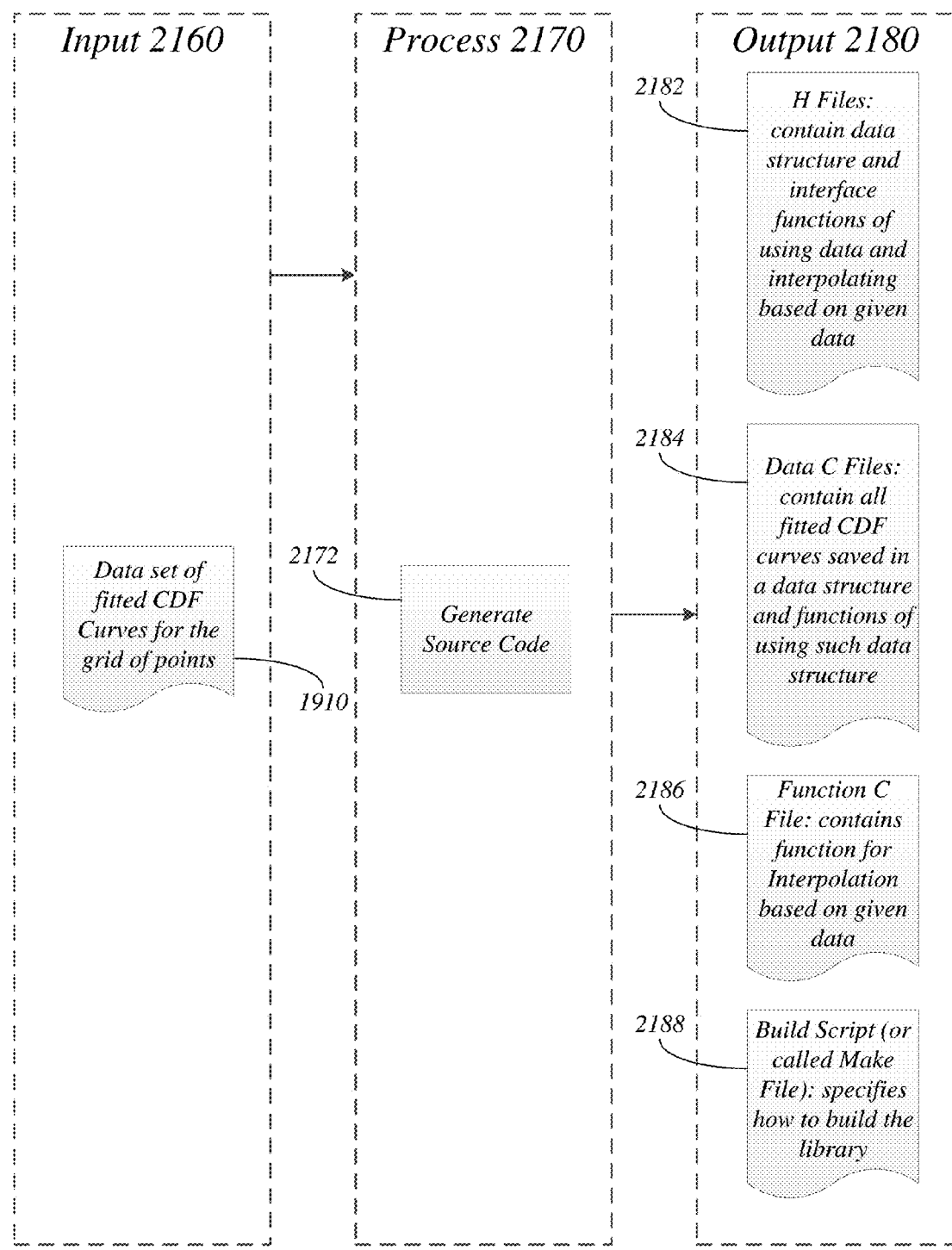
FIG. 21B illustrates an example of a ninth logic flow for a simulation subsystem.

FIG. 21B illustrates one example of a logic flow 2150. The logic flow 2150 may be representative of some or all of the operations executed by one or more embodiments described herein, such as the CDF code generator 2120 of the code generator component 122-3 of the simulation subsystem 120 of the automated statistical test system 100. More particularly, the logic flow 2150 illustrates code generation operations to generate a computational representation 130.

As shown in FIG. 21B, the logic flow 2150 may receive a simulated data structure 1910 with information for a set of fitted CDF curves for the grid of points as input 2160. A process 2170 may generate source code for a computational representation 130, as implemented in generating source code 2172 by incorporating template files, data, and instructions into the corresponding type of files. For instance, the CDF code generator 2120 may generate CDF source code 2130 with the simulated data structure 1910 and interpolation source code 1930. The logic flow 2150 may output various types of source code files and logic as output 2180. For instance, the CDF code generator 2120 may generate source code files for CDF source code 2130.

The CDF source code 2130 may include, for example, one or more H files 2182. An H file 2182 may contain data structures and interface functions for the usage of a set of data and the interpolation based on the set of data. The CDF source code 2130 may include, for example, one or more data C files 2184. A data C file 2184 may contain all fitted CDF curves saved in a data structure and functions of using such data structure. The CDF source code 2130 may include, for example, one or more function C files 2186. A function C file contains a function for the interpolation based on a given set of data, such as data in the simulated data structure 1910, for example, the set of fitted CDF curves.

The CDF source code 2130 may also include logic implemented in the form of one or more scripts 2188. For instance, the CDF source code 2130 may include a build script or make file that specifies how to build a software library.

Figure 22:
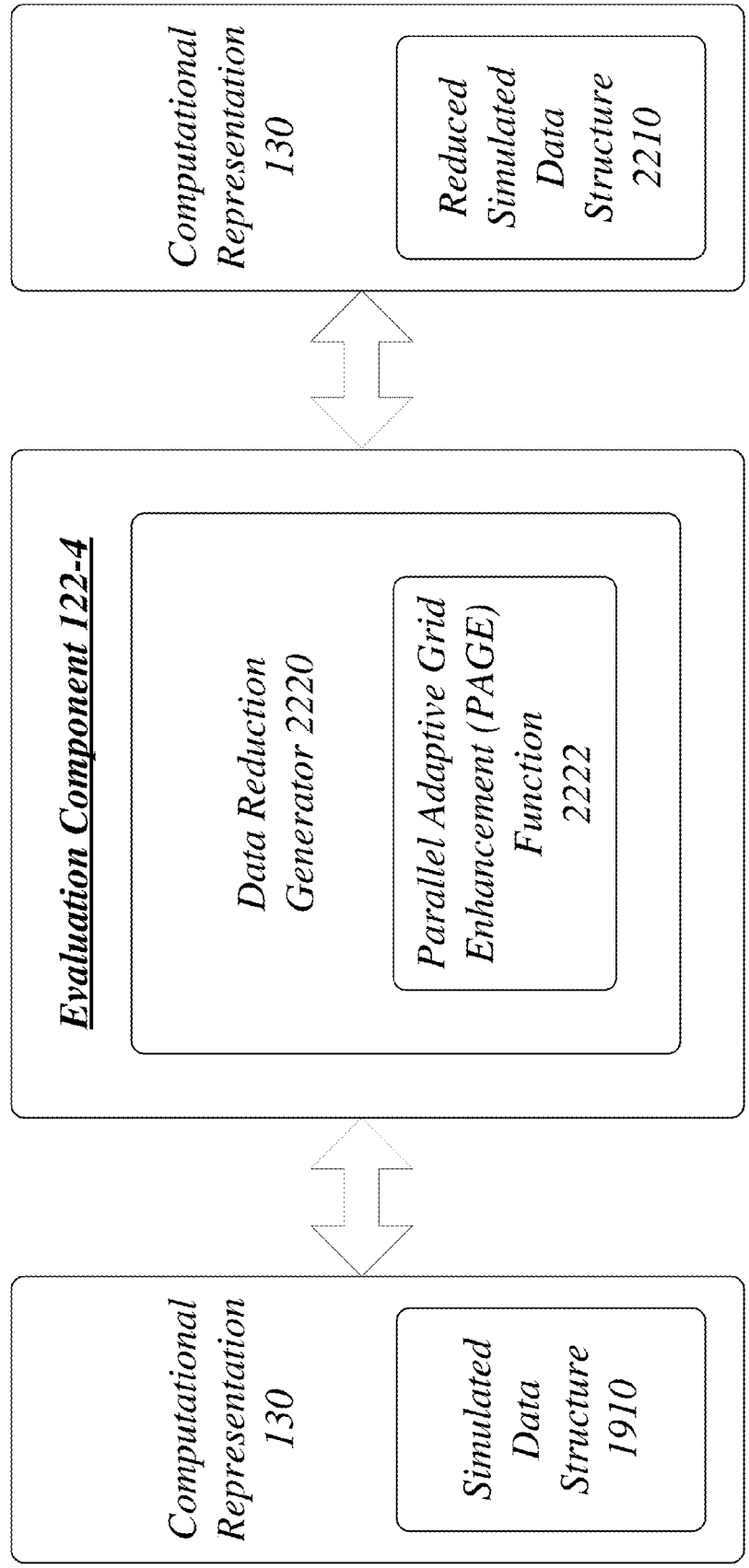
FIG. 22 illustrates an example of an eighth operational environment.

FIG. 22 illustrates an operational environment 2200. The operational environment 2200 shows operations for the evaluation component 122-4 to reduce a data storage size for a computational representation 130.

As shown in FIG. 22, the evaluation component 122-4 may comprise a data reduction generator 2220. The data reduction generator 2220 may receive as input a computational representation 130 arranged to generate an approximate probability distribution 132 for each point in a grid of points from simulated statistics 430 for a statistical test 114. The computational representation 130 may include a simulated data structure 1910 with information for estimated CDF curves.

The data reduction generator 2220 may evaluate the simulated data structure 1910 to determine whether any points in the grid of points is removable from the simulated data structure 1910 given a target level of precision. The data reduction generator 2220 may reduce the simulated data structure in accordance with the evaluation to produce a reduced simulated data structure 2210. The reduced simulated data structure may reduce a data storage size for the computational representation 130.

The data reduction generator 2220 may implement a parallel adaptive grid enhancement (PAGE) function 2222 arranged to implement a PAGE algorithm. In one embodiment, the data reduction generator 2220 may receive selection of a precision parameter to represent a target level of precision for the simulated data structure 1910. The data reduction generator 2220 may remove points from the simulated data structure 1910 in accordance with the selected level of precision utilizing the PAGE algorithm. The PAGE algorithm may be described in more detail with reference to FIGS. 24-27, infra.

FIG. 23 illustrates one example of a logic flow 2300. The logic flow 2300 may be representative of some or all of the operations executed by one or more embodiments described herein, such as the data reduction generator 2220 of the evaluation component 122-4 of the simulation subsystem 120 of the automated statistical test system 100. More particularly, the logic flow 2300 illustrates data reduction operations to reduce a data storage size for a computational representation 130.

As shown in FIG. 23, the logic flow 2300 may receive a computational representation arranged to generate an approximate probability distribution for statistics of a statistical test, the computational representation to include a simulated data structure with information for estimated cumulative distribution function (CDF) curves for one or more parameter vectors of the statistical test, each parameter vector to comprise a single point in a grid of points, at block 2302. For instance, the data reduction generator 2220 may receive as input a computational representation 130 arranged to generate an approximate probability distribution 132 for each point in a grid of points from simulated statistics 430 for a statistical test 114. The computational representation 130 may include a simulated data structure 1910 with information for estimated CDF curves.

The logic flow 2300 may evaluate the simulated data structure to determine whether any points in the grid of points are removable from the simulated data structure given a target level of precision at block 2304. For example, the data reduction generator 2220 may evaluate the simulated data structure 1910 to determine whether any points in the grid of points are removable from the simulated data structure 1910 given a target level of precision.

The logic flow 2300 may reduce the simulated data structure in accordance with the evaluation to produce a reduced simulated data structure having a smaller data storage size relative to the simulated data structure, the reduced simulated data structure to reduce a data storage size for the computational representation at block 2306. For example, the data reduction generator 2220 may reduce the simulated data structure 1910 in accordance with the evaluation to produce a reduced simulated data structure 2210, where the simulated data structure 2210 has a smaller data storage size as compared to the simulated data structure 1910. The reduced simulated data structure may in turn reduce a data storage size for the computational representation 130.

Figure 24:
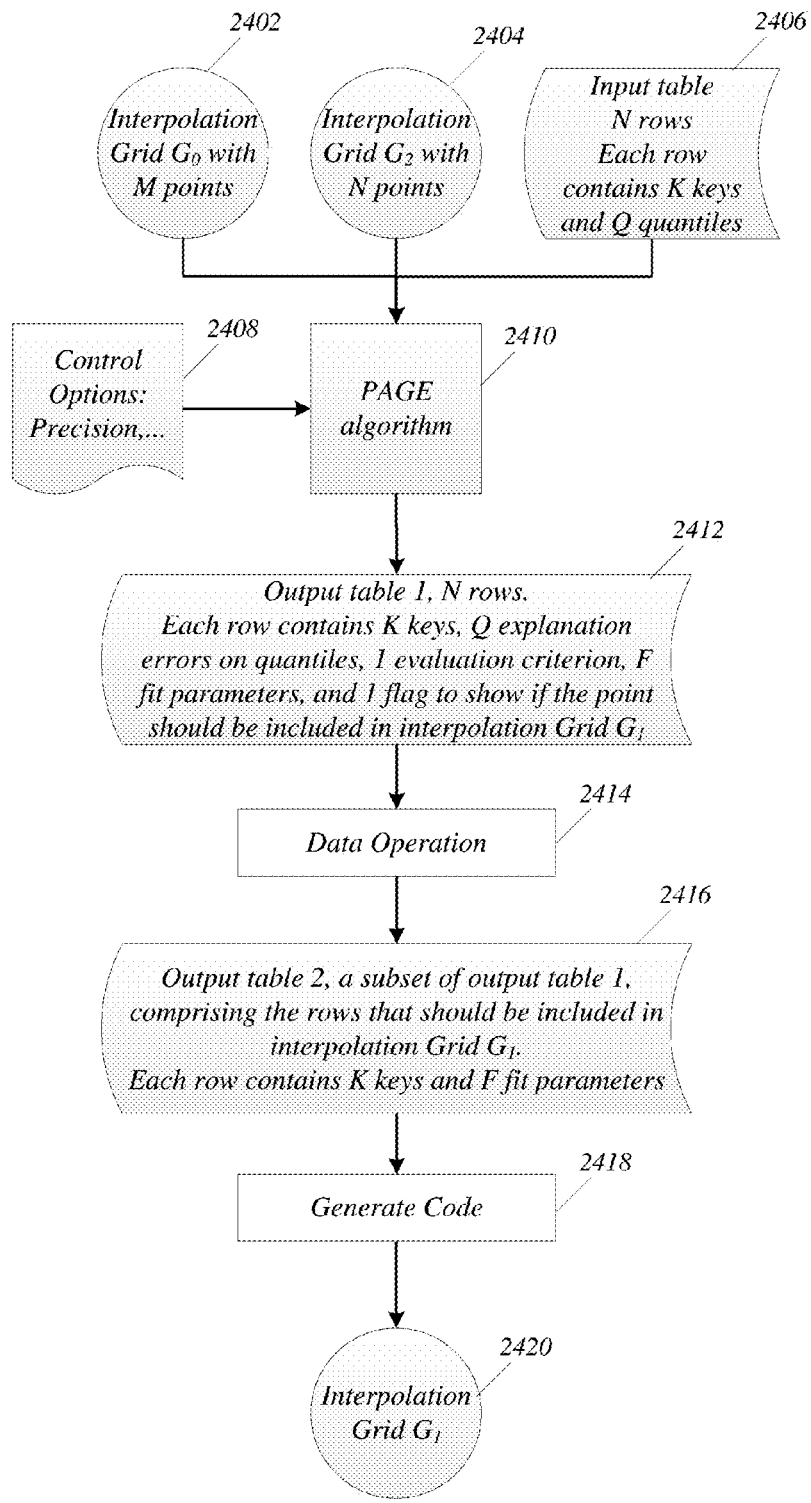
FIG. 24 illustrates an example of an eleventh logic flow for a simulation subsystem.

FIG. 24 illustrates one example of a logic flow 2400. The logic flow 2400 may be representative of some or all of the operations executed by one or more embodiments described herein, such as the data reduction generator 2220 of the evaluation component 122-4 of the simulation subsystem 120 of the automated statistical test system 100. More particularly, the logic flow 2400 illustrates data reduction operations to reduce a data storage size for a computational representation 130 utilizing a PAGE algorithm.

In general, the logic flow 2400 may receive a computation representation 130 with a simulated data structure 1910 containing information for estimated CDF curves, and evaluate the simulated data structure 1910 to determine whether any points in the grid of points are removable from the simulated data structure given a target level of precision. The logic flow 2400 may perform the evaluation using a PAGE algorithm. The logic flow 2400 may then reduce the simulated data structure 1910 using evaluation results to produce a reduced simulated data structure 2210.

As shown in FIG. 24, the logic flow 2400 may receive various inputs for a PAGE algorithm, such as an interpolation grid $G_0$ with M points at 2402, an interpolation grid $G_2$ with N points at 2404, and an input table of N rows at 2406. Each row of the input table may contain K keys and Q quantiles. The interpolation grid $G_0$ and/or the interpolation grid $G_2$ may be examples of an interpolation executable code 1940. The input table at 2406 may be an example of a simulated data structure 1910.

The logic flow 2400 may receive selection of a precision parameter to represent a target level of precision for the simulated data structure. The precision parameter may be automatically selected by the data reduction generator 2220 based on a defined set of rules. Alternatively, the precision parameter may be selected by a user. Once selected, the PAGE algorithm may receive as input the precision parameter, along with other control parameters, for example, the type of interpolation method, as indicated at 2408.

The logic flow 2400 may remove points from the simulated data structure in accordance with a selected level of precision utilizing the PAGE algorithm. The PAGE algorithm may be used to identify a set of candidate points for potential removal from a simulated data structure. In one embodiment, for instance, the PAGE algorithm may execute at 2410 and output a candidate reduction data set using the interpolation grids $G_0$, $G_2$, the input table, and the one or more control parameters. The candidate reduction data set may be stored in a first output table 1 as indicated at 2412. The output table 1 may include evaluation information. The evaluation information may include, for example, a defined number of rows N, with each row to include one or more each of K keys, Q explanation errors on quantiles, one or more evaluation criteria, F fit parameters, and/or one or more flags to indicate if a point p is to remain in an interpolation grid $G_1$.

The logic flow 2400 may perform a DATA operation 2414 to extract one or more rows from the output table 1 at 2412 based on the evaluation information to construct a second output table 2 at 2416. For instance, output table 2 is a subset of output table 1, and it contains the rows that should be included in the interpolation grid $G_1$ and columns of keys and fit parameters. Output table 2 may be an example of a reduced simulated data structure 2210. The logic flow 2400 may utilize the code generator component 122-3 at 2418 to generate the interpolation grid $G_1$ at 2420 based on the output table 2 at 2416. The interpolation grid $G_1$ may be an example of an interpolation executable code 1940.

In one embodiment, the PAGE algorithm may be arranged to generate the candidate reduction data set using a "jackknife" evaluation technique. A jackknife evaluation technique provides information regarding whether a point may be approximated by its neighbors for a given level of precision. This information may be used to determine those points that cannot be removed from the grid of points for the given level of precision. Once needed points are identified, the remaining points may be stored in the candidate reduction data set. For instance, the jackknife operation may provide information on a relationship between precision and grid size. Table 1 illustrates results from a jackknife evaluation technique on all 103,780 points on the grid of points, with each point having 10,001 quantiles, for a maxF test:

TABLE 1

| Quantile | Jackknife Result |
|---|---|
| 100% | 0.445721510 |
| 99% | 0.007458065 |
| 95% | 0.000650852 |
| 90% | 0.000596543 |
| 75% | 0.000532891 |
| 50% | 0.000477936 |
| 25% | 0.000435499 |
| 10% | 0.000401377 |
| 5% | 0.000382148 |
| 1% | 0.000346780 |
| 0% | 0.000270918 |

Table 1 illustrates that less than 1% points cannot be explained well by its neighbors when the precision requirement is 0.0075.

In one embodiment, a jackknife evaluation technique may be performed in accordance with the following exemplary procedure:

```
PROC HPSIMULATE
        data=scbpQuantiles /* output of quantiles */
        datadist=(ROUNDROBIN);
    MODULE name=evaluation
        ext=tkdens /* TK Extension to plug-in */
        var=(key1 - key3 q0 - q10000) /* keys and quantiles */
        task=2 /* Task : Evaluate performance */
        taskParmN=( /*nKeys=*/3 /*EvalType=*/1 /*weightTails=*/0
            /*weightA=*/-4.605 /*weightB=*/5.685
            /*interpolationMethod=*/1 /
            *interpolationMethodParm=*/5)
        taskParmS=( /*tkExtension=*/ "imaxf" );
    OUTPUT out=scbpEvaluationJackknife;
    PERFORMANCE nnodes=200 nthreads=6;
RUN.
```

Embodiments are not limited to this example.

The PAGE algorithm may use results from the jackknife evaluation technique as a basis for selectively removing points from the grid of points, estimating an approximation error for interpolation, and storing the removed points in the candidate reduction data set based on the approximation error. The PAGE algorithm may then evaluate each point in the candidate reduction data set against a set of evaluation criterion until a precision parameter is satisfied.

In general, the PAGE algorithm determines, given some target level of precision, whether an original interpolation grid $G_2$ could be reduced into a smaller interpolation grid $G_1$, without deleting any points from an interpolation grid $G_0$. The smaller interpolation grid may result in a smaller data storage size for the computational representation 130 (e.g., DLL). An example for reducing a data storage size for the computational representation 130 may be illustrated with the following exemplary procedure:

```
PROC HPSIMULATE
        data=scbpQuantiles /* output of quantiles */
        datadist=(ROUNDROBIN);
```

```
    MODULE name=PAGE
        ext=tkdens /* TK Extension to plug-in */
        dependent
        var=(key1 - key3 q0 - q10000) /* keys and quantiles */
        task=3 /* Task : Shrink the DLL size */
        taskParmN= ( /*targetPrecision=*/0.0007 )
        taskParmS=( /*G2 tkExtension=*/ "imaxf"
                /*G0 tkExtension=*/ "imaxf0" );
    OUTPUT out=scbpPAGE_G1;
    PERFORMANCE nnodes=200 nthreads=6;
RUN.
```

Embodiments are not limited to this example.

After using a PAGE algorithm according to different precisions, a grid size with corresponding levels of precision for the maxF test may be shown in Table 2 as follows:

TABLE 2

| Precision | 0.0050 | 0.0025 | 0.0010 | 0.0007 | 0.0005 |
|---|---|---|---|---|---|
| Grid Size (# Points) | 7,868 | 9,778 | 13,766 | 17,202 | 103,780 |
| % of Original Grid | 7.6% | 9.4% | 13.3% | 16.6% | 100.0% |

Note that the original grid (e.g., simulated data structure 1910) had 103,780 points for a precision level of 0.0005 ($\geq \max|\bullet - \hat{T}|$). As indicated by Table 2, a data storage size for the simulated data structure 1910 may be substantially reduced when a level of precision is reduced. For instance, at a precision level of 0.0050, the number of points may be reduced from 103,780 points to 7,868 points, which is 7.6% of the simulated data structure 1910. In this manner, an informed design decision may be made for the interpolation source code 1930 and/or the computational representation 130 regarding tradeoffs between a level of precision and data storage size, as desired for a given implementation. Embodiments are not limited in this context.

In some cases, it may take significant time and computational resources to simulate all points with an original set of statistics (e.g., 1 million statistics for the maxF test). To reduce time and conserve computational resources, a reduced number of statistics (e.g., 20,000 statistics for the maxF test) could be used for a single point, and then the PAGE algorithm may be used on the simulated points to find final grid points. The original set of statistics (e.g., 1,000,000) may then be simulated for only the final grid points. This could be accomplished using a defined set of criteria.

For the maxF test, for example, 20,000 statistics on each of 103,780 points may be simulated, and 10,001 quantiles on each of 103,780 points may be generated. Assume CDFs are fitted with a precision of 0.0020. The average number of curve parameters for different precisions are shown in Table 3, as follows:

TABLE 3

| Precision | 0.0050 | 0.0025 | 0.0020 | 0.0010 |
|---|---|---|---|---|
| Avg. # of curve Parameters | 7.261 | 12.081 | 18.877 | 109.592 |

Code and a DLL may be generated, and the PAGE algorithm may be applied to the DLL to generate Table 4, as follows:

TABLE 4

| Precision | 0.0050 | 0.0045 | 0.0040 | 0.0035 | 0.0030 | 0.0025 | 0.0020 |
|---|---|---|---|---|---|---|---|
| Percentage of Points | 10.6% | 12.2% | 14.9% | 19.2% | 27.3% | 46.1% | 87.7% |

Using the results shown in Table 4, assume the points corresponding to precision of 0.0030 are selected. The original set of statistics (e.g., 1,000,000 statistics) may be simulated on each of the selected points. The defined number of quantiles (e.g., 10,001 quantiles) on each of selected points may be generated. The CDFs may be fitted with a precision of 0.0005. Finally code and DLL may be generated for the selected points.

Since all points with 1,000,000 statistics are available, the PAGE algorithm can do another evaluation, the results of which are shown in Table 5 as follows:

TABLE 5

| Quantile | Estimates |
|---|---|
| 100% Max | 0.002834907 |
| 99% | 0.000847933 |
| 95% | 0.000661086 |
| 90% | 0.000603617 |
| 75% Q3 | 0.000530835 |
| 50% Median | 0.000479984 |
| 25% Q1 | 0.000442317 |
| 10% | 0.000411247 |
| 5% | 0.000394015 |
| 1% | 0.000361853 |
| 0% Min | 0.000265525 |

Various aspects of the evaluation component 122-4 in general, and the data reduction generator 2220 and PAGE algorithm in particular, may be described with reference to FIGS. 25-27, infra.

Figure 25:
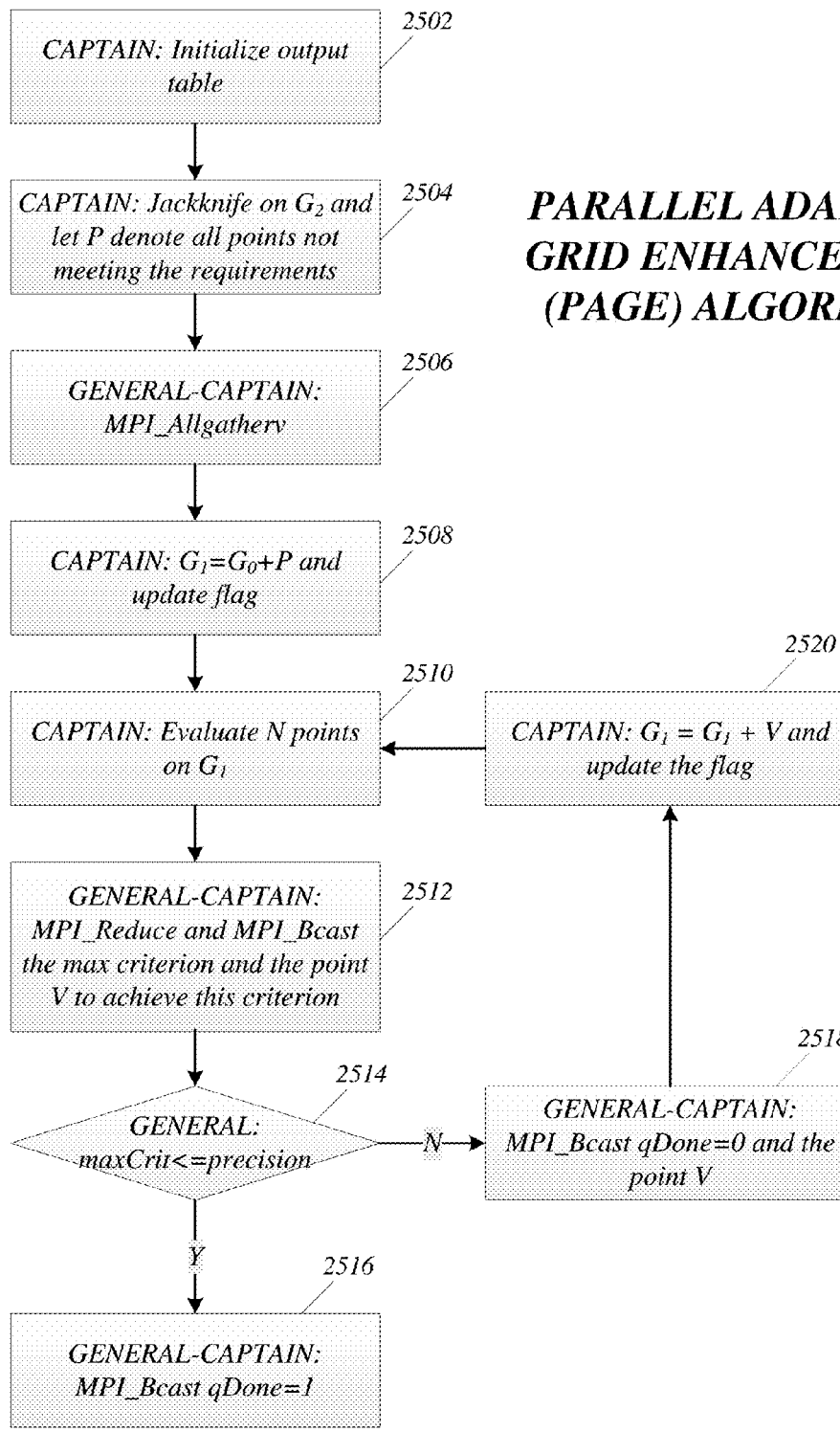
FIG. 25 illustrates an example of a twelfth logic flow for a simulation subsystem.

FIG. 25 illustrates one example of a logic flow 2500. The logic flow 2500 may be representative of some or all of the operations executed by one or more embodiments described herein, such as the data reduction generator 2220 of the evaluation component 122-4 of the simulation subsystem 120 of the automated statistical test system 100.

The logic flow 2500 illustrates evaluation operations performed in accordance with an exemplary PAGE algorithm. In general, the PAGE algorithm determines, given some target level of precision, whether an original interpolation grid $G_2$ could be reduced into a smaller interpolation grid $G_1$, without deleting any points from an interpolation grid $G_0$. In this example, the PAGE algorithm is implemented by the distributed computing system 610 utilizing a general/captain architecture.

As shown in FIG. 25, the logic flow 2500 may initialize an output table on a captain node at block 2502. The output table may store a candidate reduction data set. The logic flow 2500 may perform a jackknife operation on interpolation grid $G_2$ with N points to find the P points not meeting the control parameters at 2504.

The logic flow 2500 may call a subroutine MPI_Allgatherv for execution by a general node and the captain node at block 2506. The logic flow 2500 may form an interpolation grid $G_1$ and update flags at 2508. The interpolation grid $G_1$ may include the interpolation grid $G_0$ plus P points.

The logic flow 2500 may interpolate all quantiles through the interpolation grid $G_1$ against a set of evaluation criterion until the precision parameter is satisfied. For instance, the logic flow 2500 may evaluate N points on the interpolation grid $G_1$ at 2510. The logic flow 2500 may call subroutines MPI_Reduce and MPI_Bcast on the general node and/or the captain node to broadcast a maximum criterion and the points V to achieve a maximum criterion at 2512. The logic flow 2500 may test whether the maximum criterion is less than or equal to a defined precision level at 2514. If the maximum criterion is less than or equal to the defined precision level, then the general node may call the subroutine MPI_Bcast to indicate a parameter qDONE is set to a value of 1 at 2516. The PAGE algorithm then terminates.

If the maximum criterion is greater than the defined precision level, then the general node and/or the captain node may call the subroutine MPI_Bcast to indicate a parameter qDONE is set to a value of 0 and the point V at 2518. The captain node may update the interpolation grid $G_1$ to include the interpolation grid $G_1$ plus the points V and update the flag at 2520. Operations at 2510, 2512, 2514, 2518 and 2520 may be repeated until the maximum criterion is less than or equal to a defined precision level at 2514. The PAGE algorithm then terminates.

Figure 26:
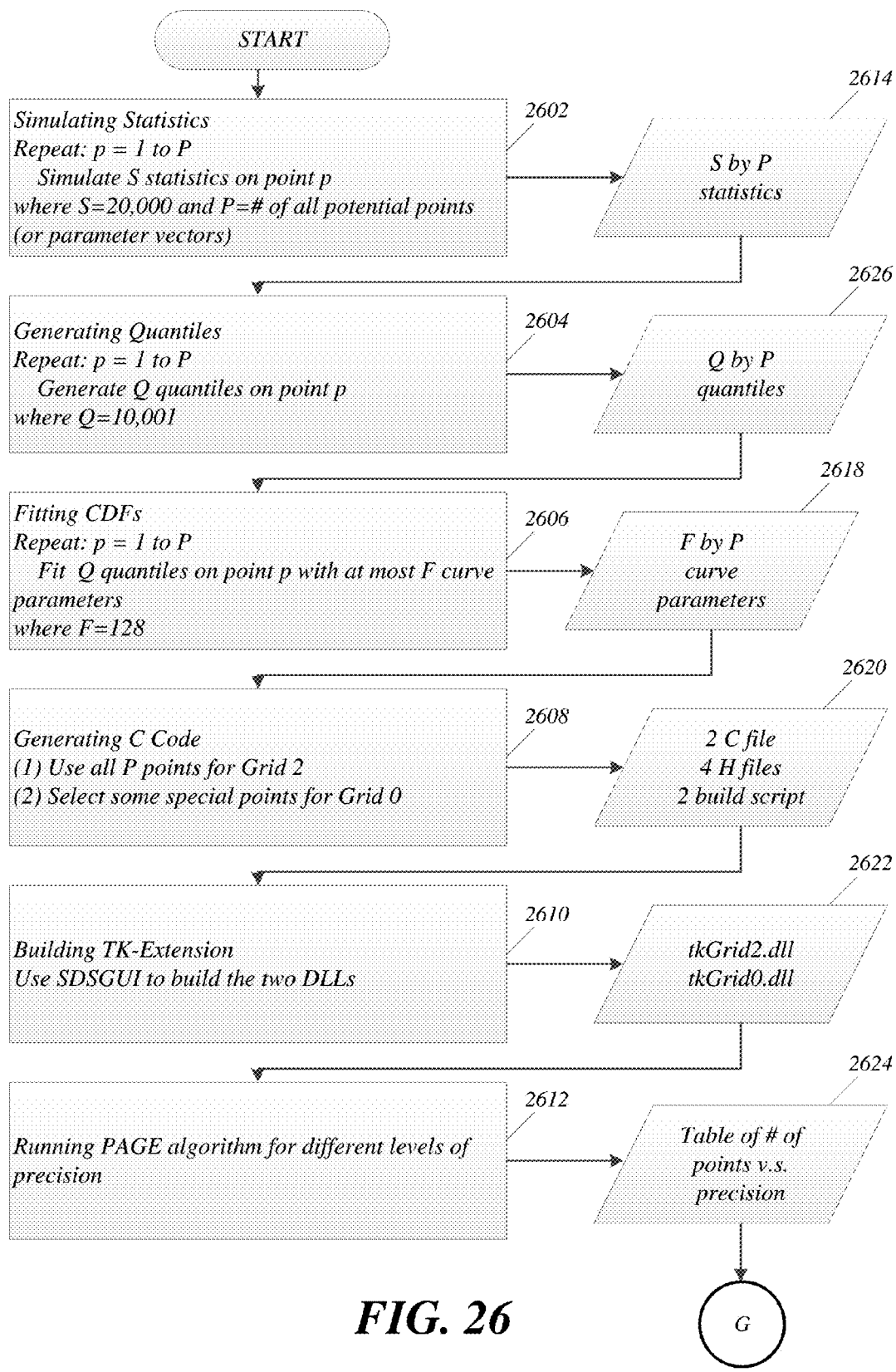
FIG. 26 illustrates an example of a thirteenth logic flow for a simulation subsystem.

FIG. 26 illustrates one example of a logic flow 2600. The logic flow 2600 may be representative of some or all of the operations executed by one or more embodiments described herein, such as the simulation subsystem 120 of the automated statistical test system 100. More particularly, the logic flow 2600 illustrates procedure for the simulation subsystem 120 to generate a computational representation 130.

As shown in FIG. 26, the logic flow 2600 may simulate statistics by repeating, for p equals 1 to P, simulating S statistics on point p, where S is set to 20,000 and P equals a number of all potential points (or parameter vectors), at block 2602. Block 2602 may output S by P statistics at 2614.

The logic flow 2600 may generate quantiles by repeating, for p equals 1 to P, generating Q quantiles on point p, where Q is set to 10,001, at block 2604. Block 2604 may output Q by P quantiles at 2626.

The logic flow 2600 may fit CDFs by repeating, for p equals 1 to P, fitting a curve to Q quantiles on point p with at most F curve parameters, where F is set to 128, at block 2606. Block 2606 may output F by P curve parameters at 2618.

The logic flow 2600 may generate C code using all P points for grid $G_2$ and selected points for grid $G_0$ at block 2608. Block 2608 may output two C files, four H files and two build scripts, at 2620.

The logic flow 2600 may build a TK-Extension using a SDSGUI to build two DLLs at block 2610. Block 2610 may output a tkGrid2.dll and a tkGrid0.dll at 2622.

The logic flow 2600 may run PAGE algorithm for different levels of precisions. Block 2612 outputs a table of number of points versus a given level of precision at 2624. Control is then passed to control location G.

Figure 27:
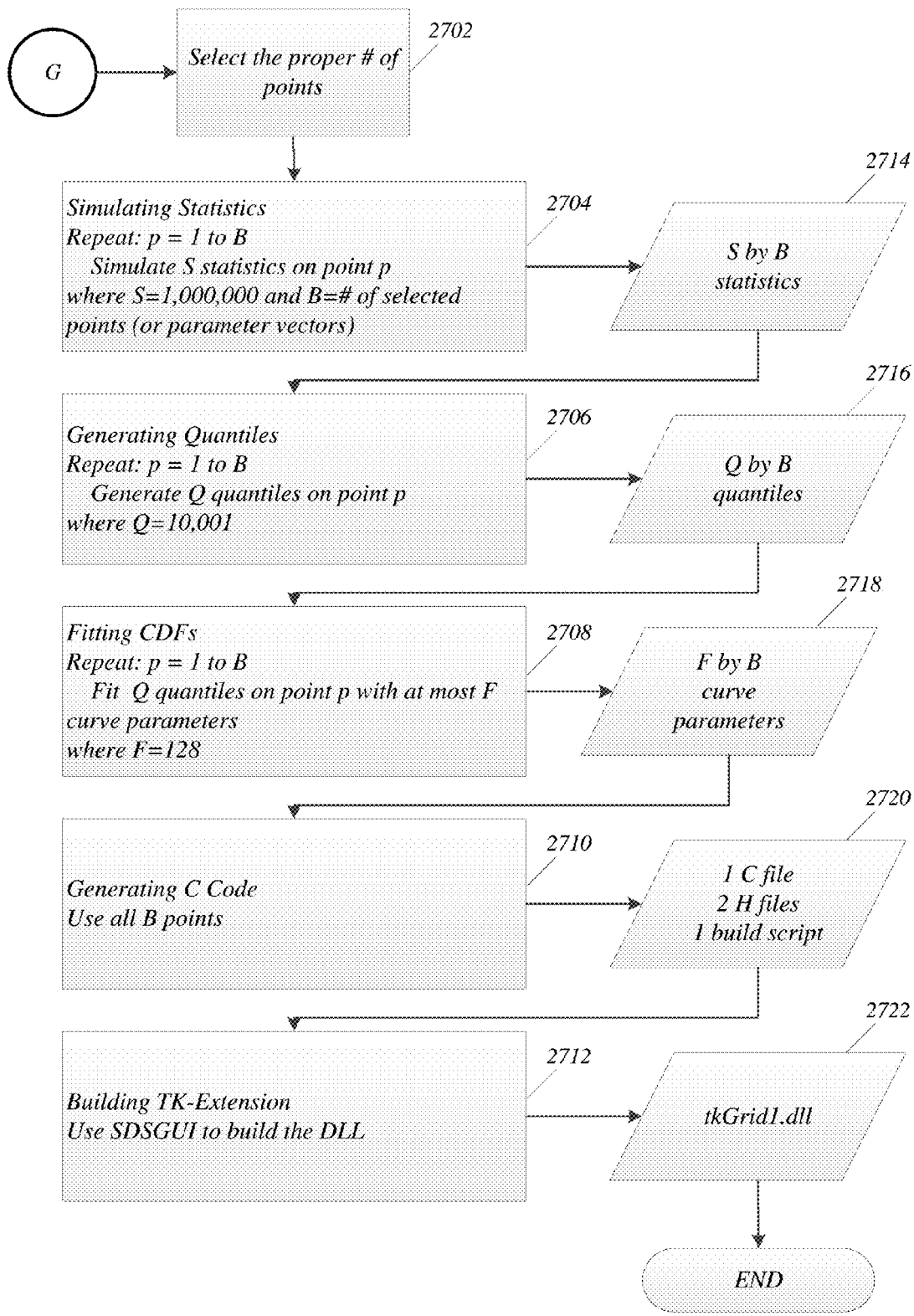
FIG. 27 illustrates an example of a fourteenth logic flow for a simulation subsystem.

FIG. 27 illustrates one example of a logic flow 2700. The logic flow 2700 may be representative of some or all of the operations executed by one or more embodiments described herein, such as the simulation subsystem 120 of the automated statistical test system 100. More particularly, the logic flow 2700 illustrates procedure for the simulation subsystem 120 to reduce a data storage size for a computational representation 130.

As shown in FIG. 27, the logic flow 2700 may receive control from control location G, and select a proper number of points for the computational representation 130 at 2702. The proper number of points may be selected by data reduction generator 2220, and it may be an example of a reduced simulated data structure 2210.

The logic flow 2700 may simulate statistics by repeating, for p equals 1 to B, simulating S statistics on point p, where S is set to 1,000,000 and B equals the number of selected points (or parameter vectors), at block 2704. Block 2704 may output S by B statistics at 2714.

The logic flow 2700 may generate quantiles by repeating, for p equals 1 to B, generating Q quantiles on point p, where Q is set to 10,001, at block 2706. Block 2706 may output Q by B quantiles at 2716.

The logic flow 2700 may fit CDFs by repeating, for p equals 1 to B, fitting a curve to Q quantiles on point p with at most F curve parameters, where F is set to 128, at block 2708. Block 2708 may output F by P curve parameters at 2718.

The logic flow 2700 may generate C code using all B points for grid $G_1$ at block 2710. Block 2710 may output one C file, two H files and one build script, at 2720.

The logic flow 2700 may build a TK-Extension using a SDSGUI to build one DLL at block 2712. Block 2712 may output a tkGrid1.dll at 2722. The tkGrid1.dll may be an example of an interpolation executable code 1940.

Figure 28A:
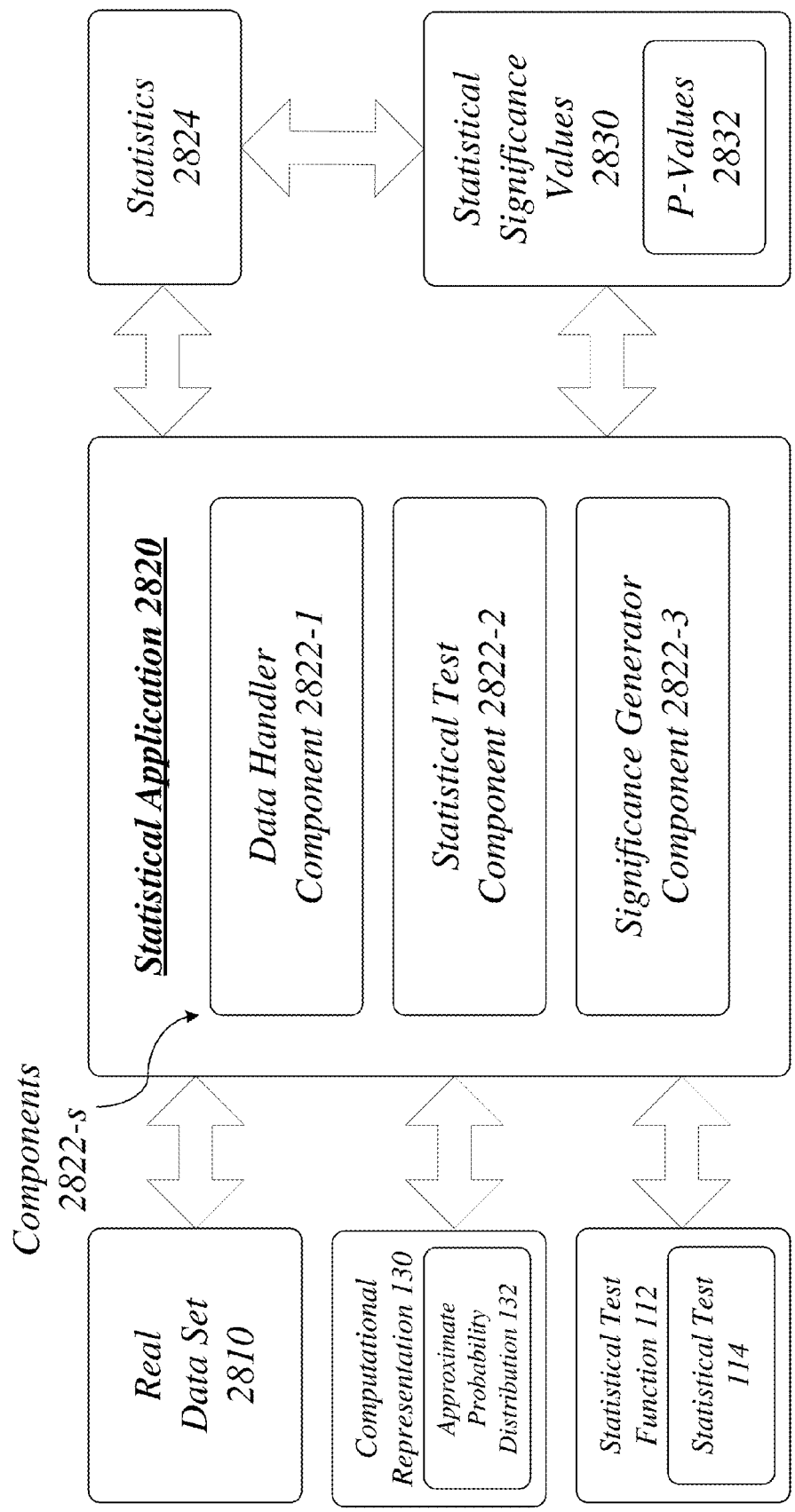
FIG. 28A illustrates an example of a statistical test subsystem.

FIG. 28A illustrates a block diagram for a statistical test subsystem 140. The statistical test subsystem 140 is part of the automated statistical test system 100. The statistical test subsystem 140 may, for example, generate statistical significance values for results of a statistical test using an approximate probability distribution.

As shown in FIG. 28A, the statistical test subsystem 140 may include a statistical test application 2820 having various components 2822-s. The statistical test application 2820 may include a data handler component 2822-1, a statistical test component 2822-2, and a significance generator component 2822-3. The statistical test application 2820 may include more or less components 2822-s for other implementations.

The data handler component 2822-1 may be generally arranged to handle data sets for use in a statistical test 114. For instance, the data handler component 2822-1 may receive a real data set 2810 from a client device 602. The real data set 2810 may represent actual data for analysis by the statistical test 114, such as sets of collected business or enterprise data, as opposed to simulated data 330 used to generate approximate probability distributions 132 for the statistical test 114. In one embodiment, for example, the real data set 2810 may comprise data representing one or more physical phenomena, such as occurrences of heads or tails in a coin flip, sales of a number of shoes in Asia, or a percentage increase or decrease in a financial portfolio. In one embodiment, for example, the real data set 2810 may comprise data representing one or more measurable phenomena, which may include both physical and non-physical phenomena. An example of non-measurable phenomena may include without limitation digital data from an electronic device, such as a sensor, computer, or characters on a display. Embodiments are not limited in this context.

The statistical test component 2822-2 may be generally arranged to perform the statistical test using the real data set 2810. The statistical test component 2822-2 may receive a computation representation 130 from, for example, the simulation subsystem 120. The statistical test component 2822-2 may also receive the statistical test function 112 for the statistical test 114. As previously described, the computational representation 130 may be arranged to generate an approximate probability distribution 132 for each point in a grid of points from simulated statistics 430 for the statistical test 114, statistics of the statistical test 114 to follow a probability distribution of a known or unknown form. The approximate probability distribution function 132 may comprise an empirical CDF, the empirical CDF to have a first level of precision relative to the probability distribution of the known or unknown form based on a sample size of the simulated statistics.

The statistical test component 2822-2 may generate a set of statistics 2824 for the statistical test 114 using the real data set 2810 and the statistical test function 112.

The significance generator component 2822-3 may be generally arranged to generate a set of statistical significance values 2830 for the statistics 2824 generated by the statistical test component 2822-2 using the approximate probability distribution 132 of the computational representation 130. The set of statistical significance values may be in the form of one or more p-values 2832.

A p-value 2832 may generally represent a probability of obtaining a given test statistic from observed or measurable data, such as a test statistic obtained or evaluated from the real data set 2810. More particularly, a p-value 2832 may represent a probability of obtaining a test statistic evaluated from the real data set 2810 that is at least as "extreme" as one that was actually observed, assuming the null hypothesis is true. For instance, assume a statistical test 114 involves rolling a pair of dice once and further assumes a null hypothesis that the dice are fair. An exemplary test statistic may comprise "the sum of the rolled numbers" and is one-tailed. When the dice are rolled, assume a result where each rolled dice finally lands and presents a side with a number 6. In this case, the test statistic is the sum of the rolled numbers from both dice, which would be 12 (6+6=12). A p-value 2832 for this particular result or outcome is a probability of 1/36, or approximately 0.028. The p-value 2832 of 0.028 represents the highest test statistic out of 6×6=36 possible outcomes. If a significance level of 0.05 is assumed, then this result would be deemed significant since 0.028 is lower (or more extreme) value than 0.05. As such, the observed result of 12 from the rolled dice would amount to evidence that could be used to reject the null hypothesis that the dice are fair.

Once p-values 2832 are generated, the significance generator component 2822-3 may use the p-values 2832 in a number of different ways. For instance, the significance generator component 2822-3 may present the p-values 2832 in a user interface view on an electronic display, an example of which is described with reference to FIG. 28B, infra. A user may then determine whether a null hypothesis for the statistical test 114 is rejected based on the p-values 2832.

Additionally or alternatively, this determination may be automatically made by the statistical application 2820. For instance, the significance generator component 2822-3 may compare a p-value 2832 to a defined threshold value. The significance generator component 2822-3 may then determine whether a null hypothesis for the statistical test 114 is rejected based on a comparison of a p-value 2832 to a defined threshold value. The significance generator component 2822-3 may then display a conclusion from the results on the electronic display.

Figure 28B:
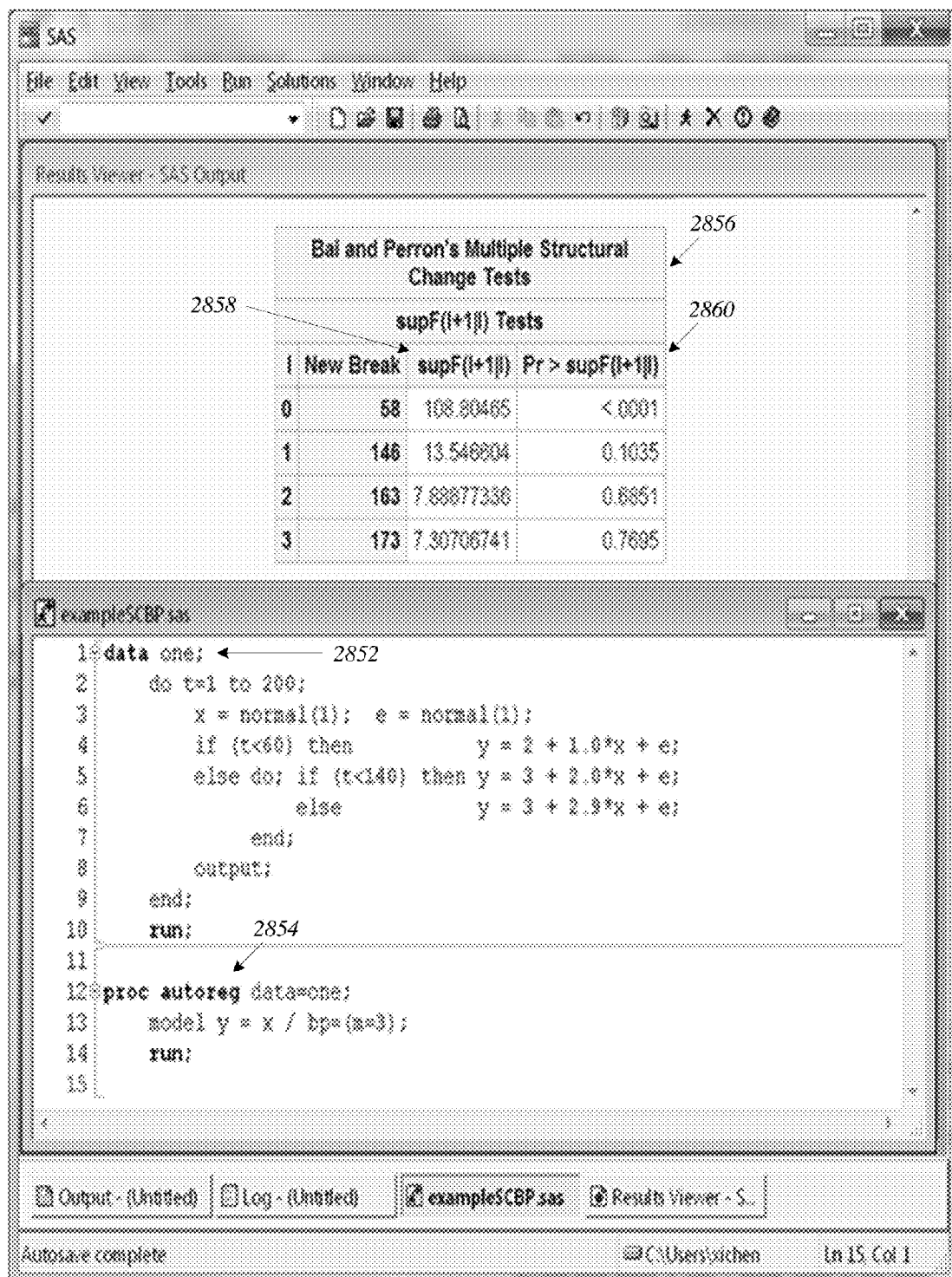
FIG. 28B illustrates an example of a user interface view for a statistical test subsystem.

FIG. 28B illustrates a user interface view 2850. The user interface view 2850 illustrates an exemplary user interface presenting output of a statistical test 114 in the form of a Bai and Perron's multiple structural change test as executed by the statistical test application 2820.

This example illustrates how to use Bai and Perron's multiple structural change tests and the p-values generated from a HPSIMULATE procedure. It uses the following notations:

t: a time index
y: a dependent variable
x: an independent variable
ϵ: an innovation
i.i.d.: independent and identically distributed
N(0,1): a standard normal distribution with mean 0 and variance 1
$H_0$: a null hypothesis
$H_1$: an alternative hypothesis
m: a number of break points in the data
$supF_{l+1|l}$: a sequential test for multiple structural change proposed by Bai and Perron, where l is the number of break points in the null hypothesis and l+1 in the alternative hypothesis As shown in a DATA operation 2852, labeled in the user interface view as "data one," the data generating process (DGP) has two break points at time indices 60 and 140. Precisely, the structural change model is as follows:

$$y_t = \begin{cases} 2 + x_t + \varepsilon_t, t \leq 59 \\ 3 + 2x_t + \varepsilon_t, 60 \leq t \leq 139, \varepsilon_t \sim i.i.d.N(0, 1) \\ 3 + 2.9x_t + \varepsilon_t, t \geq 140 \end{cases}$$

In a PROC operation 2854, labeled in the user interface view 2850 as "proc autoreg," a BP=(M=3) option is set in the AUTOREG procedure to apply Bai and Perron's multiple structural change tests on the data. The user interface view 2850 shows the result of $supF_{l+1|l}$ tests in a table 2856 annotated as "Bai and Perron's Multiple Structural Change Tests, supF(l+1|l) Tests," which sequentially checks the null hypothesis $H_0$: m=l versus the alternative null hypothesis $H_1$: m=l+1 for l=0, 1, 2, 3, where m is the number of break points in the data. A statistic for each test is shown in a column 2858 and a corresponding p-value, interpolated from the DLL generated by the HPSIMULATE procedure, is shown in a column 2860. If 15% is selected as a defined threshold value (e.g., a significance threshold), by comparing p-values to 15%, the null hypothesis $H_0$: m=0 and $H_0$: m=1; are rejected. However, the null hypothesis of $H_0$: m=2 cannot be rejected. According to one interpretation of these tests, there exists at least 2 break points in the data.

For the supFl+1|l test, in literature, critical values for only four significance levels, namely 1%, 2.5%, 5%, and 10%, are available on some parameter vectors. Hence, a user can only make decision at those four significance levels on the finite parameter vectors by comparing the test statistics, based on the real data set, with the critical values available in literature. However, with the support of HPSIMULATE system and the DLL generated from it, the user can make decision at any significance level of interest (e.g., 15% here) on any parameter vector.

FIG. 29 illustrates one example of a logic flow 2900. The logic flow 2900 may be representative of some or all of the operations executed by one or more embodiments described herein, such as the statistical test subsystem 140 of the automated statistical test system 100.

As shown in FIG. 29, the logic flow 2900 may receive a computational representation arranged to generate an approximate probability distribution for statistics of a statistical test based on a parameter vector, statistics of the statistical test to follow a probability distribution at block 2902. The probability distribution, for example, may comprise a probability distribution of a known or an unknown form. The logic flow 2900 may receive a real data set from a client device, the real data set to comprise data representing at least one measurable phenomenon or physical phenomenon at block 2904. The logic flow 2900 may generate statistics for the statistical test using the real data set on the parameter vector at block 2906. The logic flow 2900 may generate the approximate probability distribution of the computational representation on the parameter vector at block 2908. The logic flow 2900 may generate a set of statistical significance values for the statistics through interpolation at block 2910 by using the approximate probability distribution of the computational representation, the set of statistical significance values comprising one or more p-values, each p-value to represent a probability of obtaining a given test statistic from the real data set, at block 2906.

Figure 30:
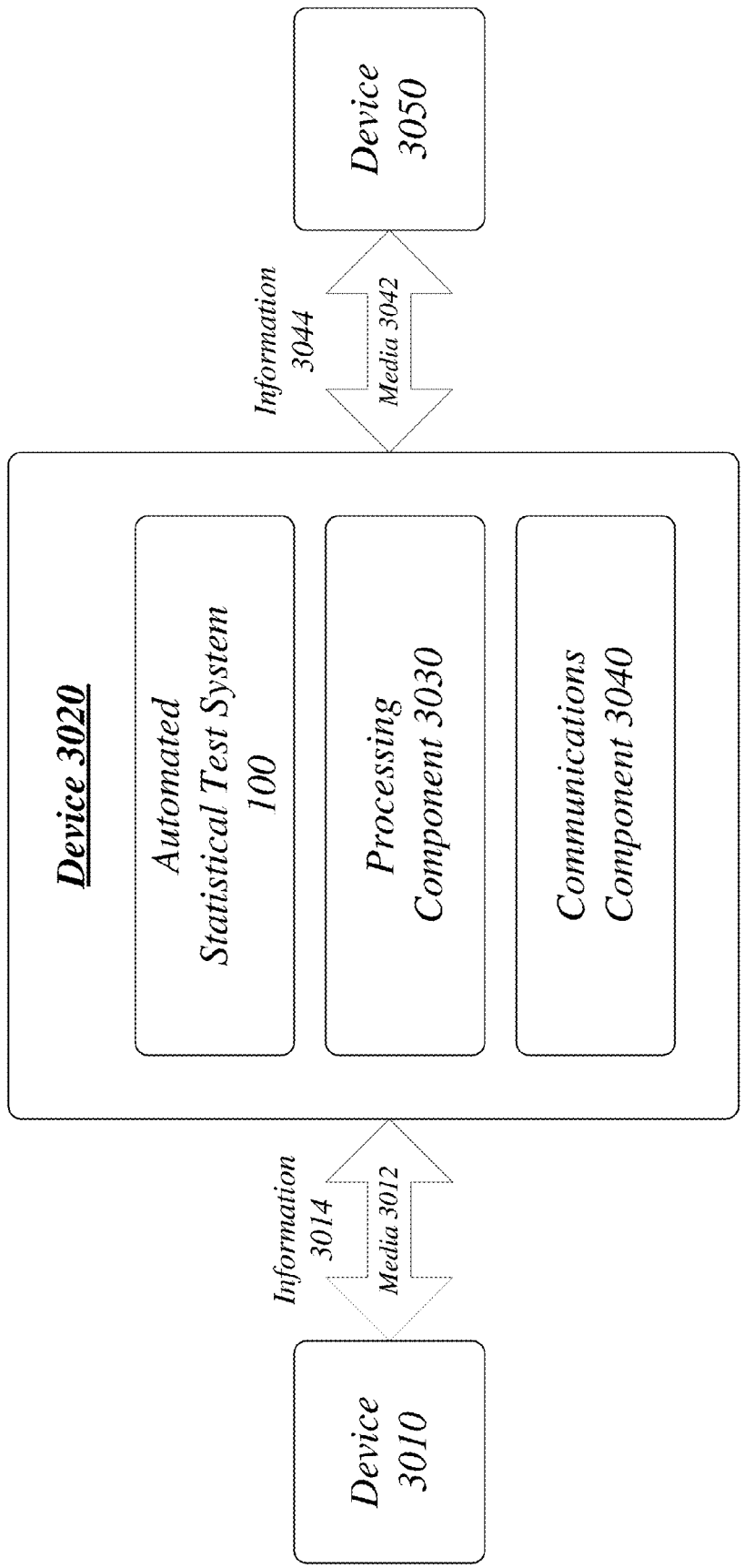
FIG. 30 illustrates an example of a centralized system.

FIG. 30 illustrates a block diagram of a centralized system 3000. The centralized system 3000 may implement some or all of the structure and/or operations for the automated statistical test system 100 in a single computing entity, such as entirely within a single device 3020.

The device 3020 may comprise any electronic device capable of receiving, processing, and sending information for the automated statistical test system 100. Examples of an electronic device may include without limitation an ultra-mobile device, a mobile device, a personal digital assistant (PDA), a mobile computing device, a smart phone, a telephone, a digital telephone, a cellular telephone, eBook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, subscriber station, mobile subscriber center, radio network controller, router, hub, gateway, bridge, switch, machine, or combination thereof. The embodiments are not limited in this context.

The device 3020 may execute processing operations or logic for the automated statistical test system 100 using a processing component 3030. The processing component 3030 may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The device 3020 may execute communications operations or logic for the automated statistical test system 100 using communications component 3040. The communications component 3040 may implement any well-known communications techniques and protocols, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The communications component 3040 may include various types of standard communication elements, such as one or more communications interfaces, network interfaces, network interface cards (NIC), radios, wireless transmitters/receivers (transceivers), wired and/or wireless communication media, physical connectors, and so forth. By way of example, and not limitation, communication media 3012, 3042 include wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media.

The device 3020 may communicate with other devices 3010, 3050 over a communications media 3012, 3042, respectively, using communications information 3014, 3044, respectively, via the communications component 3040. The devices 3010, 3050 may be internal or external to the device 3020 as desired for a given implementation. An example for the devices 3010 may be one or more client devices used to access results from the automated statistical test system 100.

Figure 31:
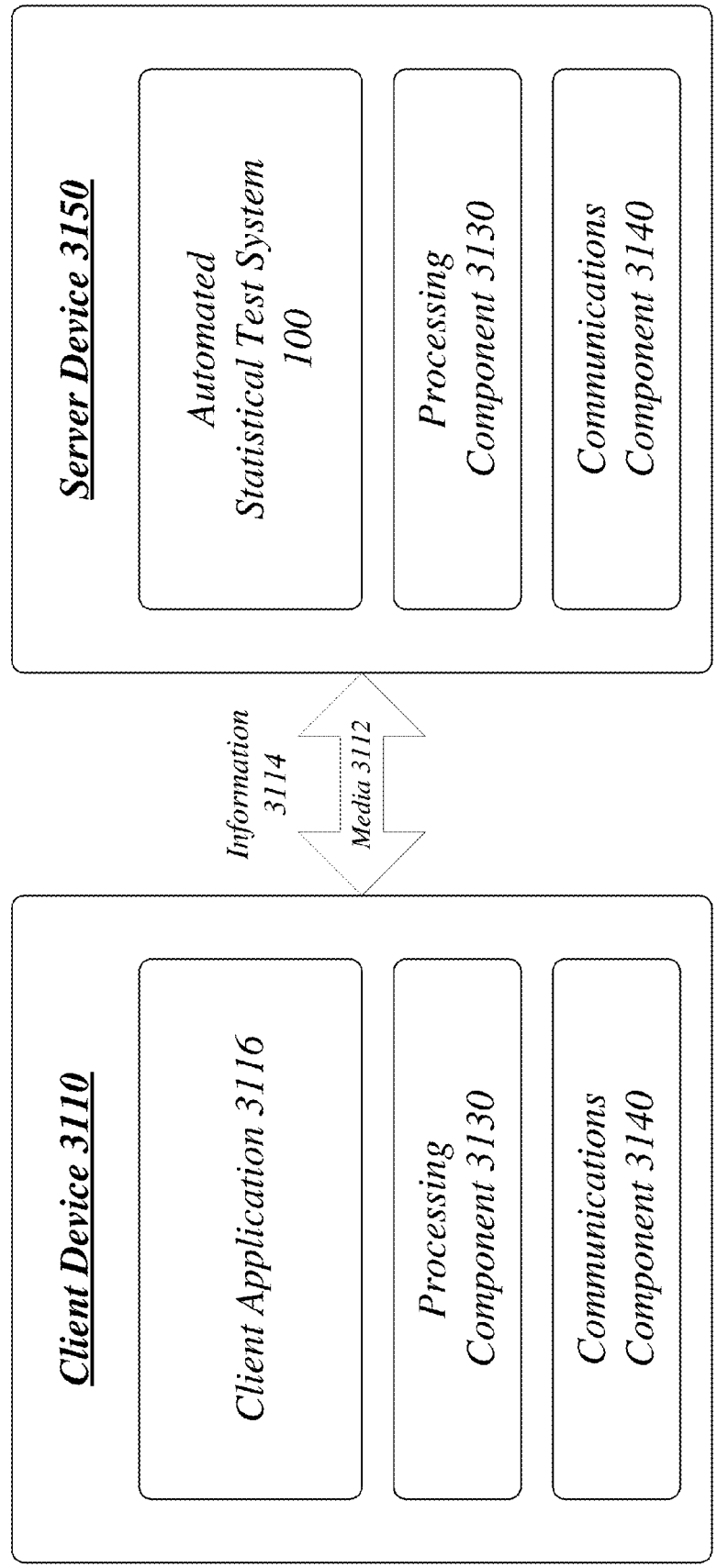
FIG. 31 illustrates an example of a distributed system.

FIG. 31 illustrates a block diagram of a distributed system 3100. The distributed system 3100 may distribute portions of the structure and/or operations for the automated statistical test system 100 across multiple computing entities. Examples of distributed system 3100 may include without limitation a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

The distributed system 3100 may comprise a client device 3110 and a server device 3150. In general, the client device 3110 and the server device 3150 may be the same or similar to the client device 3020 as described with reference to FIG. 30. For instance, the client device 3110 and the server device 3150 may each comprise a processing component 3130 and a communications component 3140 which are the same or similar to the processing component 3030 and the communications component 3040, respectively, as described with reference to FIG. 30. In another example, the devices 3110, 3150 may communicate over a communications media 3112 using communications information 3114 via the communications components 3140.

The client device 3110 may comprise or employ one or more client programs that operate to perform various methodologies in accordance with the described embodiments. In one embodiment, for example, the client device 3110 may implement a client application 3116 to configure, control or otherwise manage the automated statistical test system 100. The client application 3116 may also be used to view results from the automated statistical test system 100, such as statistical significance values or null hypothesis results. The client application 3116 may be implemented as a thin-client specifically designed to interoperate with the automated statistical test system 100. Alternatively, the client application 3116 may be a web browser to access the automated statistical test system 100 via one or more web technologies. Embodiments are not limited in this context.

The server device 3150 may comprise or employ one or more server programs that operate to perform various methodologies in accordance with the described embodiments. In one embodiment, for example, the server device 3150 may implement the automated statistical test system 100, and any interfaces needed to permit access to the automated statistical test system 100, such as a web interface. The server device 3150 may also control authentication and authorization operations to enable secure access to the automated statistical test system 100 via the media 3112 and information 3114.

Figure 32:
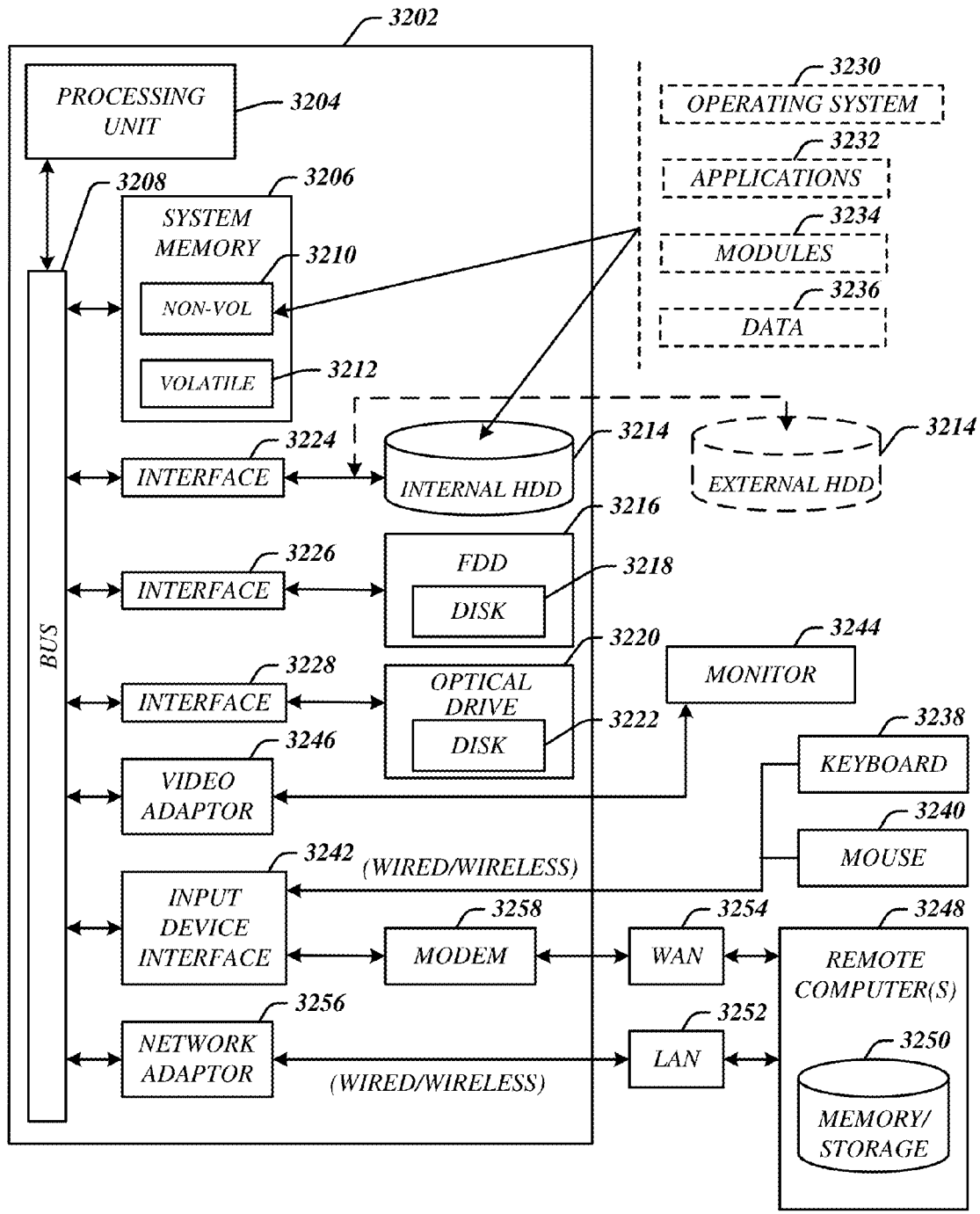
FIG. 32 illustrates an example of a computing architecture.

FIG. 32 illustrates an embodiment of an exemplary computing architecture 3200 suitable for implementing various embodiments as previously described. In one embodiment, the computing architecture 3200 may comprise or be implemented as part of an electronic device. Examples of an electronic device may include those described with reference to FIG. 31, among others. The embodiments are not limited in this context.

As used in this application, the terms "system" and "component" are intended to refer to a computer-related entity, either hardware, a combination of hardware and software, software, or software in execution, examples of which are provided by the exemplary computing architecture 3200. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of information communicated over the communications media. The information can be implemented as information allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 3200 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 3200.

As shown in FIG. 32, the computing architecture 3200 comprises a processing unit 3204, a system memory 3206 and a system bus 3208. The processing unit 3204 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 3204.

The system bus 3208 provides an interface for system components including, but not limited to, the system memory 3206 to the processing unit 3204. The system bus 3208 can be any of several types of bus structure that may further interconnect to a memory bus (with or without a memory controller), a peripheral bus, and a local bus using any of a variety of commercially available bus architectures. Interface adapters may connect to the system bus 3208 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 3200 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 3206 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 32, the system memory 3206 can include non-volatile memory 3210 and/or volatile memory 3212. A basic input/output system (BIOS) can be stored in the non-volatile memory 3210.

The computer 3202 may include various types of computer-readable storage media in the form of one or more lower speed memory units, including an internal (or external) hard disk drive (HDD) 3214, a magnetic floppy disk drive (FDD) 3216 to read from or write to a removable magnetic disk 3218, and an optical disk drive 3220 to read from or write to a removable optical disk 3222 (e.g., a CD-ROM or DVD). The HDD 3214, FDD 3216 and optical disk drive 3220 can be connected to the system bus 3208 by a HDD interface 3224, an FDD interface 3226 and an optical drive interface 3228, respectively. The HDD interface 3224 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 3210, 3212, including an operating system 3230, one or more application programs 3232, other program modules 3234, and program data 3236. In one embodiment, the one or more application programs 3232, other program modules 3234, and program data 3236 can include, for example, the various applications and/or components of the automated statistical test system 100.

A user can enter commands and information into the computer 3202 through one or more wire/wireless input devices, for example, a keyboard 3238 and a pointing device, such as a mouse 3240. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 3204 through an input device interface 3242 that is coupled to the system bus 3208, but can be connected by other interfaces such as a parallel port, IEEE 1394 serial port, a game port, a USB port, an IR interface, and so forth.

A monitor 3244 or other type of display device is also connected to the system bus 3208 via an interface, such as a video adaptor 3246. The monitor 3244 may be internal or external to the computer 3202. In addition to the monitor 3244, a computer typically includes other peripheral output devices, such as speakers, printers, and so forth.

The computer 3202 may operate in a networked environment using logical connections via wire and/or wireless communications to one or more remote computers, such as a remote computer 3248. The remote computer 3248 can be a workstation, a server computer, a router, a personal computer, portable computer, microprocessor-based entertainment appliance, a peer device or other common network node, and typically includes many or all of the elements described relative to the computer 3202, although, for purposes of brevity, only a memory/storage device 3250 is illustrated. The logical connections depicted include wire/wireless connectivity to a local area network (LAN) 3252 and/or larger networks, for example, a wide area network (WAN) 3254. Such LAN and WAN networking environments are commonplace in offices and companies, and facilitate enterprise-wide computer networks, such as intranets, all of which may connect to a global communications network, for example, the Internet.

When used in a LAN networking environment, the computer 3202 is connected to the LAN 3252 through a wire and/or wireless communication network interface or adaptor 3256. The adaptor 3256 can facilitate wire and/or wireless communications to the LAN 3252, which may also include a wireless access point disposed thereon for communicating with the wireless functionality of the adaptor 3256.

When used in a WAN networking environment, the computer 3202 can include a modem 3258, or is connected to a communications server on the WAN 3254, or has other means for establishing communications over the WAN 3254, such as by way of the Internet. The modem 3258, which can be internal or external and a wire and/or wireless device, connects to the system bus 3208 via the input device interface 3242. In a networked environment, program modules depicted relative to the computer 3202, or portions thereof, can be stored in the remote memory/storage device 3250. It will be appreciated that the network connections shown are exemplary and other means of establishing a communications link between the computers can be used.

The computer 3202 is operable to communicate with wire and wireless devices or entities using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 33:
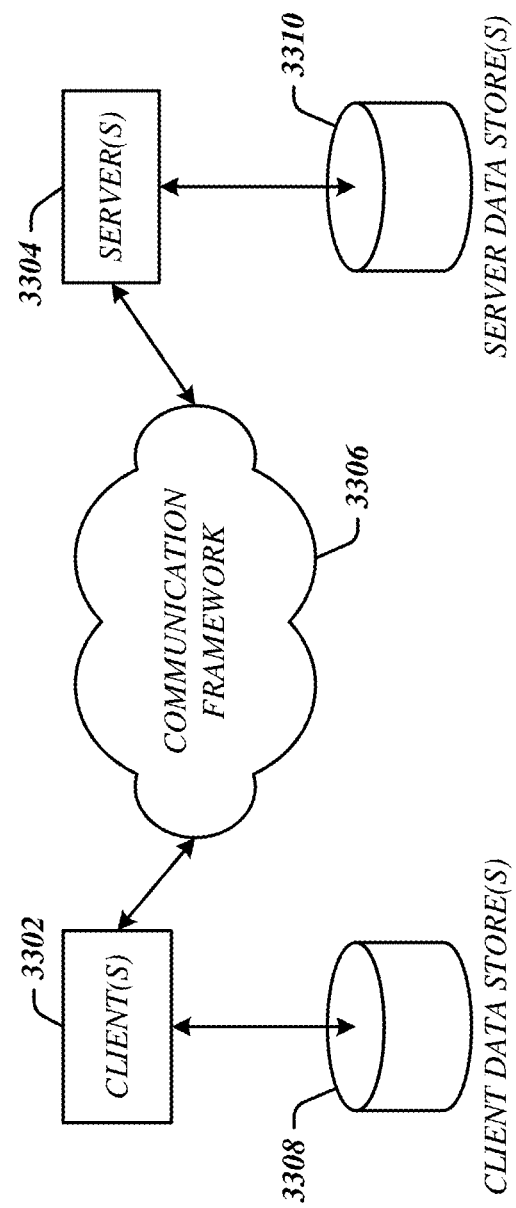
FIG. 33 illustrates an example of a communications architecture.

FIG. 33 illustrates a block diagram of an exemplary communications architecture 3300 suitable for implementing various embodiments as previously described. The communications architecture 3300 includes various common communications elements, such as a transmitter, receiver, transceiver, radio, network interface, baseband processor, antenna, amplifiers, filters, power supplies, and so forth. The embodiments, however, are not limited to implementation by the communications architecture 3300.

As shown in FIG. 33, the communications architecture 3300 comprises includes one or more clients 3302 and servers 3304. The clients 3302 may implement the client device 3110. The servers 3304 may implement the server device 3150. The clients 3302 and the servers 3304 are operatively connected to one or more respective client data stores 3308 and server data stores 3310 that can be employed to store information local to the respective clients 3302 and servers 3304, such as cookies and/or associated contextual information.

The clients 3302 and the servers 3304 may communicate information between each other using a communication framework 3306. The communications framework 3306 may implement any well-known communications techniques and protocols. The communications framework 3306 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 3306 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 3302 and the servers 3304. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Figure 34:
FIG. 34 illustrates an example of an article of manufacture.

FIG. 34 illustrates an embodiment of a storage medium 3400. The storage medium 3400 may comprise an article of manufacture. In one embodiment, the storage medium 3400 may comprise any non-transitory, physical, or hardware computer readable medium or machine readable medium, such as an optical, magnetic or semiconductor storage. The storage medium may store various types of computer executable instructions 3402, such as instructions to implement one or more of the logic flows as described herein. Examples of a computer readable or machine readable storage medium may include any tangible media capable of storing electronic data, including physical memory, hardware memory, volatile memory or non-volatile memory, removable or non-removable memory, erasable or non-erasable memory, writeable or re-writeable memory, and so forth. Examples of computer executable instructions may include any suitable type of code, such as assembly code, source code, compiled code, interpreted code, executable code, static code, dynamic code, object-oriented code, visual code, compressed code, uncompressed code, and the like. The embodiments are not limited in this context.

The computer executable instructions 3402 may be implemented using one or more different types of programming languages. A programming language is an artificial language designed to communicate instructions to a machine, particularly a computer. Programming languages can be used to create programs that control the behavior of a machine and/or to express algorithms. Many programming languages have computation specified in an imperative form (e.g., as a sequence of operations to perform), while other languages utilize other forms of program specification such as the declarative form (e.g., the desired result is specified, not how to achieve it). The description of a programming language is usually split into the two components of syntax (form) and semantics (meaning). Some languages are defined by a specification document (e.g. the C programming language is specified by an ISO Standard), while other languages (e.g., Perl) have a dominant implementation that is treated as a reference.

In one embodiment, for example, the computer executable instructions 3402 may be implemented in a specific programming language as developed by SAS Institute, Inc., Cary, N.C. For instance, the computer executable instructions 3402 may be implemented in a procedure referred to as HPSIMULATE, which is a procedure suitable for execution within a SAS programming language and computing environment. In such embodiments, the computer executable instructions 3402 may follow syntax and semantics associated with HPSIMULATE. However, embodiments are not limited to HPSIMULATE, and further, do not need to necessarily follow the syntax and semantics associated with HPSIMULATE. Embodiments are not limited to a particular type of programming language.

The HPSIMULATE procedure dynamically loads a TK-extension to perform statistical simulation and other tasks, such as post-processing, optimization, and other tasks. In one embodiment, the HPSIMULATE procedure may perform statistical simulation in distributed computing and multi-thread environment.

The HPSIMULATE may have a syntax as follows:
PROC HPSIMULATE
DATA=SAS-data-set
DATADIST=(COPYONGENERAL|COPYTONODES-|ROUNDROBIN|DEFAULT|INSLICES|COLUMN-WISE|COLUMNWISEBY)
    NAMELEN<=number>
    NOCLPRINT<=number>
    DEBUG$<=number>
    NTRIES=number
    NOPRINT;
    MODULE
    EXT=name
    TASK=number
    DEPENDENT|CONTROLPARALLEL
    TASKPARMV|VARPARM|VAR=(variable-list)
    TASKPARMN|NUMBERPARM|TASKPARM=(number-list)
    TASKPARMS|STRINGPARM=(quoted-string-list)
    NAME=name;
    OUTPUT
    OUT|OUT1=SAS-data-set
    OUT2=SAS-data-set
    OUT3=SAS-data-set
    OUT4=SAS-data-set
    OUT5=SAS-data-set
    OUT6=SAS-data-set
    OUT7=SAS-data-set
    OUT8=SAS-data-set
    OUT9=SAS-data-set
    REG|REGSTART=number;
    PERFORMANCE
    NODES=number
    NTHREADS=number.

The options in gray font are some unnecessary options to run the HPSIMULATE procedure, or reserved for future usage.

A set of statements and options used with the HPSIMULATE procedure are summarized in the following Table 6:

TABLE 6

| Description | Statement | Option |
|---|---|---|
| Data Set Options | | |
| Specify the input data set | HPSIMULATE | DATA= |
| Specify how the data are distributed on grid | HPSIMULATE | DATADIST= |
| Write results to an output data set | OUTPUT | OUT= |
| Grid Control Options | | |
| Specify the number of captains | PERFORMANCE | NODES= |
| Specify the number of threads | PERFORMANCE | NTHREADS= |

TABLE 6-continued

| Description | Statement | Option |
|---|---|---|
| Task Control Options | | |
| Specify the TK-extension to execute the tasks | MODULE | EXT= |
| Specify the task ID to be executed | MODULE | TASK= |
| Specify whether the task needs to control communication between threads and between nodes | MODULE | DEPENDENT |
| Specify the variable names in input data set | MODULE | TASKPARMV= |
| Specify the number parameters | MODULE | TASKPARMN= |
| Specify the string parameters | MODULE | TASKPARMS= |
| Specify the name of the module | MODULE | NAME= |

The HPSIMULATE procedure may use the following statement:
    PROC HPSIMULATE options.
The HPSIMULATE statement may use a first option, as follows:
    DATA=SAS-data-set.
The DATA option specifies the input data set containing parameters for simulation or data for other tasks. If the DATA option is not specified, PROC HPSIMULATE uses the most recently created SAS data set.

The HPSIMULATE statement may use a second option, as follows:
    DATADIST=(options)
The second option specifies how data is distributed on a distributed computing system. The second option may have a set of options as shown in Table 7, as follows:

TABLE 7

| Option | Description |
|---|---|
| COPYONGENERAL | Make a copy on general. |
| COPYTONODES | Make a copy of data set to each captain so that each captain has all data. This is the default option. |
| ROUNDROBIN | Distribute the data to captains row-wisely according to round-robin rule. |
| DEFAULT | Distribute the data to captains row-wisely according to first-come-first-serve rule. |
| INSLICES | Distribute the data to captains in slices. |
| COLUMNWISE | Distribute the data to captains column-wisely and evenly. |
| COLUMNWISEBY | Distribute the data to captains column-wisely according to the groups defined in the first row of data: (1) the group ID must be integer; (2) negative ID indicating the corresponding columns need not be distributed; and (3) zero ID indicating the columns must be distributed to all captains. |

The HPSIMULATE procedure may have a module statement as follows:
    MODULE options.
The MODULE statement specifies the TK-extension and parameters for the task to be executed. The MODULE statement may use seven options, as follows:
    EXT=name
    TASK=number
    DEPENDENT|CONTROLPARALLEL
    TASKPARMV|VARPARM|VAR=(variable-list)
    TASKPARMN|NUMBERPARM|TASKPARM=(number-list)
    TASKPARMS|STRINGPARM=(quoted-string-list)
    NAME=name The EXT option specifies the name of the TK-extension to execute the task. The TK-extension can focus on the task-oriented calculation since the data I/O, communication between client and grid and on grid, and multi-threading are all left to the HPSIMULATE procedure. The TK-extension is dynamically loaded in the procedure. The EXT=option must be specified. The TK-extension must follow some protocol defined in a virtual TK-extension which includes the structures of instance and factory of functions; in other words, any user specified TK-extension is the "child" of that virtual TK-extension which is called TKVRT and introduced later in the Details section.

The TASK option specifies the task ID to be executed. The TK-extension understands the task ID and executes the right task. By default, TASK=option is set to zero.

The DEPENDENT|CONTROLPARALLEL option specifies whether the task needs to control communication between threads and between nodes.

The TASKPARMV|VARPARM|VAR option specifies the variables in the input data set. For example, if the input data set contains parameters for the simulation, the variables are the names of parameters; if the input data set is for post-processing, the variables define the columns of data to be dealt with. The TASKPARMV option should be specified. If an input data set is not needed, a dummy data set and a dummy variable name may be specified.

The TASKPARMN|NUMBERPARM|TASKPARM option specifies the number parameters for the task. For example, the number of simulations, the random seed to start, the optimization grid.

The TASKPARMS|STRINGPARM option specifies the string parameters for the task. For example, the output folder, the output file name or prefix and suffix.

The NAME option specifies a name of the module.

The HPSIMULATE procedure may include an output statement, as follows:
  OUTPUT OUT=SAS-data-set The OUTPUT statement creates an output SAS data set as specifies by the following OUT option:
  OUT=SAS-data-set
The OUT option names the output SAS data set containing the task-dependent results which might be simulated statistics or the quantiles.

The HPSIMULATE procedure may include a performance statement, called PERFORMANCE. The PERFORMANCE statement is a common statement supported in a high performance architecture (HPA) bridge. Only some options used in the HPSIMULATE procedure are listed as follows:
  NODES=number
The NODES option specifies a number of captains. If NODES=0 is specified, the procedure is executed on client side and no distributed computing environment computers are involved.
  NTHREADS=number
The NTHREADS option specifies the number of threads to be used in each computer.

The HPSIMULATE procedure is based, in part, on the HPLOGISTICS procedure. The framework of the HPLOGISTICS procedure may implement all data input/output, communication between client devices 602-e and the distributed computing system 610, or general and captain nodes of the distributed computing system 610, and multi-threading details. A framework extended on the framework of the HPLOGISTICS procedure is shown in FIGS. 9-11. The framework is flexible to support any simple and complex algorithm. In this manner, a client application may plug-in its own tasks, like simulation or estimation. A user's TK-extension should follow some protocol defined in a virtual TK-extension which includes structures of instance and factory of functions. In other words, any user specified TK-extension is a "child" of that virtual TK-extension which is called TKVRT.

For the virtual TK-extension TKVRT, the user-specified TK-extension should be a "child" of the TKVRT TK-extension. The TKVRT defines the following public structures related to input parameters and output result:

```
struct TKVRT_COLUMN              /* Column name element */
{
    int                          type;
    int                          namelen;
    char                         name[TKVRT_MAXNAME];
    tkvrtColumnPtr               next;
};
struct TKVRT_DATA                /* Matrix in memory or
                                    utility file on disk
                                    with column names*/
{
    TKBoolean                    QinMemory;
    int 64_t                     nRow;
    int64_t                      curRow;
    int64_t                      nColumn;
    tkvrtColumnPtr               colHead;
    tkvrtColumnPtr               colTail;
    double                       *mat;
    tkrecUtFilePtr               fid;
    TKPoolh                      Pool;
};
struct TKVRT_PARMS               /* Parameters */
{
    long          nCaptains;     /* is the number of
                                    captains */
    long          captainID;     /* is the current captain
                                    ID */
    long          nThreads;      /* is the number of threads
                                    */
    long          threadID;      /* is the current thread ID
                                    */
    long          task;          /* is the task id */
    char          taskFlag[5];   /* is the task flag */
```

| | | |
|---|---|---|
| long | nTaskParm;/ | /* is the number of input number parameters */ |
| double | *taskParmList; | /* is the list of input number parameters */ |
| long | nTaskParmStr; | /* is the number of input string parameters */ |
| char | **taskParmStrList; | /* is the list of input string parameters */ |
| long | *taskParmStrLenList; | /* is the list of the length of input string parameters */ |
| long | nInputData; | /* is the number of input data sets */ |
| tkvrtDataPtr | inputDataList; | /* is the list of input data sets */ |
| long | nOutputParm; | /* is the number of output number parameters */ |
| int64_t | sOutputParm; | /* is the size of allocated memory for output number parameters */ |
| double | *outputParmList; | /* is the list of output number parameters */ |
| long | nOutputInt64Parm; | /* is the number of output integer parameters */ |
| int64_t | sOutputInt64Parm; | /* is the size of allocated memory for output integer parameters */ |
| int64_t | *outputInt64ParmList; | /* is the list of output integer parameters */ |
| long | nOutputParmStr; | /* is the number of output string parameters */ |
| char | **outputParmStrList; | /* is the list of output string parameters */ |
| long | *outputParmStrLenList; | /* is the list of the length of output string parameters*/ |
| long | nOutputData; | /* is the number of output data sets */ |
| tkvrtDataPtr | outputDataList; | /* is the list of output data sets */ |
| TKPoolh | taskPool; | /* is the memory Pool */ |
| TKMemPtr | userPtr; | /* is the pointer to anything else */ |
| TKMemPtr | userPtr1; | /* is the pointer to anything else */ |
| TKMemPtr | userPtr2; | /* is the pointer to anything else */ |
| TKMemPtr | userPtr3; | /* is the pointer to anything else */ |
| TKMemPtr | userPtr4; | /* is the pointer to anything else */ |

The function Set up Thread Work(.) in tksimt.c may provide details on how the parameter structures are initialized.

The TKVRT also declares following public functions:

| | | |
|---|---|---|
| TKStatus | (*ValueGet ) | (tkvrtInstPtr, int, TKMemPtr, TKMemSize *); |
| TKStatus | (*ValueSet ) | (tkvrtInstPtr, int, TKMemPtr); |
| TKStatus | (*DestroyInstance) | (tkvrtInstPtr *); |
| TKStatus | (*ResetInstance ) | (tkvrtInstPtr); |
| TKStatus | (*Initialize ) | (tkvrtInstPtr); |
| TKStatus | (*Analyze ) | (tkvrtInstPtr); |
| TKStatus | (*Summarize ) | (tkvrtInstPtr); |
| TKStatus | (*GridInitialize ) | (tkvrtInstPtr); |
| TKStatus | (*GridSummarize ) | (tkvrtInstPtr, TKMemPtr); |

The TKVRT are implemented in tkvrt.h, tkvrtmem.h, tkvrtp.h, and tkvrt.c. An example of the child of TKVRT is TKSCBP, which are implemented in tkscbp.h, tkscbpp.h, and tkscbp.c, and is used to simulate multiple structural change tests' statistics and generate the quantiles for constructing the empirical CDFs.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects in all situations.

Some systems may use an open-source framework for storing and analyzing big data in a distributed computing environment. For example, some systems may use Hadoop® for applications in which the simulated functions depend on given fixed data that are supplied externally to the algorithm, and that these data can be read from distributed file systems, such as Hadoop®. This could apply, for example, if subsets of the data on different nodes correspond to different cases to be simulated. In that case, different nodes can do the simulations for the subcases corresponding to the data that they read locally, without need to pass data across the network. To help make that process work, the system could adopted a map-reduce-like pattern for controlling which nodes do which simulations.

Some systems may use cloud computing, which can enable ubiquitous, convenient, on-demand network access to a shared pool of configurable computing resources (e.g., networks, servers, storage, applications and services) that can be rapidly provisioned and released with minimal management effort or service provider interaction. Some grid systems may be implemented as a multi-node cluster. Some systems may use a massively parallel processing (MPP) database architecture. Some systems may be used in conjunction with complex analytics (e.g., high-performance analytics, complex business analytics, and/or big data analytics) to solve complex problems quickly.

What has been described above includes examples of the disclosed architecture. It is, of course, not possible to describe every conceivable combination of components and/or methodologies, but one of ordinary skill in the art may recognize that many further combinations and permutations are possible. Accordingly, the described architecture is intended to embrace all such alterations, modifications and variations that fall within the spirit and scope of the appended claims.

The invention claimed is:

1. An article of manufacture comprising a non-transitory computer-readable storage medium containing instructions that, when executed, enable a system to:
   generate simulated data for a statistical test, statistics of the statistical test based on parameter vectors to follow a probability distribution;
   simulate statistics for the parameter vectors from the simulated data with a distributed computing system comprising multiple nodes each having one or more processors capable of executing multiple threads, the simulation to occur by distribution of portions of the simulated data across the multiple nodes of the distributed computing system; and
   control task execution on the distributed portions of the simulated data on each node of the distributed computing system with a virtual software class arranged to coordinate task and sub-task operations across the nodes of the distributed computing system, the virtual software class to comprise an extensible template to create objects, provide initial values for states, and control behavior for use by a software module having a software class for the statistical test, with the software class to comprise a child of the virtual software class.

2. The article of claim 1, further comprising instructions that, when executed, enable the system to create an instance of the virtual software class on each node of the distributed computing system.

3. The article of claim 1, further comprising instructions that, when executed, enable the system to control thread execution for each node of the distributed computing system with a first instance of the virtual software class.

4. The article of claim 1, further comprising instructions that, when executed, enable the system to initialize a parent thread with parent parameters using a first instance of the virtual software class.

5. The article of claim 1, further comprising instructions that, when executed, enable the system to initialize a child thread with child parameters using a first instance of the virtual software class.

6. The article of claim 1, further comprising instructions that, when executed, enable the system to analyze work results of a child thread with a second instance of the virtual software class.

7. The article of claim 1, further comprising instructions that, when executed, enable the system to summarize work results of a child thread to a parent thread with a third instance of the virtual software class.

8. The article of claim 1, further comprising instructions that, when executed, enable the system to initialize a grid with parent parameters with a fourth instance of the virtual software class.

9. The article of claim 1, further comprising instructions that, when executed, enable the system to summarize a grid with parent parameters with a fifth instance of the virtual software class.

10. The article of claim 1, further comprising instructions that, when executed, enable the system to receive one or more virtual software class parameters for each instance of the virtual software class, the one or more parameters comprising at least one of input/output parameters, input/output tables, or a pointer to list instances of virtual software class parameters.

11. The article of claim 1, the virtual software class arranged to control task operations across the nodes of the distributed computing system while reducing a dependency between tasks and sub-tasks relative to using only the software class for the statistical test.

12. The article of claim 1, further comprising instructions that, when executed, enable the system to control task execution on the distributed portions of the data in each thread on each node of the distributed computing system with the virtual software class arranged to coordinate task and sub-task operations across the threads on nodes of the distributed computing system.

13. The article of claim 1, wherein the distributed computing system is a multi-threading computing system, further comprising instructions that, when executed, enable the system to control task execution in each thread on the multi-threading computing system with the virtual software class arranged to coordinate task and sub-task operations across the threads of the multi-threading computing system.

14. An apparatus, comprising:
   processor circuitry;
   a simulated data component operative on the processor circuitry to generate simulated data for a statistical test, statistics of the statistical test based on parameter vectors to follow a probability distribution;

a statistic simulator component operative on the processor circuitry to simulate statistics for the parameter vectors from the simulated data with a distributed computing system comprising multiple nodes each having one or more processors capable of executing multiple threads, the simulation to occur by distribution of portions of the simulated data across the multiple nodes of the distributed computing system; and a distributed control engine operative on the processor circuitry to control task execution on the distributed portions of the simulated data on each node of the distributed computing system with a virtual software class arranged to coordinate task and sub-task operations across the nodes of the distributed computing system, the virtual software class to comprise an extensible template to create objects, provide initial values for states, and control behavior for use by a software module having a base software class for the statistical test, the base software class to comprise a child of the virtual software class.

15. The apparatus of claim 14, the distributed control engine to create an instance of the virtual software class on each node of the distributed computing system.

16. The apparatus of claim 14, the distributed control engine to control thread execution for each node of the distributed computing system with a first instance of the virtual software class.

17. The apparatus of claim 14, the distributed control engine to initialize a parent thread with parent parameters using the first instance of the virtual software class.

18. The apparatus of claim 14, the distributed control engine to initialize a child thread with child parameters using a first instance of the virtual software class.

19. The apparatus of claim 14, the distributed control engine to analyze work results of a child thread with a second instance of the virtual software class.

20. The apparatus of claim 14, the distributed control engine to summarize work results of a child thread to a parent thread with a third instance of the virtual software class.

21. The apparatus of claim 14, the distributed control engine to initialize a grid with parent parameters with a fourth instance of the virtual software class.

22. The apparatus of claim 14, the distributed control engine to summarize a grid with parent parameters with a fifth instance of the virtual software class.

23. The apparatus of claim 14, the distributed control engine to receive one or more virtual software class parameters for each instance of the virtual software class, the one or more parameters comprising at least one of input/output parameters, input/output tables, or a pointer to list all instances of virtual software class parameters.

24. The apparatus of claim 14, the virtual software class arranged to control task operations across the nodes of the distributed computing system while reducing dependency between tasks and sub-tasks relative to using only the software class for the statistical test.

25. The apparatus of claim 14, comprising a memory unit coupled to the processor circuitry, and a memory controller coupled to the memory unit.

26. The apparatus of claim 14, the distributed control engine to control task execution on the distributed portions of the data in each thread on each node of the distributed computing system with the virtual software class arranged to coordinate task and sub-task operations across the threads on nodes of the distributed computing system.

27. The apparatus of claim 14, wherein the distributed computing system is a multi-threading computing system, the distributed control engine to control task execution in each thread on the multi-threading computing system with the virtual software class arranged to coordinate task and sub-task operations across the threads of the multi-threading computing system.

28. A computer-implemented method, comprising:
generating, by circuitry, simulated data for a statistical test, statistics for the statistical test based on parameter vectors to follow a probability distribution;
simulating, by circuitry, statistics for the parameter vectors from the simulated data with a distributed computing system comprising multiple nodes each having one or more processors capable of executing multiple threads, the simulation to occur by distribution of portions of the simulated data across the multiple nodes of the distributed computing system; and
controlling, by circuitry, task execution on the distributed portions of the simulated data on each node of the distributed computing system with a virtual software class arranged to coordinate task and sub-task operations across the nodes of the distributed computing system, the virtual software class to comprise an extensible template to create objects, provide initial values for states, and control behavior for use by a software module having a software class for the statistical test, the software class to comprise a child of the virtual software class.

29. The computer-implemented method of claim 28, comprising creating an instance of the virtual software class on each node of the distributed computing system.

30. The computer-implemented method of claim 28, comprising controlling thread execution for each node of the distributed computing system with a first instance of the virtual software class.

31. The computer-implemented method of claim 28, comprising initializing a parent thread with parent parameters using a first instance of the virtual software class.

32. The computer-implemented method of claim 28, comprising initializing a child thread with child parameters using a first instance of the virtual software class.

33. The computer-implemented method of claim 28, comprising analyzing work results of a child thread with a second instance of the virtual software class.

34. The computer-implemented method of claim 28, comprising summarizing work results of a child thread to a parent thread with a third instance of the virtual software class.

35. The computer-implemented method of claim 28, comprising initializing a grid with parent parameters with a fourth instance of the virtual software class.

36. The computer-implemented method of claim 28, comprising summarizing a grid with parent parameters with a fifth instance of the virtual software class.

37. The computer-implemented method of claim 28, comprising receiving one or more virtual software class parameters for each instance of the virtual software class, the one or more parameters comprising at least one of input/output parameters, input/output tables, or a pointer to list all instances of virtual software class parameters.

38. The computer-implemented method of claim 28, the virtual software class arranged to control task operations across the nodes of the distributed computing system while reducing dependency between tasks and sub-tasks relative to using only the software class for the statistical test.

39. The computer-implemented method of claim 28, comprising controlling task execution on the distributed portions of the data in each thread on each node of the distributed computing system with the virtual software class arranged to coordinate task and sub-task operations across the threads on nodes of the distributed computing system.

40. The computer-implemented method of claim 28, wherein the distributed computing system is a multi-threading computing system, comprising controlling task execution in each thread on the multi-threading computing system with the virtual software class arranged to coordinate task and sub-task operations across the threads of the multi-threading computing system.

41. An apparatus, comprising:
processor circuitry; and
a distributed control engine operative on the processor circuitry to control task execution for a statistical test on distributed portions of data in a distributed computing system,
  the distributed computing system to comprise multiple nodes each having one or more processors capable of executing multiple threads on each node of the distributed computing system, with a virtual software class arranged to coordinate task and sub-task operations across the nodes of the distributed computing system, and
  the virtual software class to comprise an extensible template to create objects, provide initial values for states, and control behavior for use by a software module having a base software class for the statistical test, the base software class to comprise a child of the virtual software class.

42. The apparatus of claim 41, the distributed control engine to receive one or more virtual software class parameters for each instance of the virtual software class, the one or more parameters comprising at least one of input/output parameters, input/output tables, or a pointer to list all instances of virtual software class parameters.

43. The apparatus of claim 41, the virtual software class arranged to control task operations across the nodes of the distributed computing system while reducing dependency between tasks and sub-tasks relative to using only the software class for the statistical test.

44. The apparatus of claim 41, comprising a memory unit coupled to the processor circuitry, and a memory controller coupled to the memory unit.

45. The apparatus of claim 41, the distributed control engine to control task execution on the distributed portions of the data in each thread on each node of the distributed computing system with the virtual software class arranged to coordinate task and sub-task operations across the threads on nodes of the distributed computing system.

46. The apparatus of claim 41, wherein the distributed computing system is a multi-threading computing system, the distributed control engine to control task execution in each thread on the multi-threading computing system with the virtual software class arranged to coordinate task and sub-task operations across the threads of the multi-threading computing system.

47. An apparatus, comprising:
processor circuitry; and
a distributed control engine operative on the processor circuitry to control task execution for a statistical test on distributed portions of data in a distributed computing system,
  the distributed computing system to comprise multiple nodes each having one or more processors capable of executing multiple threads on each node of the distributed computing system, with a virtual software class arranged to coordinate task and sub-task operations across the threads on the nodes of the distributed computing system, and
  the virtual software class to comprise an extensible template to create objects, provide initial values for states, and control behavior for use by a software module having a base software class for the statistical test, the base software class to comprise a child of the virtual software class.

48. The apparatus of claim 47, the distributed control engine to control thread execution for each node of the distributed computing system with a first instance of the virtual software class.

49. The apparatus of claim 47, the distributed control engine to analyze work results of a child thread with a second instance of the virtual software class.

50. The apparatus of claim 47, the distributed control engine to summarize work results of a child thread to a parent thread with a third instance of the virtual software class.

51. The apparatus of claim 47, the distributed control engine to initialize a grid with parent parameters with a fourth instance of the virtual software class.

52. The apparatus of claim 47, the distributed control engine to summarize a grid with parent parameters with a fifth instance of the virtual software class.

* * * * *